United States Patent [19]
Yoshida

[11] Patent Number: 5,460,257
[45] Date of Patent: Oct. 24, 1995

[54] CONVEYER UNIT

[75] Inventor: Yutaka Yoshida, Komaki, Japan

[73] Assignee: Daifuku Co., Ltd., Osaka, Japan

[21] Appl. No.: 219,729

[22] Filed: Mar. 29, 1994

[30] Foreign Application Priority Data

Apr. 8, 1993 [JP] Japan .................................. 5-081573
Apr. 8, 1993 [JP] Japan .................................. 5-081574
Apr. 12, 1993 [JP] Japan .................................. 5-083711
Apr. 12, 1993 [JP] Japan .................................. 5-083712

[51] Int. Cl.$^6$ .................................................. B65G 37/00
[52] U.S. Cl. ...................... 198/358; 198/367.1; 198/575; 198/810.01
[58] Field of Search .................................. 198/575, 576, 198/577, 780, 783, 810, 358, 367.1, 367

[56] References Cited

U.S. PATENT DOCUMENTS

| | | | |
|---|---|---|---|
| 2,614,684 | 10/1952 | Daniels | 198/577 X |
| 2,883,036 | 4/1959 | Fox et al. | 198/575 X |
| 3,361,248 | 1/1968 | Daymon | 198/575 X |
| 5,058,727 | 10/1991 | Jahns et al. | 198/575 X |
| 5,285,887 | 2/1994 | Hall | 198/575 X |

FOREIGN PATENT DOCUMENTS

| | | | |
|---|---|---|---|
| 2816529 | 10/1979 | Germany | 198/783 |
| 0000359 | 1/1979 | Japan | 198/575 |
| 0203610 | 12/1982 | Japan | 198/577 |
| 1-118905 | 8/1989 | Japan . | |

Primary Examiner—James R. Bidwell
Attorney, Agent, or Firm—Barnes, Kisselle, Raisch, Choate, Whittemore & Hulbert

[57] ABSTRACT

A main conveyer structure 3 incorporates a controller 40 having function to control rotation of conveyer rollers 2. The controller 40 incorporates a plurality of I/O ports 42 for exchanging data signal with respective controllers 40 of conveyer units 1 adjoining in four directions. The I/O ports 42 stores the numbers registered for respective conveyer units 1 in the course of transmitting and receiving the registerable number to and from the controller 42, and then, based on the registered numbers stored in the I/O ports 42, the controller 40 prepares a table for designating direction of driving respective conveyer units 1. By referring to the prepared table designating registered numbers of the start conveyer unit 1 and the destination conveyer unit 1, the controller 40 correctly determines the direction of driving the rollers 2 based on data for conveyance yielded from the table.

7 Claims, 42 Drawing Sheets

FIG.34

| Intermediate conveyer unit |

(FIG.33) (FIG.35)
*C2 ←—Transmits ("N"→0) identified signal         ←—*C1
      →Confirms presence or absence of ("N","0") port
        Identifies conveying direction (N →0)
*C4 ←—Identifies activation mode;Transmits activation-   ←—*C3
      identified signal
      →Conveyer units reverse in the direction (N→0)
        *Branching device activates operation
      →[Reverse] display lamp turns ON
*C6 ←—Identifies stop mode;Transmits stop-identified signal   ←—*C5
      →Conveyer stopped
        *Branching device returns to original position
      →[Reverse] display turned OFF

*C8 ←—Transmits (0→"N") identified signal         ←—*C7
      →Confirms presence or absence of port ("N","0")
        Identifies conveying direction (0 →N)
*C10←—Identifies activation mode;Transmits activation-   ←—*C9
      identified signal
      →Conveyer rollers rotate in normal direction (0→"N")
        *Branching device activates operation
      →[Run-ON] display lamp turns ON
*C12←—Identifies stop mode;Transmits stop-identified signal   ←—*C11
      →Conveyer units stop operation
        *Branching device returns to original satndby position
      →[Run-ON] display lamp turns OFF

CONVEYER UNIT

FIELD OF THE INVENTION

The present invention relates to a conveyer unit integrally forming a conveyer line by way of linking a plurality of conveyer units with each other.

BACKGROUND OF THE INVENTION

For instance, the Japanese Laid-Open Utility Model Publication No. HEI1-118905 of 1989 discloses a conveyer unit. According to this prior art, the main conveyer unit is equipped with a number of rollers for conveying load, a drive unit such as a motor for driving the rollers, and a transmission unit comprising a pneumatic cylinder for transmitting and cutting off drive force from the drive unit to these rollers. Operations of the drive unit and the transmission unit are respectively controlled by a controller unit internally provided for the main conveyer unit.

In order to form a conveyer line by linking a plurality of conveyer units with each other, conventionally, power-supply lines for feeding power to the drive unit and the controller unit provided for each conveyer unit, signal exchange lines linked with the controller unit to transmit and receive signals to and from adjoining conveyer units, and air-supply ducts for feeding air to the transmission unit composed of a pneumatic cylinder, are discretely secured to each conveyer unit independent of adjoining conveyer units.

Since the above prior art also discretely provides the power-supply lines, signal exchange lines, and air-supply ducts independent of adjoining conveyer units, when forming complex conveyer lines, installation work involves a great deal of labor and much working time. When changing formation of the conveyer line, the operator is obliged to change the arrangement of conveyer units, power-supply lines, signal exchange lines, and air-supply ducts in order to properly restructure the conveyer line. This also obliges the operator to change software applicable to the controller unit. Since software cannot readily be changed by the operator, the layout cannot easily be changed. In addition, as the scope of automation further expands, the number of drive units and sensors further increases to result in the increased number of signal exchange lines. In consequence, proper arrangement can hardly be achieved in the operating site, and yet, completion of restructuring work may eventually be delayed.

DISCLOSURE OF THE INVENTION

Therefore, it is an object of the invention to provide an improved conveyer unit featuring easy installation of power-supply lines, signal input/output lines, and air-supply ducts, and yet, enabling the operator to easily change layout of the conveyer line, and easily dismantle and restructure the whole conveyer unit after once being dismantled.

To achieve the above object, the improved conveyer unit according to the invention characteristically comprises the following; a conveyer body for conveying load, a main conveyer structure for supporting the conveyer body, a drive unit for driving the conveyer body, and a controller unit for controlling the operation of the drive unit. The controller unit incorporates a plurality of input/output ports respectively being linked with controllers of adjoining conveyer units at least adjacently extending themselves in three directions. The controller unit incorporates a plurality of connection means which freely interlink a plurality of I/O ports being adjacent to adjoining conveyer units. Characteristically, the controller unit incorporates an identifying means for identifying the actually driven direction of the main conveyer structure based on load-conveying data signals received from adjoining conveyer units via the connection means and the I/O ports.

According to the structural arrangement described above, the identifying means stored in the controller unit provided for the conveyer unit identifies the actually driven direction of the main conveyer structure based on load-conveying data signals received via the connection means and the I/O ports. Subsequent to entry of the load-conveying data, the controller unit determines the overall conveying routes of the whole conveyers units and the direction to transfer the loaded cargo. Therefore, even when freely disposing the conveyer unit, the operator can properly set up the conveyer line without compulsorily changing software. In particular, the operator can easily transfer and dismantle the conveyer unit or add up conveyer units whenever the needs arise.

Further objects and advantageous features of the invention will more fully be understood from the following description rendered in association with the accompanying drawings.

BRIEF DESCRIPTION OF THE DRAWINGS

FIGS. 33 to 35 are explanatory of operating sequence for exchanging data signals n a subordinate station of each conveyer unit;

DESCRIPTION OF THE PREFERRED EMBODIMENTS

Figure 1:
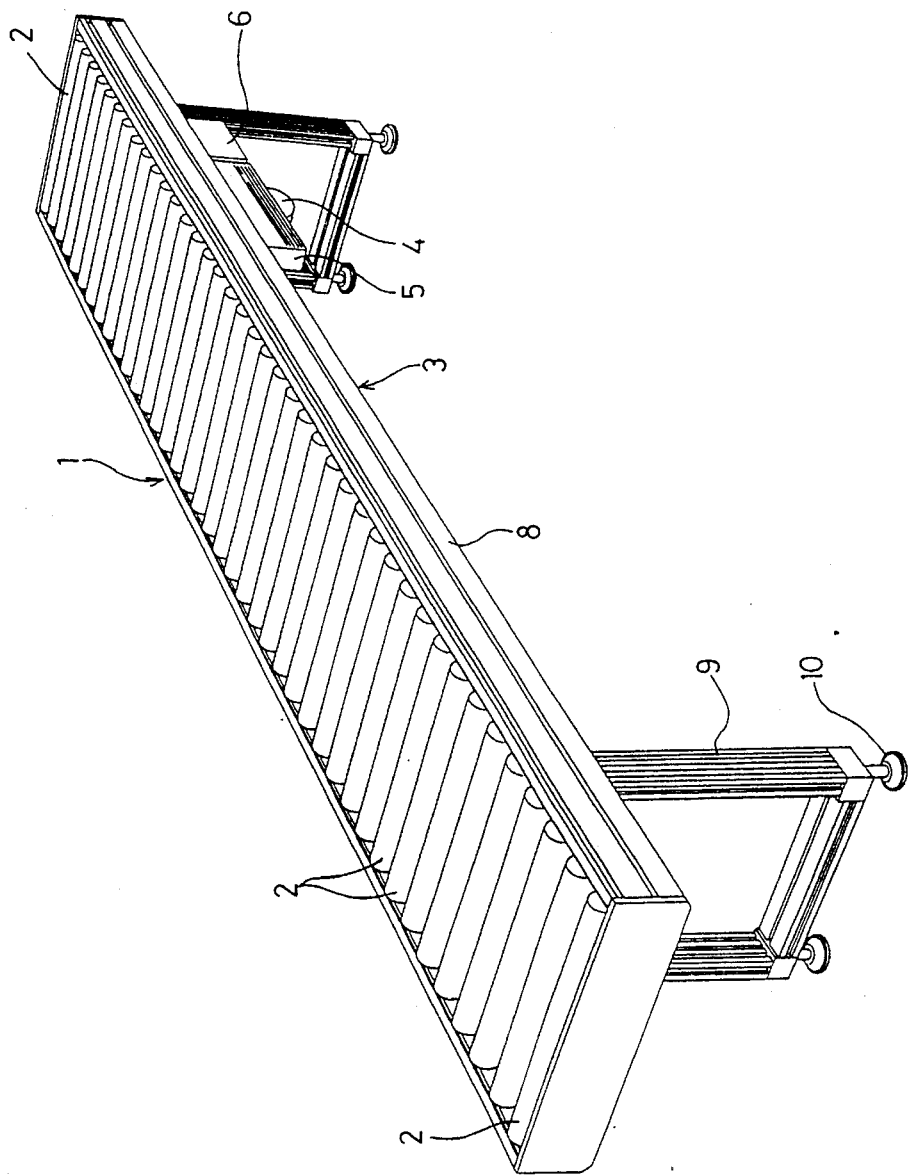
FIG. 1 is an overall perspective view of the improved conveyer unit according to the invention.
Figure 2:
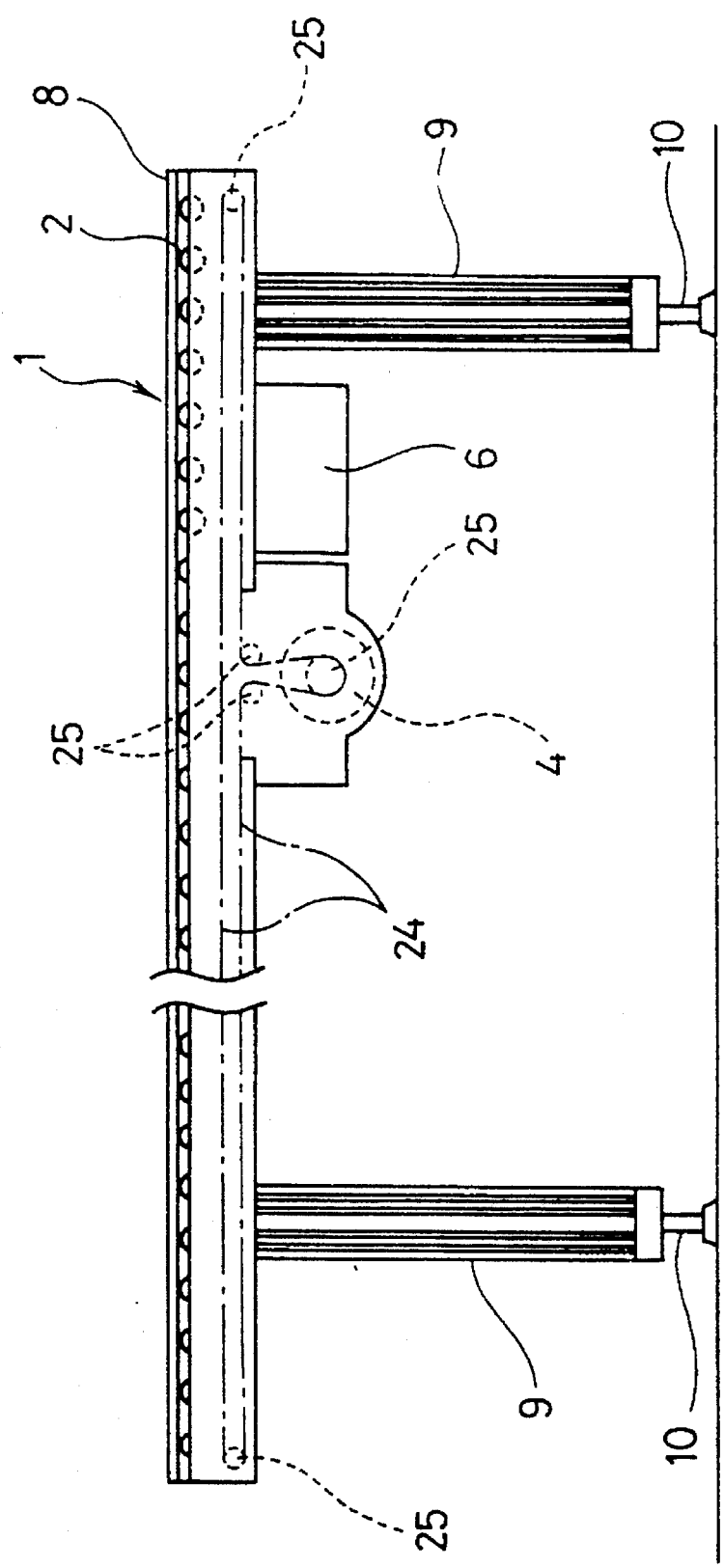
FIG. 2 is a lateral view of the improved conveyer unit shown in FIG. 1.
Figure 3:
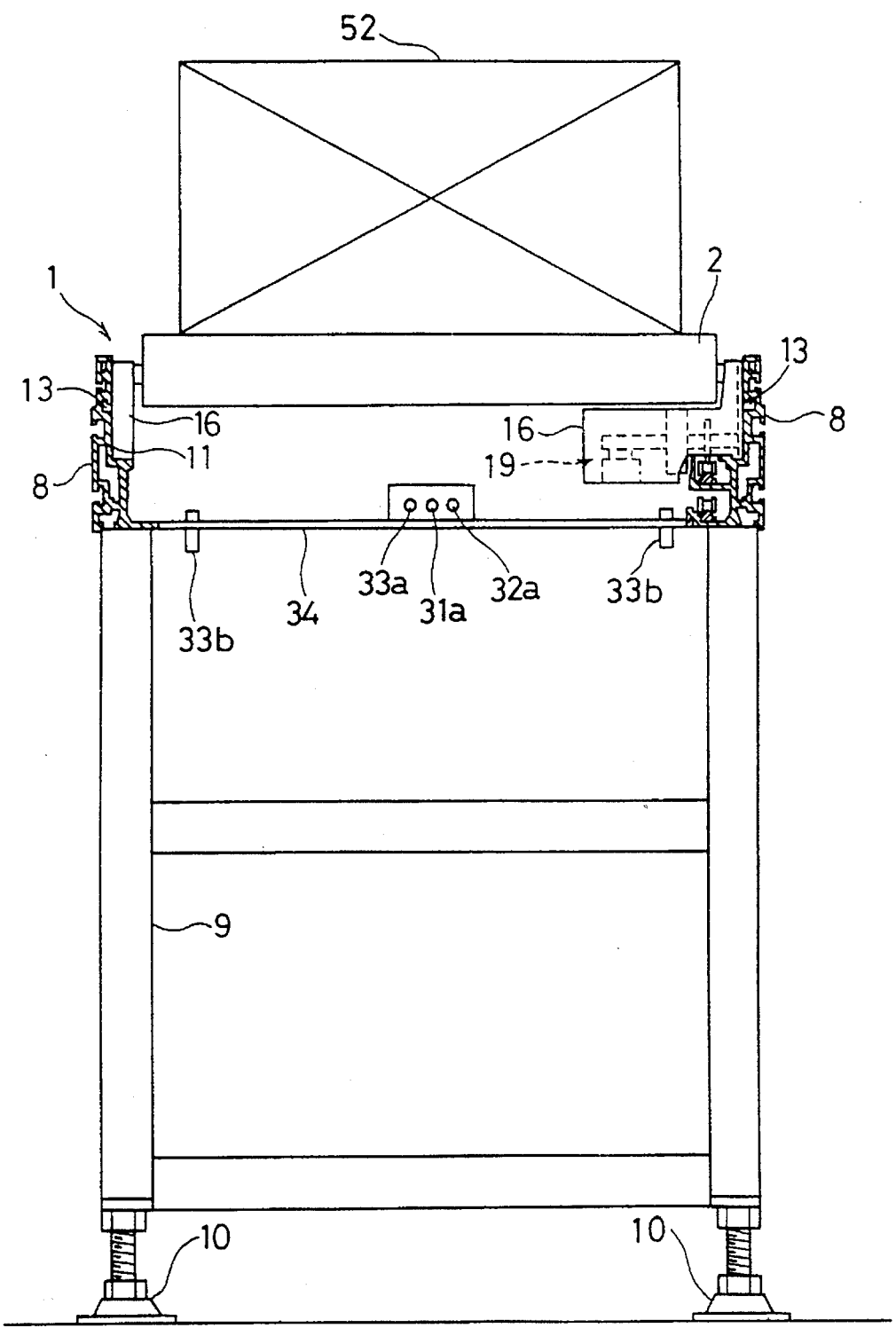
FIG. 3 is a front section view of the improved conveyer unit shown in FIG. 1.
Figure 4:
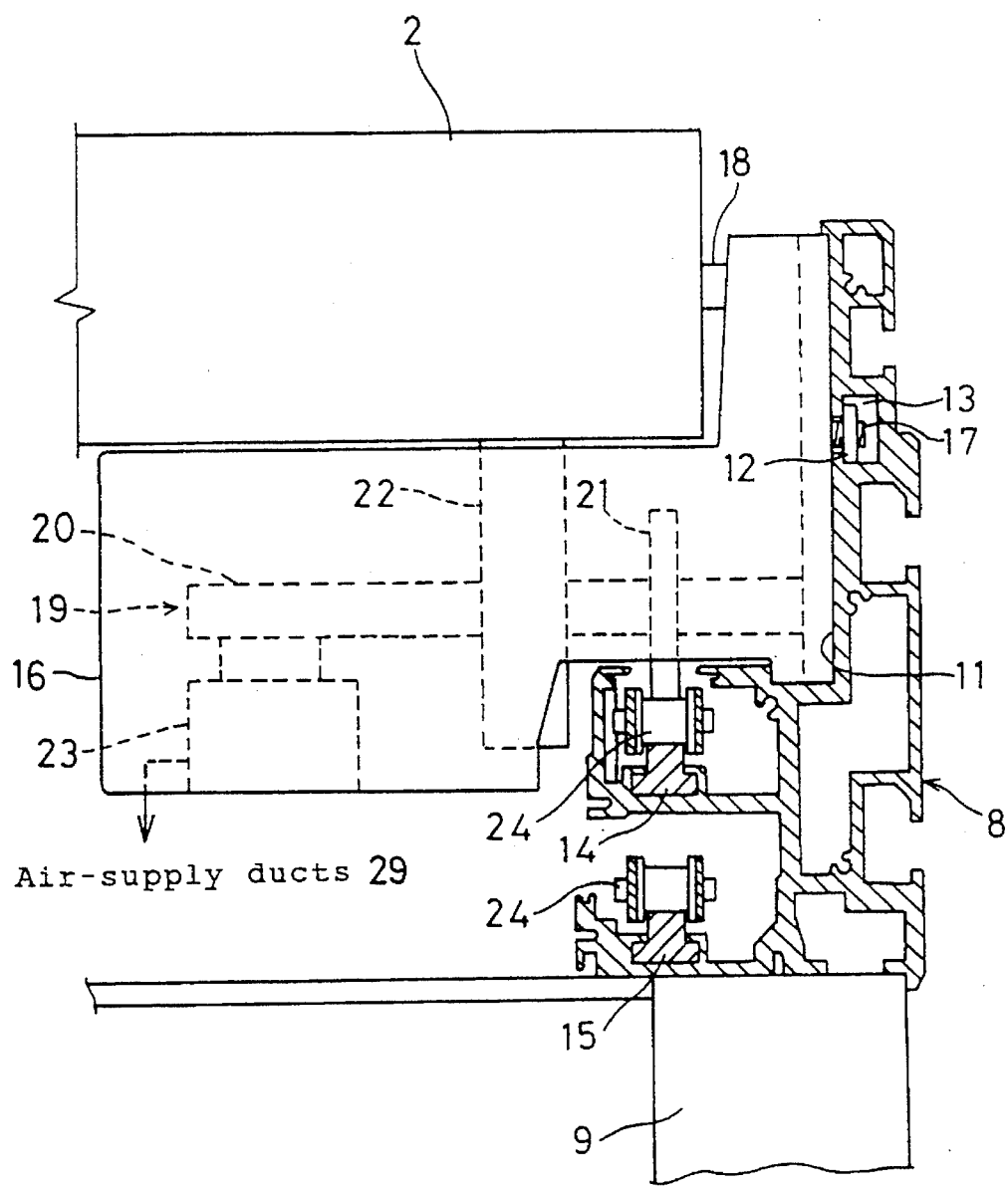
FIG. 4 is an enlarged view of frame structure on one side of the improved conveyer unit shown in FIG. 3.

Basically, as shown in FIGS. 1 through 4, an individual conveyer unit according to the invention comprises the following; a plurality of rollers 2 collectively conveying load, a main conveyer structure 3 supporting the rollers 2, a drive unit 5 for driving the rollers 2 by rotating a motor 4 in the clockwise and counterclockwise directions, and a controller unit 6.

The main conveyer structure 3 comprises a pair of side frames 8 and 8 disposed on both sides, and two pairs of leg members 9/9 and 9/9 disposed below both-side frames 8 and 8 and secured with bolts. A pair of L-shaped guide members 11 and 11 are provided on the internal lateral surfaces of the oppositely facing both-side frames 8 and 8. A dovetail groove 13 is formed right above the L-shaped guide members 11 and 11 to permit a nut 12 to enter thereinto. A pair of guide rails 14 and 15 are disposed at the upper and lower positions inside of the bottom domain of one of the side frames 8 and 8 in the longitudinal direction thereof.

Roller operating mechanism

A supporting frame 16 is slidably disposed inside of both side frames 8 and 8 by way of freely varying the position in the longitudinal direction of the both frames 8 and 8, where the bottom of the supporting frame 16 is engaged with the L-shaped guide member 11. The supporting frame 16 is secured to a predetermined position by screwing a bolt 17 into the nut 12 at an intermediate position of the supporting frame 16 itself. A number of rollers 2 are collectively aligned across both side supporting frames 16 and 16 via corresponding roller shafts 18.

One of the supporting frames 16 is structured in the form of a housing, which accommodates a pneumatically driven transmission unit 19. In order to transmit drive force to the rollers 2 and cut off the drive force, the transmission unit 19 is constantly linked with an endless driver (to be described later on). More particularly, a shaft 20 is disposed along the axis of each roller by way of freely swinging itself in the vertical direction. A sprocket 21 is rotatably set to the shaft 20. A transmission roller 22 is externally coupled with a boss member of the sprocket 21 to enable both the sprocket 21 and the transmission roller 22 to integrally rotate themselves. A pneumatic cylinder 23 is disposed on the part of the supporting frame 16 to lift and lower the shaft 20 in order that the transmission roller 22 can be driven in association with or independent of the shaft 20. Structurally, each transmission unit 19 is combined with the rollers 2. Actually, a number of transmission units 19 are secured to the single side frame 8.

A plurality of endless chains 24 being an example of the endless driver linked with each sprocket 21 are set between both ends of the main conveyer structure 3 in the longitudinal direction thereof and also between a plurality of sprockets 25 disposed near the motor 4, where one of the sprockets 25 is linked with the motor 4. On the way of following up forwarding route in the state being engaged with each sprocket 21, the endless chain 24 is supported and guided by the guide rail 14 which comes into contact with the chain from the bottom side. In the same way, the endless chain 24 is supported and guided by the other guide rail 15 on the return way.

Internal wiring/piping structure

Figure 5:
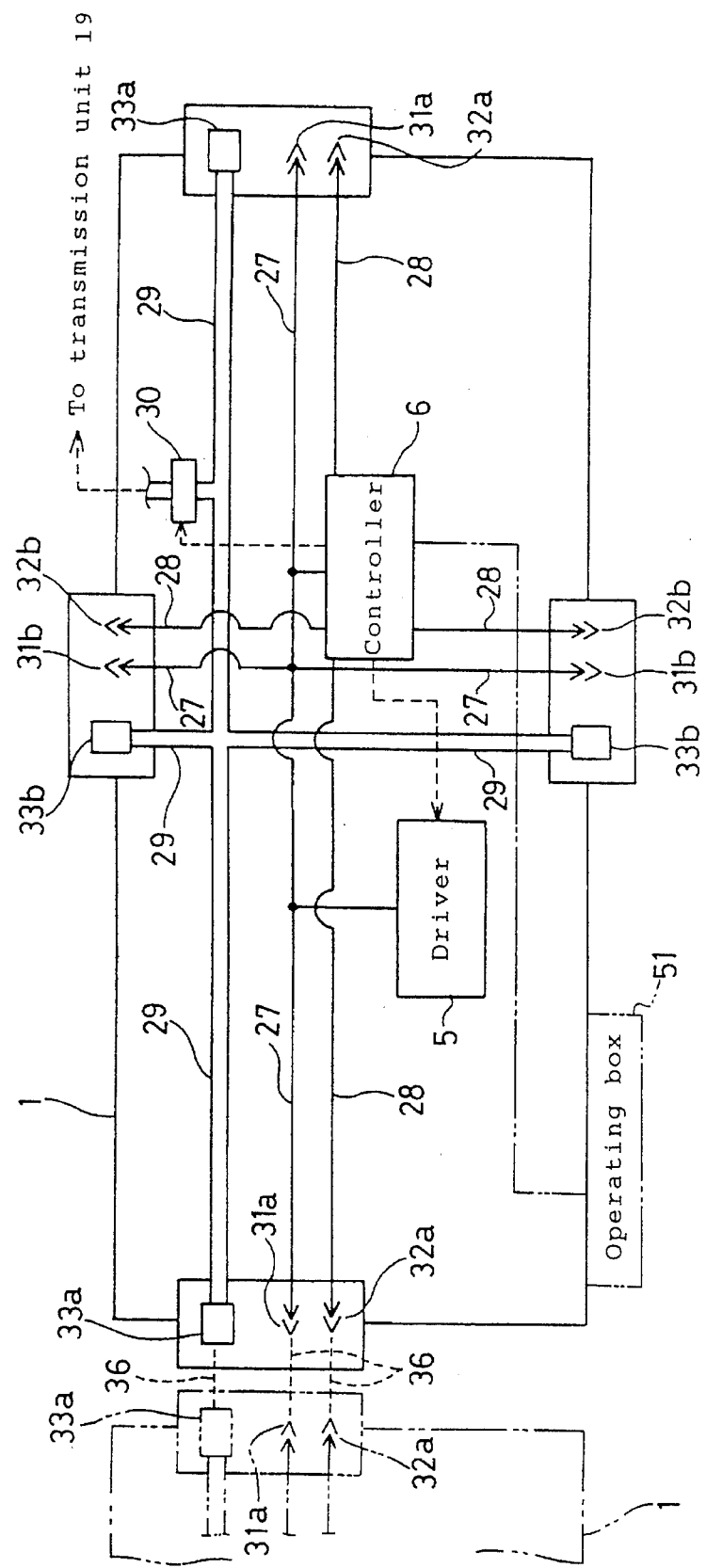
FIG. 5 is a schematic block diagram of power-supply lines, signal input/output lines, and air-supply ducts, accommodated in the improved conveyer unit according to the invention.
Figure 6:
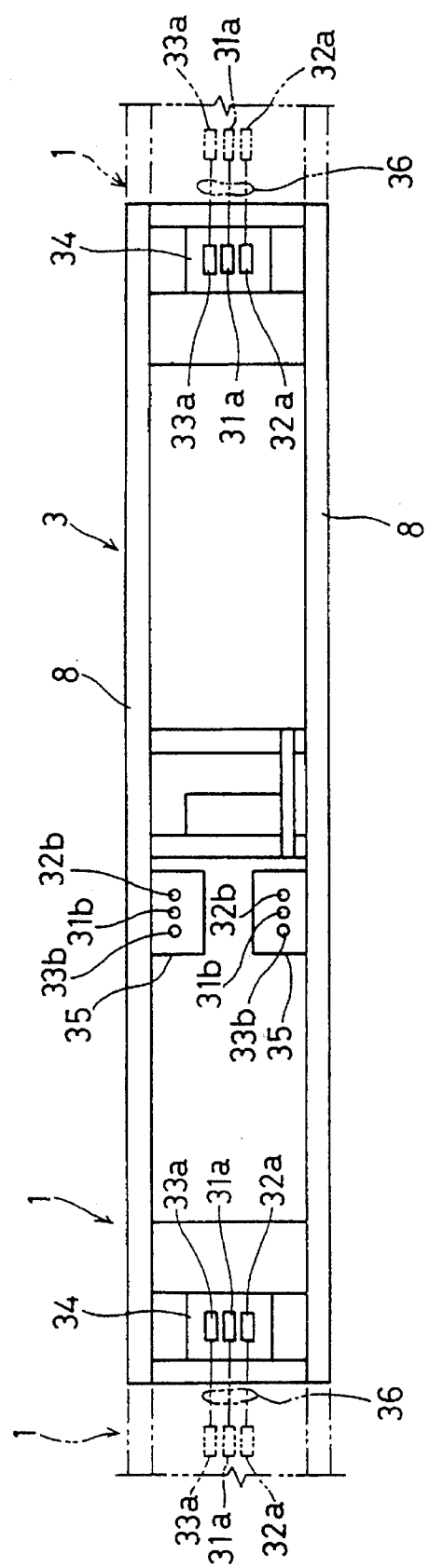
FIG. 6 is a view plan of ready-access terminals built in the improved conveyer unit according to the invention.

As shown in FIGS. 5 and 6, the main conveyer structure 3 incorporates the following; a plurality of power-supply lines 27 for feeding power to the driver 5 and the controller unit 6 by way of extending themselves in the longitudinal and lateral directions; a plurality of signal input/output lines (light communication lines) 28 for exchanging signal communication between respective adjacent conveyer units 1 connected to the controller unit 6 and a branching device 53 (to be described later on) by way of extending themselves in the longitudinal and lateral directions; and a plurality of air-supply ducts 29 for feeding air to the pneumatic cylinder 23 of the transmission unit 19 by way of extending themselves in the longitudinal and lateral directions. A switching valve 30 is disposed between respective air-supply ducts 29 and the pneumatic cylinder 23. While being open, the switching valve 30 interconnects the air-supply ducts 29 with the pneumatic cylinder 23. While being closed, the switching valve 30 causes the pneumatic cylinder 23 to externally discharge compressed air.

Ready access terminals 31a and 31b are discretely provided at both ends of the power-supply lines 27 in the longitudinal and lateral directions of the main conveyer structure 3. Ready access terminals 32a and 32b are also discretely provided at both ends of the signal input/output lines 28 in the longitudinal and lateral directions of the main conveyer structure 3. Ready access terminals 33a and 33b are also discretely provided at both ends of the air-supply ducts 29 in the longitudinal and lateral directions of the main conveyer structure 3. Of these, those ready access terminals 31a, 32a, and 33a respectively being provided at both ends of the main conveyer structure 3 in the longitudinal direction are respectively set sideways to a pair of corresponding fixing plates 34 and 34 connected across both side frames 8 and 8 at the bottom. On the other hand, those ready access terminals 31b, 32b, and 33b respectively being provided at both ends of the main conveyer structure 3 in the lateral direction are pronely set to a pair of corresponding fixing plates 35 connected across both side frames 8 and 8 at the bottom. These ready access terminals 31b, 32b, and 33b, are pronely set in order that these terminals can be free from unwanted disturbance caused by both-side frames 8 and 8.

A plurality of conveyer units 1 are linked with each other in order to form a conveyer line. The main conveyer structure 3 of the conveyer unit 1 is linked with a pair of main conveyer structures 3 of adjoining conveyer units 1 via connection devices (not shown). The power-supply lines 27, the signal input/output lines 28, and the air-supply ducts 29 accommodated in the conveyer unit 1 are correspondingly linked with the power-supply lines 27, the signal input/output lines 28, and the air-supply ducts 29 of adjoining conveyer units 1 via cables 36 respectively being connected to those ready access terminals 31a, 32a, and 33a. In the same way, the conveyer unit 1 is linked with a junction conveyer (branched out from or joined with the conveyer unit 1) via cables 37 respectively being connected to those ready access terminals 31a, 32a, 33a, and 31b, 32b, and 33b.

Controller unit

Figure 7:
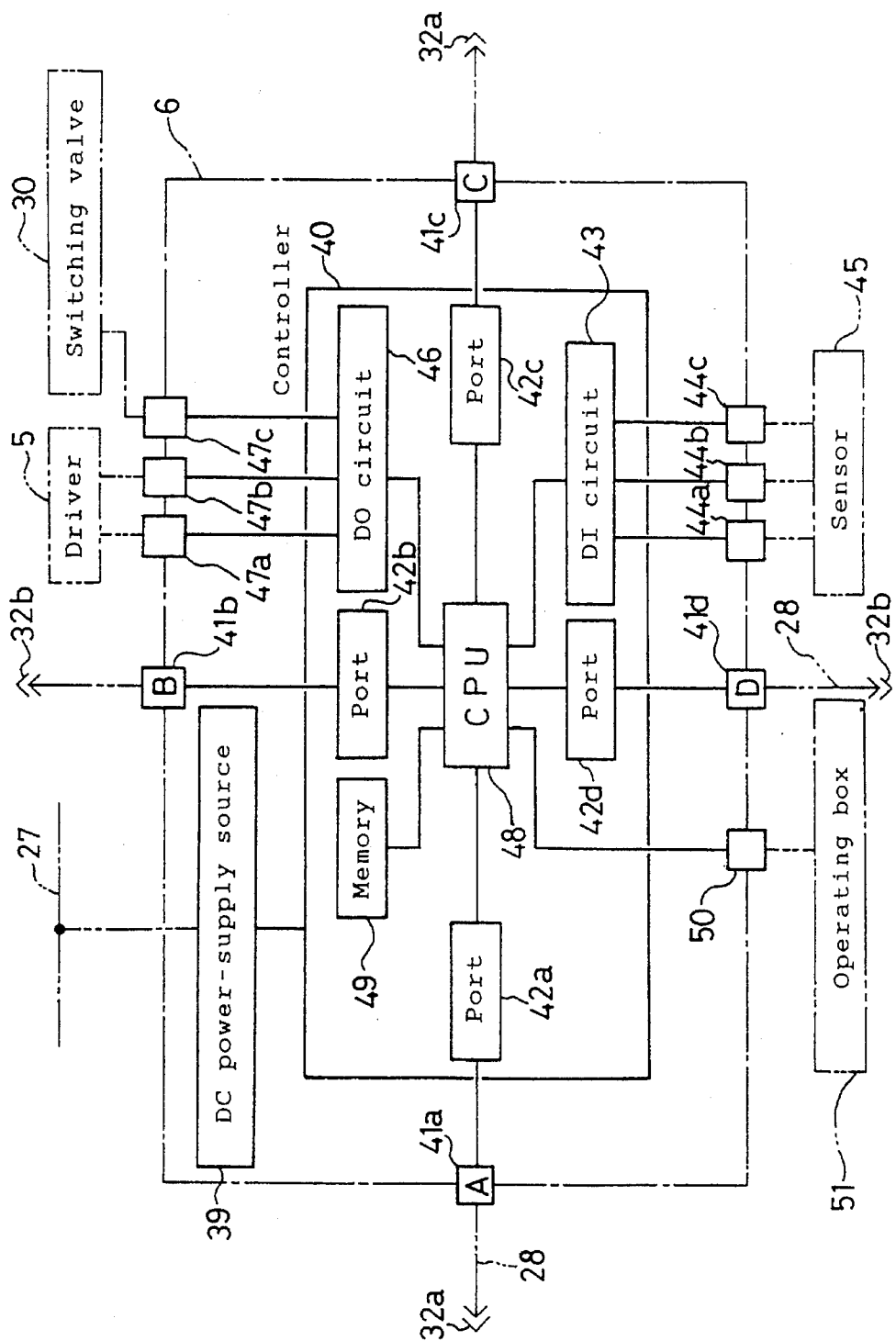
FIG. 7 is a schematic block diagram of the main controller unit built in the improved conveyer unit according to the invention.

As shown in FIG. 7, the controller unit 6 comprises the following; a DC power-supply source 39 connected to the power-supply lines 27; a controller 40 which receives power from the DC power-supply source 39, exchanges data signals with adjoining conveyer units 1, activates and suspends operation of the driver 5 after identifying the driven direction of the conveyer units 1, and then controls operation of the switching valve 30; and a plurality of external connectors 41a, 41b, 41c, and 41d, which are respectively connected to the signal input/output lines 27.

Structurally, the controller 40 consists of a one-board controller, which incorporates common software packages (memory units) and a plurality of input/output ports 42a, 42b, 42c, and 42d, corresponding to those external connectors 41a, 41b, 41c, and 41d. In addition, the controller 40 incorporates an input contact circuit(DI circuit) 43. If necessary, a sensor 45 is connected to the controller 40 via external connectors 44a, 44b, and 44c connected to the DI circuit 43. The controller 40 further incorporates an output contact circuit (DO circuit) 46 and is linked with the driver 5 and the switching valve 30 via external connectors 47a, 47b, and 47c, respectively being connected to the DO circuit 46. A memory 49, the input/output ports 42a, 42b, 42c, and 44d, the DI circuit 43, and the DO circuit 46, are respectively connected to the CPU 46 of the controller 40. In addition, if necessary, an operating box 51 (to be described later on) is connected to the CPU 46 via an external connector 50.

Conveying facilities

Figure 8:
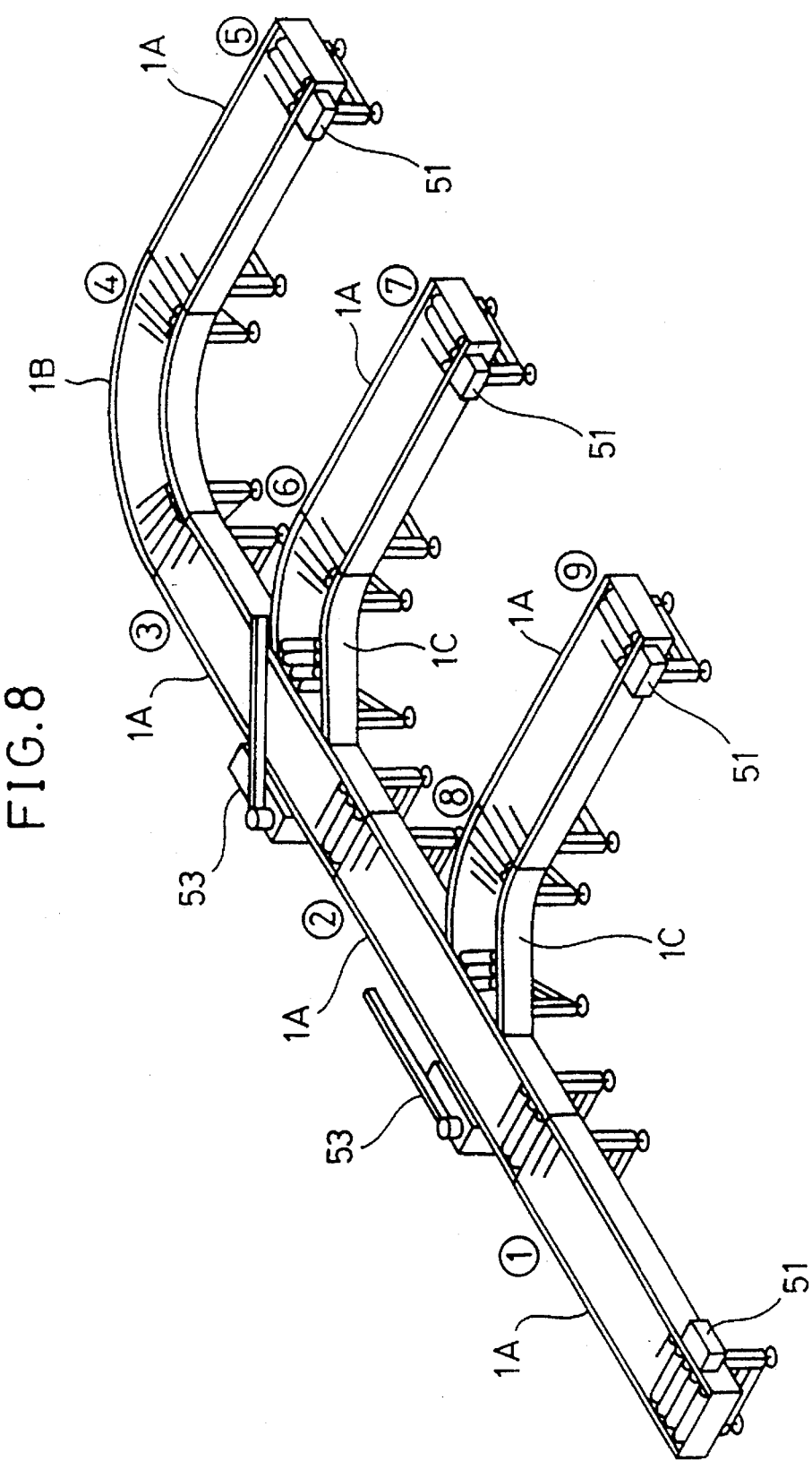
FIG. 8 is an overall perspective view of a load conveying line comprising a plurality of conveyer units according to the invention.
Figure 9:
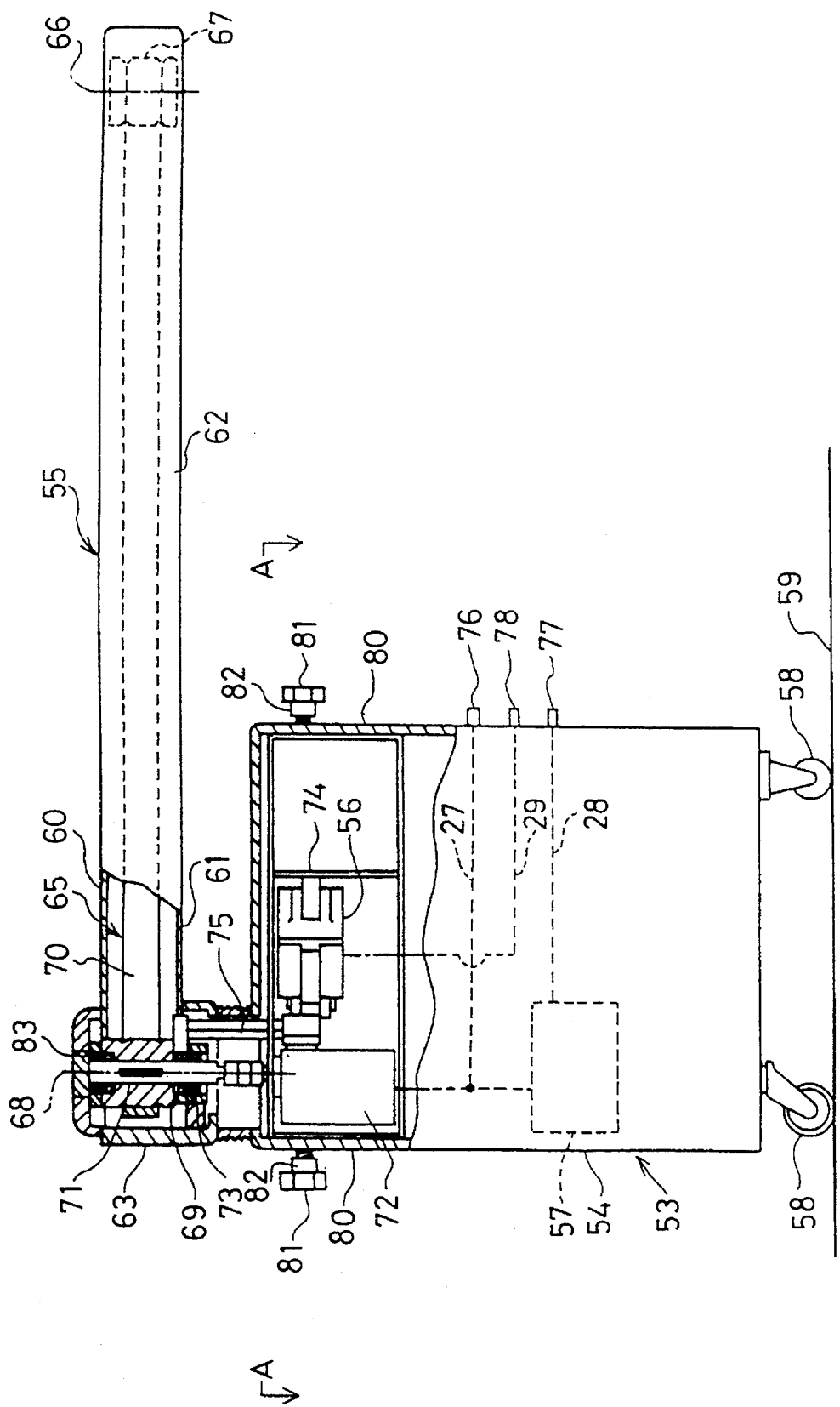
FIG. 9 is a front view of a partially exposed branching device installed to the improved conveyer unit according to the invention.
Figure 10:
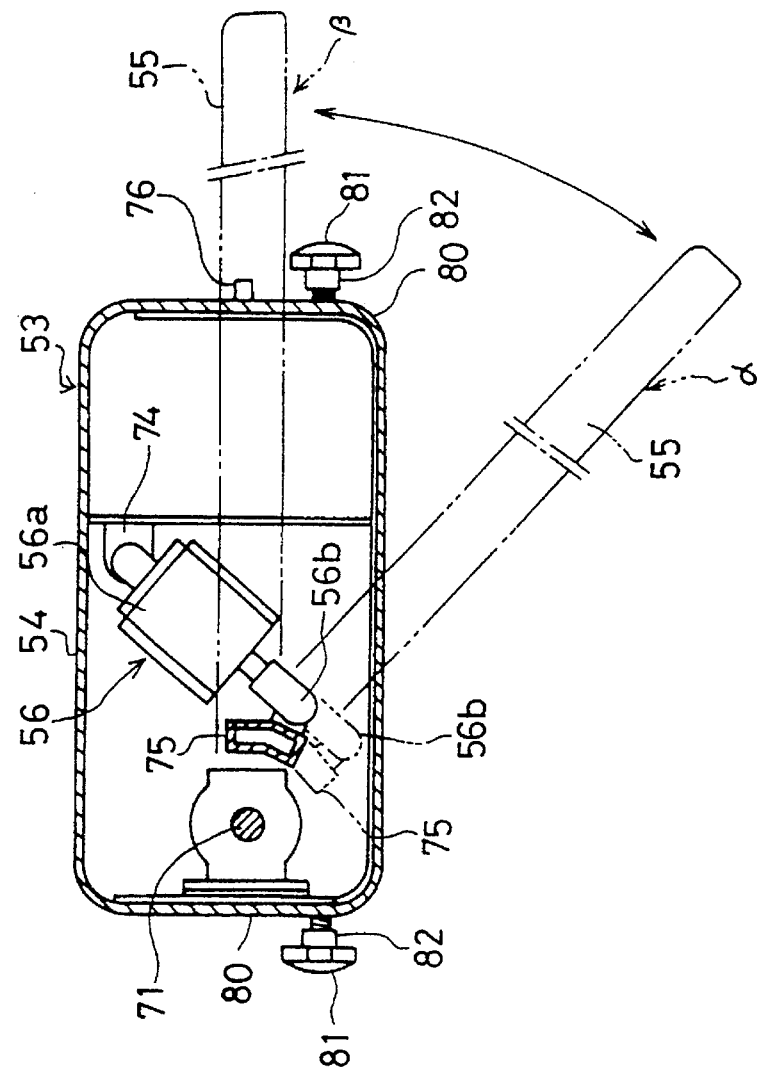
FIG. 10 is a partially exposed view of the branching device across line A—A shown in FIG. 9.

FIG. 8 schematically illustrates a typical example of an integrated conveyer line comprising a plurality of conveyer units 1 combined in a rank with each other. According to the form of conveying route constructed by the rollers 22, there are three kinds of the conveyer unit 1 including the following; a roller conveyer 1A which linearly conveys load, a roller-curve conveyer 1B which conveys load via a curved path, and a junction conveyer 1C which branches out or joins load 52 in transit. The conveying line shown in FIG. 8 consists of 6 units of the roller conveyer 1A, 1 unit of the roller-curve conveyer 1B, a pair of junction conveyers 1, and a branching device 53 for branching out or joining load 52 in transit between the roller conveyer 1A and the junction conveyer 1C. Except for the difference in the form of the conveying route, structures of the roller conveyer 1A, the roller-curve conveyer 1B and two of the junction conveyers 1C are exactly identical to each other. An operating box 51 is provided for each of the roller conveyers 1A disposed at the conveying terminal.

Branching device

As shown in FIGS. 9 through 13, the above-referred branching device 53 comprises the following; a freely swingable arm 55 which shuts off a conveying route L of the roller conveyer 1A and freely swings itself by way of pivoting on a vertical axis 68 in a range between a closing position α at which load 52 is led to the junction conveyer 1C and an opening position β at which the conveying route L is opened; a pneumatic cylinder 56 being an example of a drive unit for swingably operating the arm 55; and a controller 57. A plurality of casters 58 capable of freely changing directions are secured to the bottom surface of the main body 54, thus enabling the branching device 53 to independently stand itself on the floor 59 by way of freely shifting its position.

The freely swingable arm 55 comprises the following; an upper frame plate 60, a lower frame plate 61, a lateral frame plate 62 set to a lateral surface of the upper frame plate 60 and the lower frame plate 61, and a boss member 63 secured to the end base. The other lateral surface opposite from the conveyer unit 1 has an open hollow domain 64. The open hollow domain 64 accommodates a down-sized belt conveyer 65 for shifting load 52 in contact with the arm 55 towards the junction conveyer 1C. More particularly, a free roller 67 is set to tip edge of the arm 55 so that it can freely rotate itself by way of pivoting on the vertical axis 66. A drive roller 69 is secured to the end base of the swingable arm 55 to freely rotate itself by way of pivoting on the vertical axis 68 being the pivot of swinging movement of the swingable arm 55. An endless belt 70 is set between the free roller 67 and the drive roller 69 which is connected to a motor 72 secured inside of the main body 54 via a drive shaft 71. The drive shaft 71 is accommodated in the boss member 63 of the arm 55 via a bearing 73.

The main body 56a of the pneumatic cylinder 56 is secured to a bracket 74 inside of the main body 54 of the branching device 53 by way of freely rotating itself. The tip end of a piston rod 56b is connected to the bottom end of a vertical rod 75 vertically extended from the end base of the arm 55 into the main body 54.

In response to command signals from the conveyer unit 1, the controller 57 controls drive operation of the pneumatic cylinder 56 and the motor 72. The controller 72 is accommodated in the main body 54 of the branching device 53. Ready access terminals 76, 77, and 78 are respectively provided on a lateral surface of the main body 54. Of these, the power-supply ready access terminal 76 is freely connected to the above-referred power-supply ready access terminal 31b of the conveyer unit 1 via a cable 79. The ready access terminal 77 for dealing with data signals is freely connected to the above-referred signal exchanging ready access terminal 32b of the conveyer 1 via the cable 79. The air-supply ready access terminal 78 is freely connected to the above-referred air-supply ready access terminal 33b of the conveyer unit 1 via the cable 79. The power-supply ready access terminal 76 is connected to the controller 57 and the motor 72. The signal exchanging ready access terminal 77 is connected to the controller 57. The air-supply ready access terminal 78 is connected to the pneumatic cylinder 56. A pair of bolts 81 engageable with a frame 80 of the main body 54 are horizontally screwed into the upper part on both lateral surfaces of the main body 54 of the branching device 53. Body portions 82 of these bolts 81 are engageably and disengageably inserted in slits 84 of brackets 83 secured to the side of the conveyer unit 1. The brackets 83 are secured to the lateral frames 8 and 8 of the conveyer unit 1 by a pair of slidable tap plates 86 provided inside of the dove grooves 85 of the lateral frames 8 and 8 of the conveyer unit 1 and a pair of bolts 87. A pair of externally projective pieces 88 are disposed at both ends of these brackets 83 at a predetermined interval. Each of the slits 84 opens itself in the direction of the tip end of the projective piece 88.

Device for connecting the junction conveyer 1

Branching (joining) end of the junction conveyer 1 inclines itself in correspondence with branching angle. As shown in FIGS. 14 through 19, the junction conveyer 1C is engageably and disengageably linked with the roller conveyer 1A via a connection device 89. More particularly, the connection device 89 comprises a pair of connection blocks 90 secured to one side frame 8 and a pair of joints 91 and 92 secured to the thresholds of both side frames 8 and 8 of the junction conveyer 1C.

The connection blocks 90 on the part of the roller conveyer 1A are closely secured to the external lateral surface of one side frame 8 by means of a pair of slidable tap plates 94 set inside of the dove grooves 85 of the one-side frame 8. A pair of engaging holes 97 opening themselves to the external lateral surface and the fixing surface 96 of the one side frame 8 are formed on the external lateral surface thereof by a predetermined depth. A pair of projections 98 are formed on the fixing surface 96 by way of being engaged with the dove grooves 85.

A joint 91 is closely secured to the tip surface of one side frame 8 of the junction conveyer 1C via a bolt 100. An engaging member 101 is formed on part of the joint 91 so that it can be inserted in the corresponding engaging hole 97 provided for each connection block 90. A projection 103 engageable with the dove grooves 85 of one side frame 8 of the junction conveyer 1C is formed on the fixing surface 102 of the joint 91.

The other joint 92 is secured to the external lateral surface of one side frame 8 by means of a tap plate 104 set inside of the dove grooves] 85 of the other side frame 8 of the junction conveyer 1C and a bolt 105. An engaging member 108 is formed on part of the joint 92 so that it can be inserted in the corresponding engaging hole 97 of the connection block 90. A projection 107 engageable with the dove groove 85 of one side frame 8 of the junction conveyer 1C is formed on the fixing surface 106 of the joint 92.

Operating box

Figure 20:
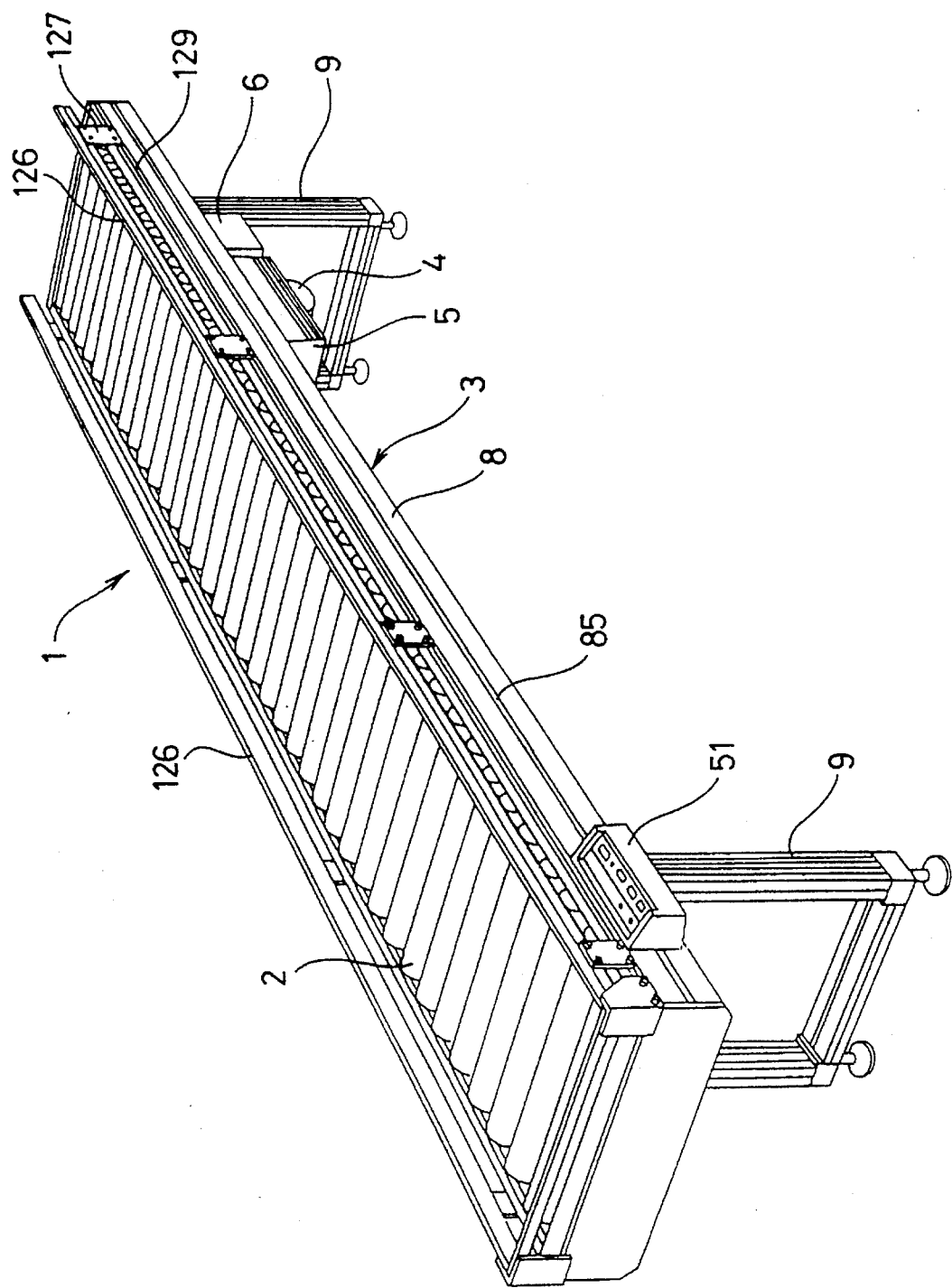
FIG. 20 is an overall perspective view of the improved conveyer unit according to the invention.
Figure 21:
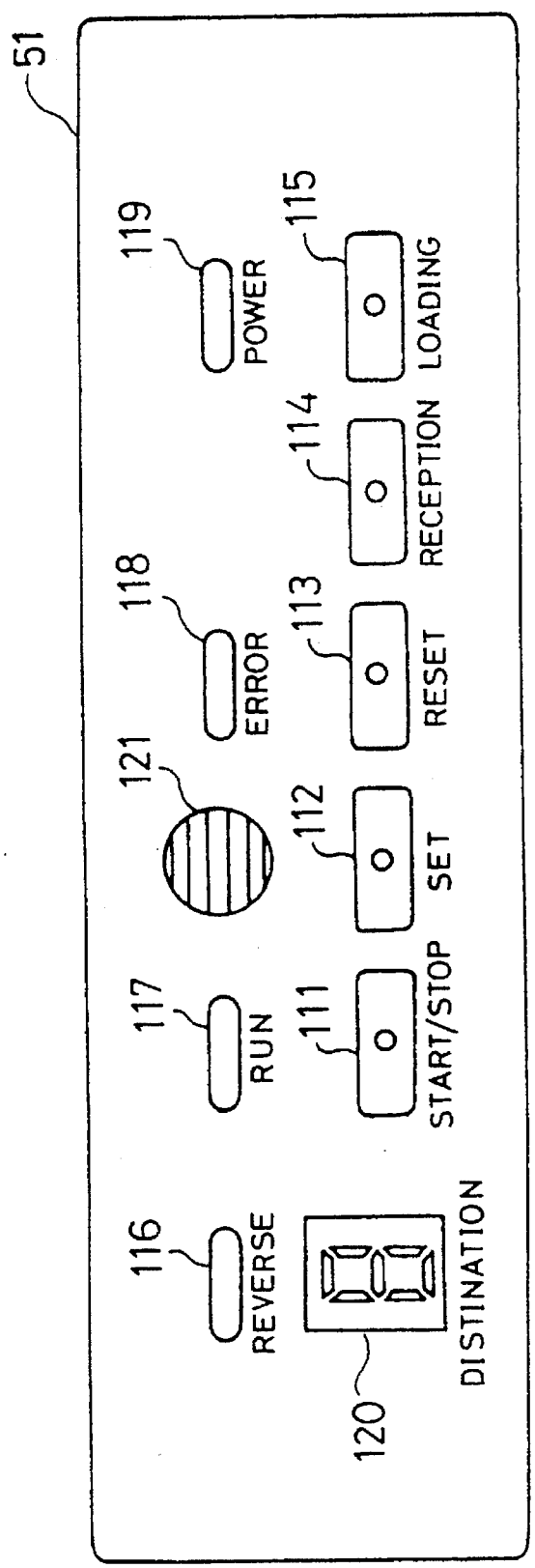
FIG. 21 is a typical arrangement of switching lamps built in a console of the controller unit.

The above-referred operating box 51 is secured to each roller conveyer 1A installed at the conveying end by means of a projection (not shown) engaged with the dove groove 85 of the lateral frame 8. FIG. 20 illustrates the state of the operating box 51 being secured to a roller conveyer 1A. FIG. 21 illustrates an example of arrangement of control switches of the operating box 51. Typically, the operating box 51 comprises the following; an activating/suspending switch 111 with display lamp for activating and suspending load conveying operation of the rollers 2; a setting switch 112 with display lamp for designating destination or start of load to be conveyed; a reset switch 113 with display lamp for generating and resetting alarm; a destination mode switch 114 with display lamp for setting a mode for destination load 52 from the conveying source; a delivery switch 115 with display lamp for setting a mode for conveying load 52 to a predetermined destination; a reverse display lamp 116 for displaying that the rollers 2 are on the reverse rotation; a normal run display lamp 117 for displaying that the rollers 2 are driven in the normal direction; an error display lamp 118 for warning that erroneous operation has actually occurred; a power-ON display lamp; a digital display for displaying the proper number of the conveyer unit 1 serving as the destination or the source of load being conveyed; and a buzzer 121 for generating an alarm.

Guide

Figure 13:
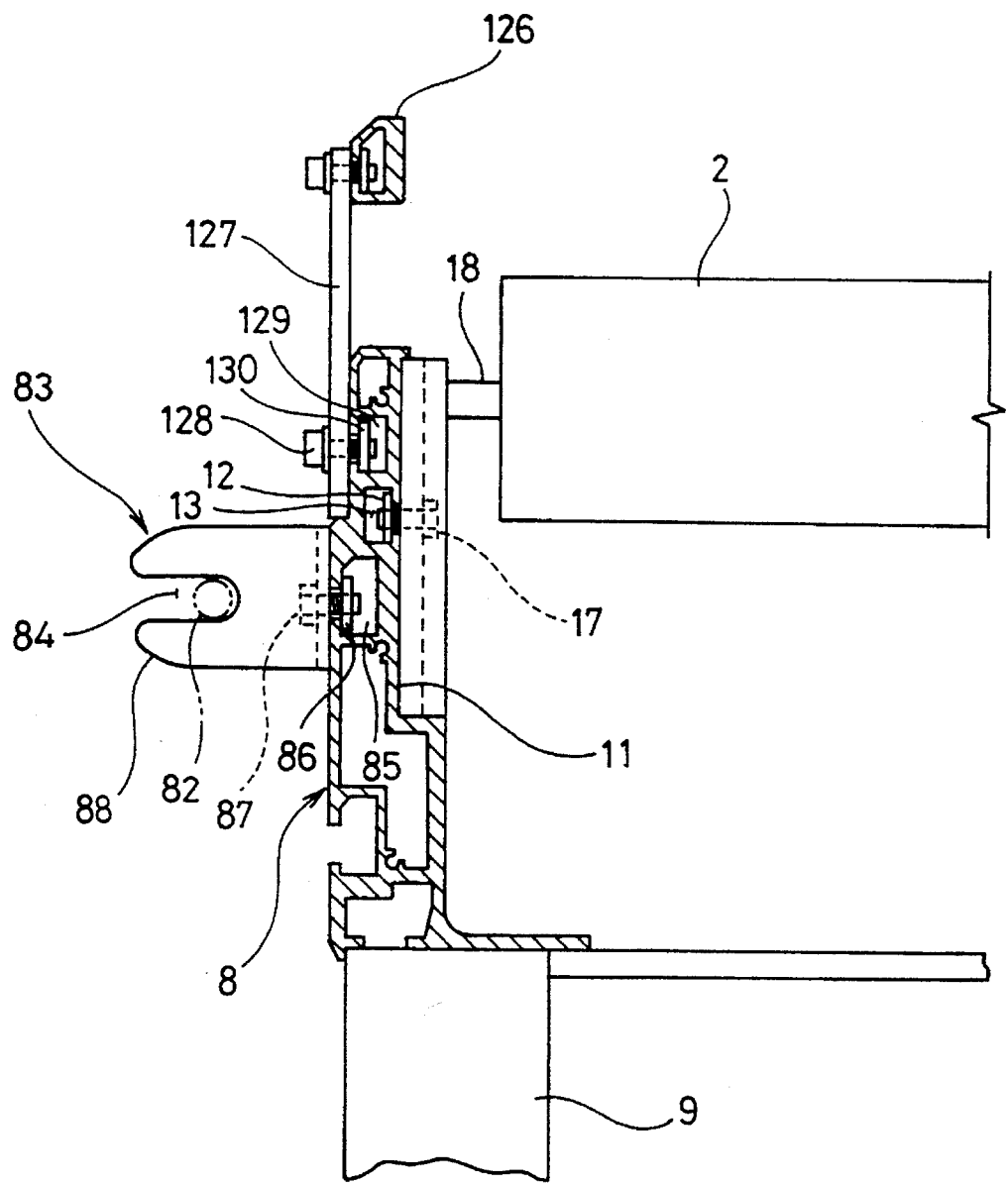
FIG. 13 is an enlarged view of frame structure on the other side of the conveyer unit according to the invention.

As shown in FIG. 20, in accordance with the choice of the operator, a pair of guide plates 126 may be provided in the upper longitudinal direction of both side frames 8 of the conveyer unit 1 and across both side frames 8 in order to prevent load 52 from falling out of either side of the rollers 2 or the conveying terminal. As shown in FIG. 13 for example, these guide plates 126 are respectively secured to both side frames 8 by means of a plurality of brackets 127, bolts 127, and tap plates 130 secured inside of dove grooves 129 of both side frames 8.

Detachable guide

Figure 22:
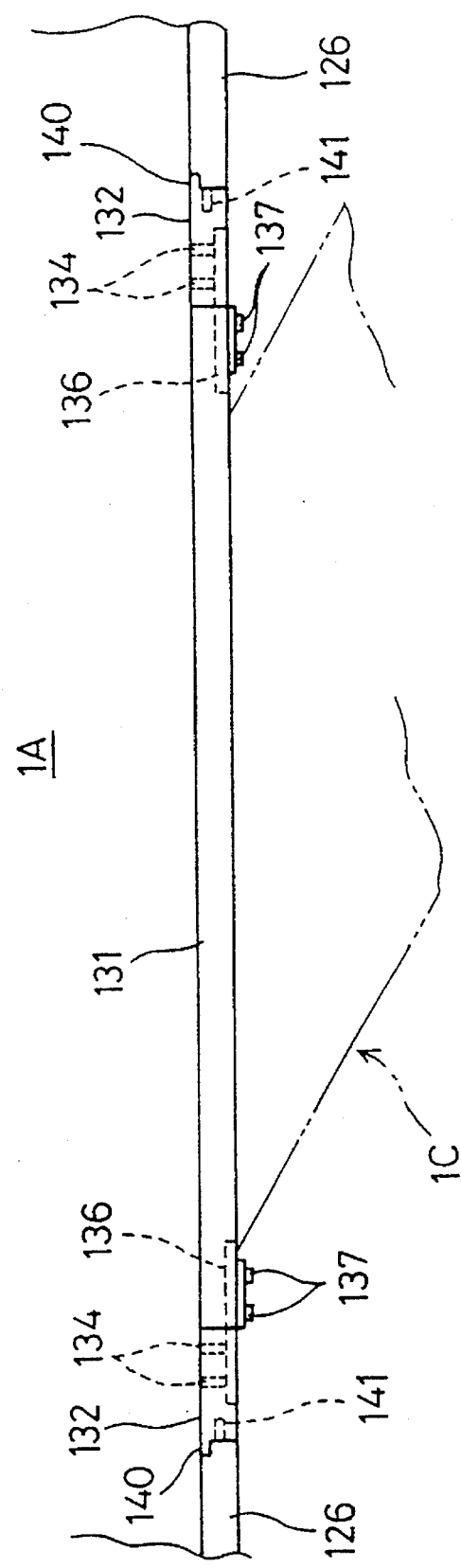
FIG. 22 is a plan view of a guide member installed to the connection device for interlinking a conveyer unit with a branched conveyer unit.
Figure 23:
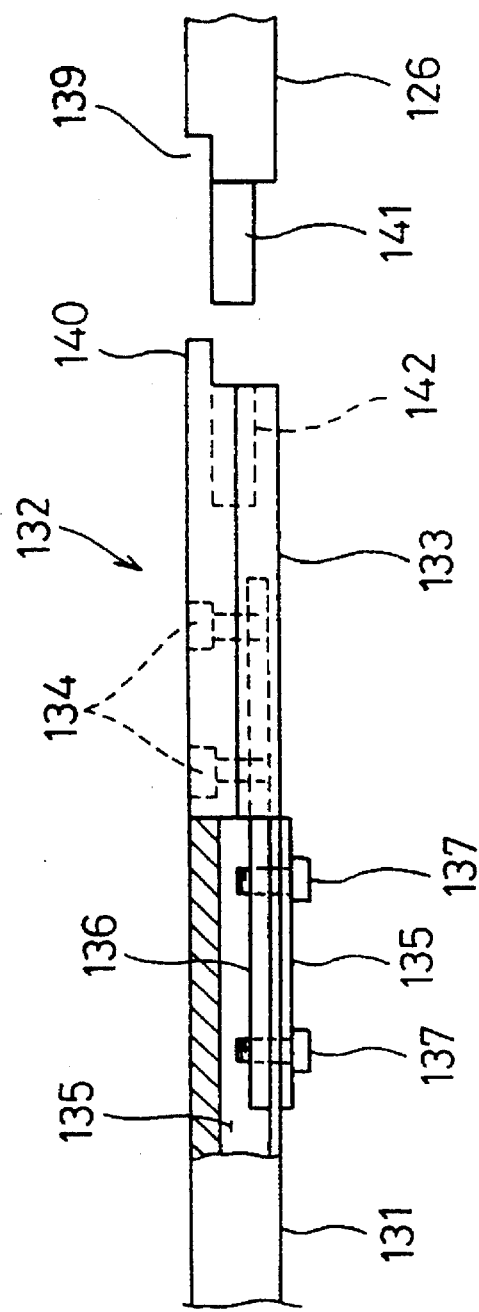
FIG. 23 is a plan view of an engageable/disengageable guide fixing member.
Figure 24:
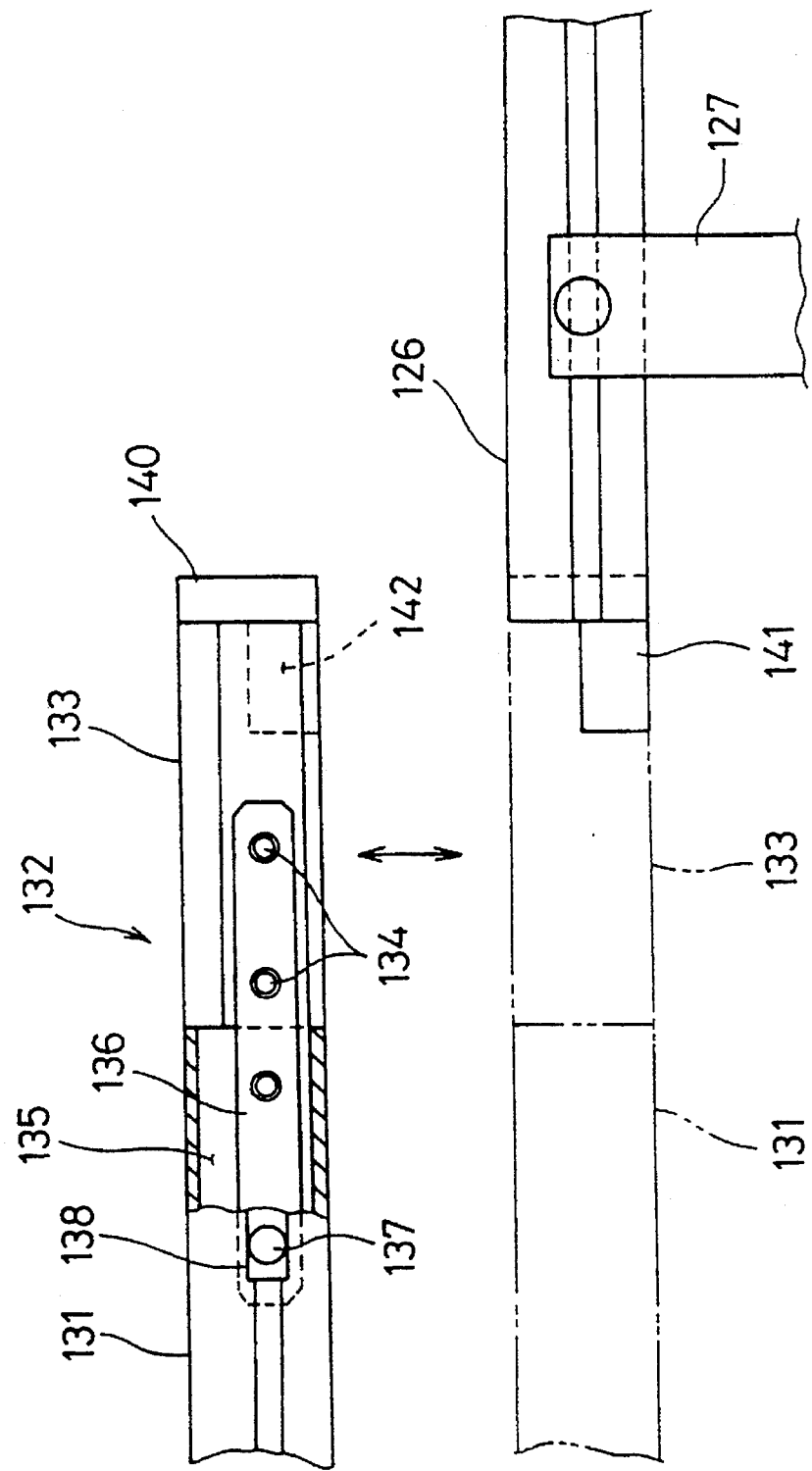
FIG. 24 is a lateral view of the guide fixing member.

When setting the above-referred guide plates 126, as shown in FIGS. 22 through 24, a detachable guide plate 131 is secured to the juncture between the roller conveyer 1A and the junction conveyer 1C on the side of the roller conveyer 1A. The detachable guide plate 131 is secured to the guide plates 126 of both-side frames 8 of the roller conveyer 1A via a pair of fixing members 132. More particularly, each fixing member 132 consists of a main body 133 and a tap plate 136 having an end being secured to the main body 133 and the other end inserted in a: dove groove 135 of the detachable guide plate 131. The fixing members 132 are respectively secured to both ends of the detachable guide plate 131 by securing the tap plate 136 with a bolt 137 and a washer 138. A pair of coupling members 140 engageable with and disengageable from corresponding grooves 139 formed in the vertical direction on the edge surface of the guide plates 126 are respectively formed on the lateral surfaces of both ends of the main body 133 in the vertical direction. A pair of holes 142 are formed at both ends of the main body 133 for accommodating a pair of projections 141 formed at the tip ends of the opposite guide plates 126.

Operation

Figure 11:
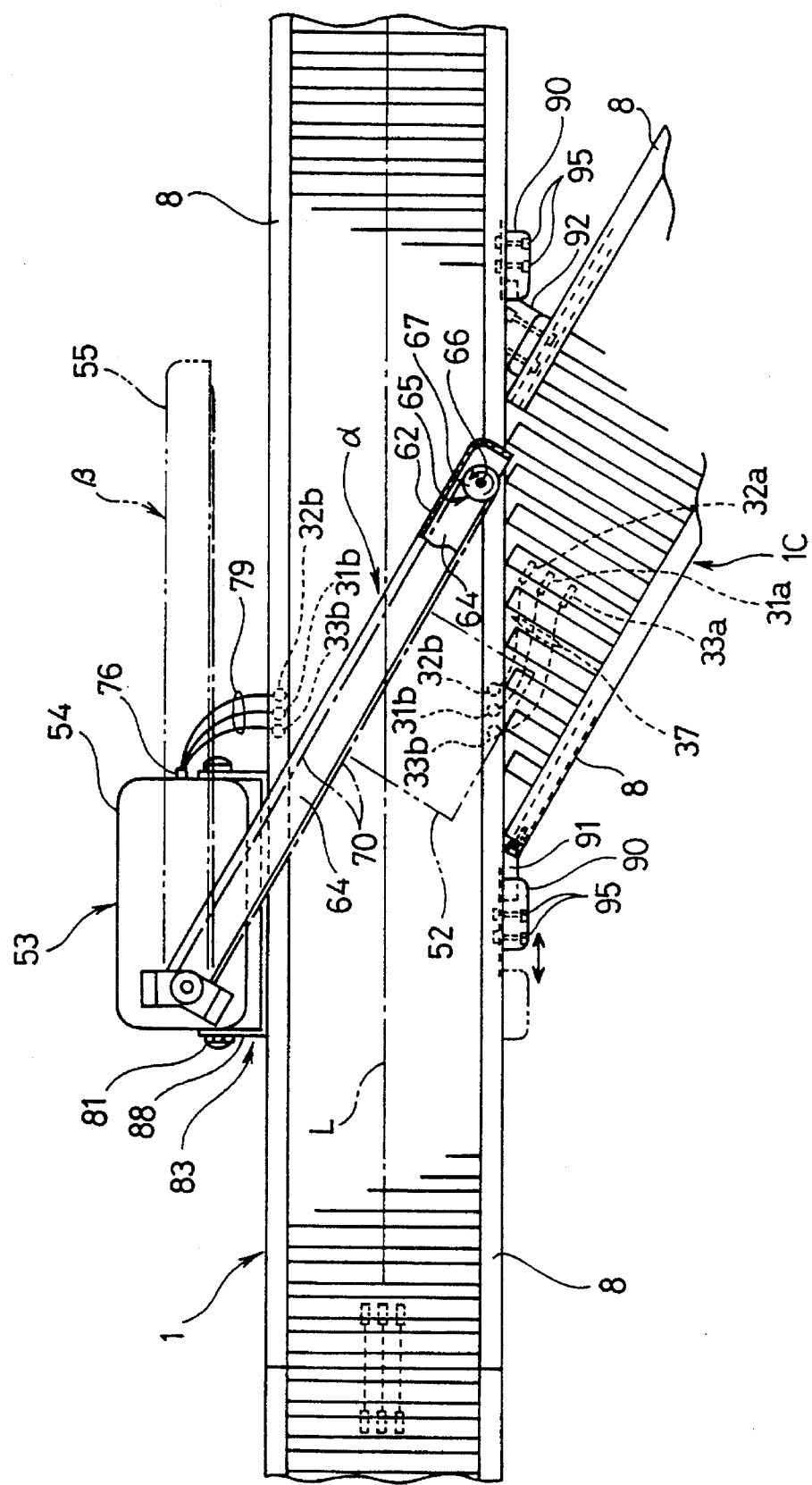
FIG. 11 is a plan view of the branching device installed to the improved conveyer unit according to the invention.
Figure 12:
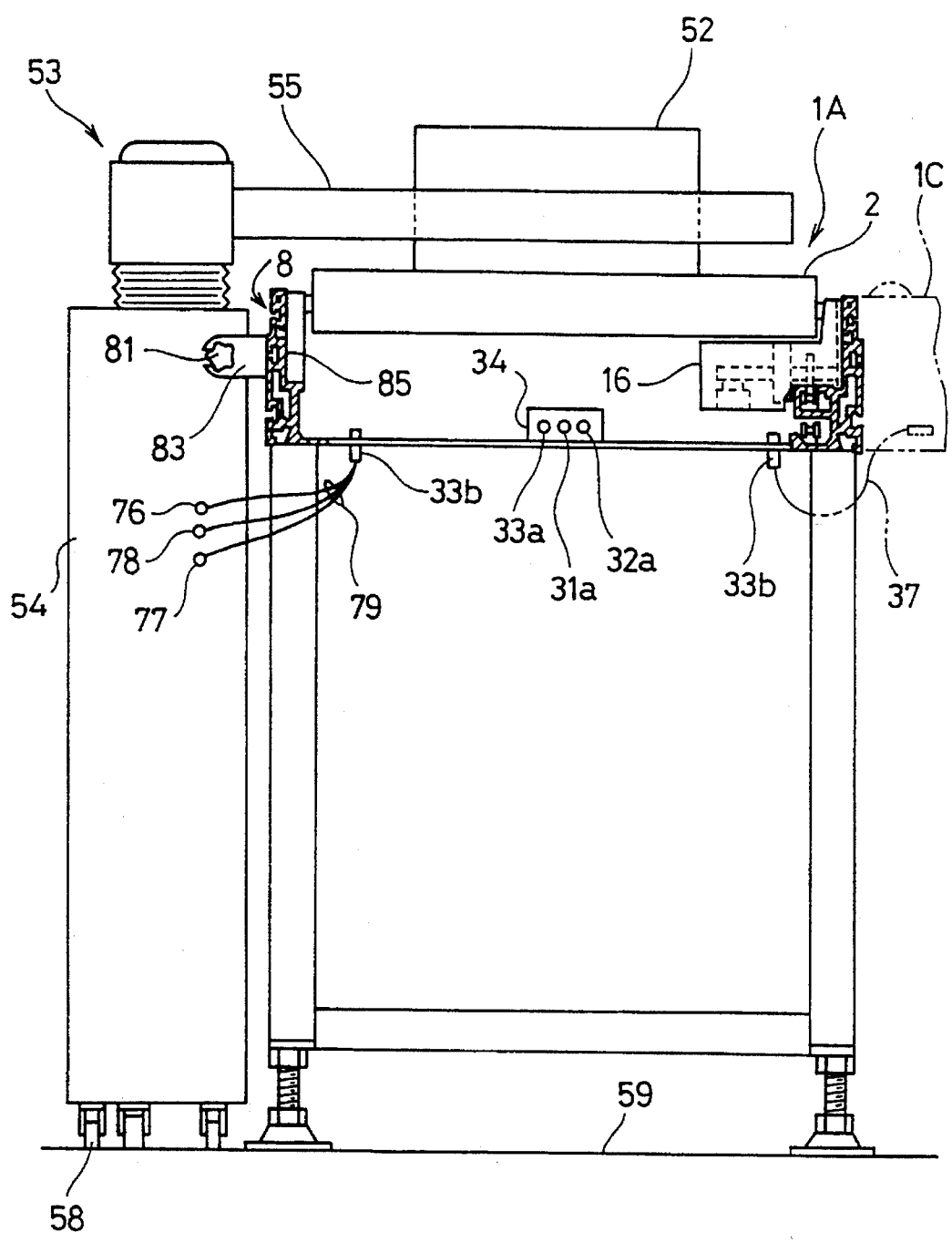
FIG. 12 is a cross-sectional view of the branching device installed to a lateral surface of the conveyer unit according to the invention.

Operation of the inventive conveyer unit featuring the above structural arrangement is described below. As shown in FIG. 6, when connecting a plurality of conveyer units 1 in the longitudinal direction, the above-referred ready access terminals 31a, 32a, and 33a, in the longitudinal end of each conveyer unit 1 are linked with each other via cables 36. By virtue of this linkage, power-supply lines 27, signal input/ output lines 28, and air-supply ducts 29, of adjoining conveyer units 1 can mutually be linked with each other. When branching out or join a plurality of conveyer units 1 with each other, a junction conveyer 1C is connected to one side of the conveyer unit 1. The above-referred branching device 53 is connected to the other side of the conveyer unit 1. Next, as shown in FIG. 11, those ready access terminals 31b, 32b, and 33b at the lateral end of the conveyer unit 1 are respectively linked via cables 36 with those ready access terminals 31a, 32a, and 33a at the longitudinal end of the junction conveyer 1C, thus making it possible for the conveyer unit to mutually link the power-supply lines 27, the signal input/output lines 28, and the air-supply ducts 29 of the conveyer unit 1 with the corresponding power-supply lines 27, signal input/output lines 28, and the air-supply ducts 29 of the junction conveyer 1C. In addition, by virtue of the interlinkage between those ready access terminals 31b, 32b, and 33b at the other end in the lateral direction of the conveyer unit 1 and those ready access terminals 76, 77, and 78 of the branching device 53 via cables 79, the power-supply lines 27, the signal input/output lines 28, and the air-supply ducts 29 of the roller conveyer 1A and the branching device 53 commutatively be linked with each other. Since the mechanism according to the invention dispenses with those steps for discretely setting the power-supply lines 27, signal input/ output lines 28, and the air-supply ducts 29 along the conveying unit 1 and the branching device 53, even such an extremely complex conveying line L can easily be formed. The complex conveying line L can readily be changed merely by restoring linkage between the power-supply lines 27, the signal input/output lines 28, and the air-supply ducts 29 via cables 36, 37, and 79 after properly relocating the conveyer unit 1 and the branching device 53. This in turn effectively saves labor cost and time otherwise needed for changing the setting positions of the power-supply lines 27, the signal input/output lines 28, and the air-supply lines 29 independent of the conveyer unit 1 and the branching device 53. Therefore, locational change of the conveying line L can easily be implemented. This in turn leads to the reduced cost and the contraction of the working period needed for relocating the conveyer unit.

Figure 14:
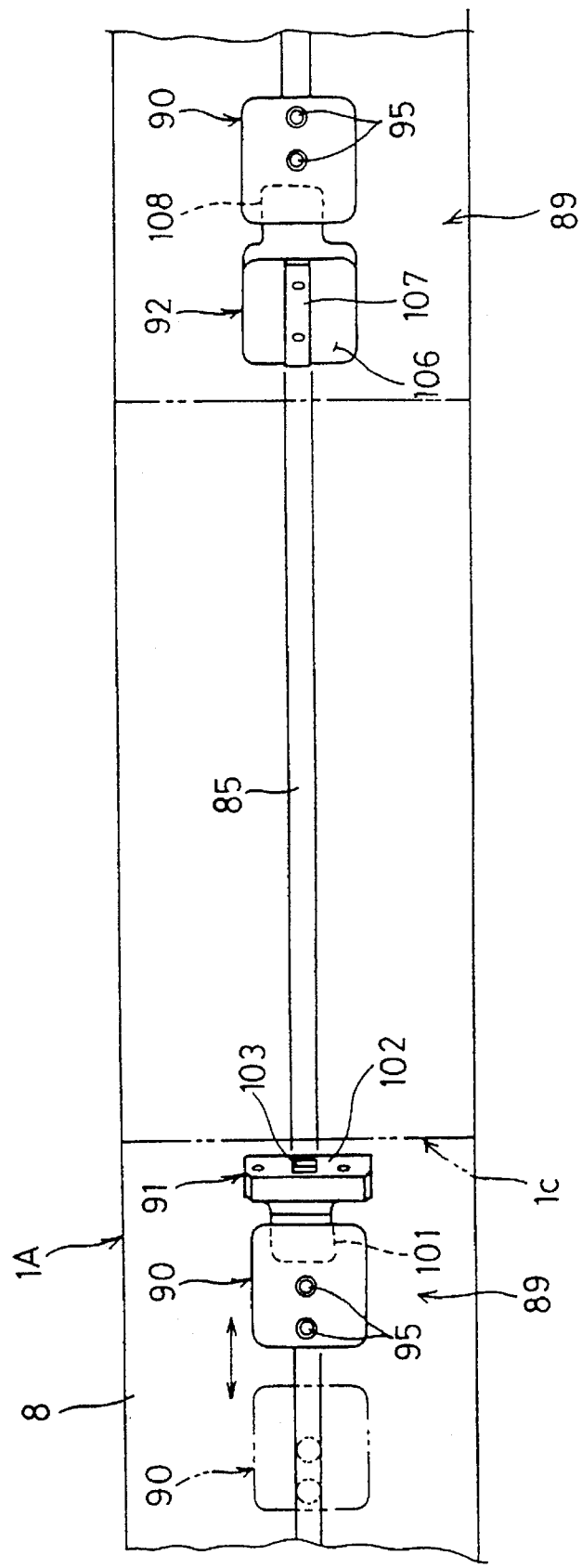
FIG. 14 is a lateral view of the connection device interlinking each conveyer unit with each branching device.
Figure 15:
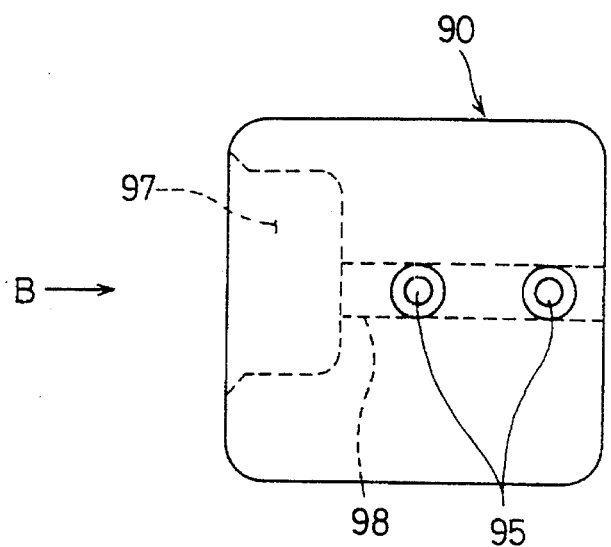
FIG. 15 is a front view of the connection device.
Figure 16:
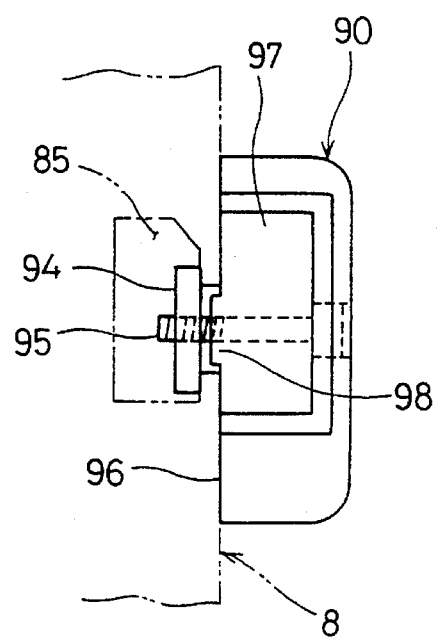
FIG. 16 is a front view of the connection device along the arrowed direction B shown in FIG. 15.
Figure 17:
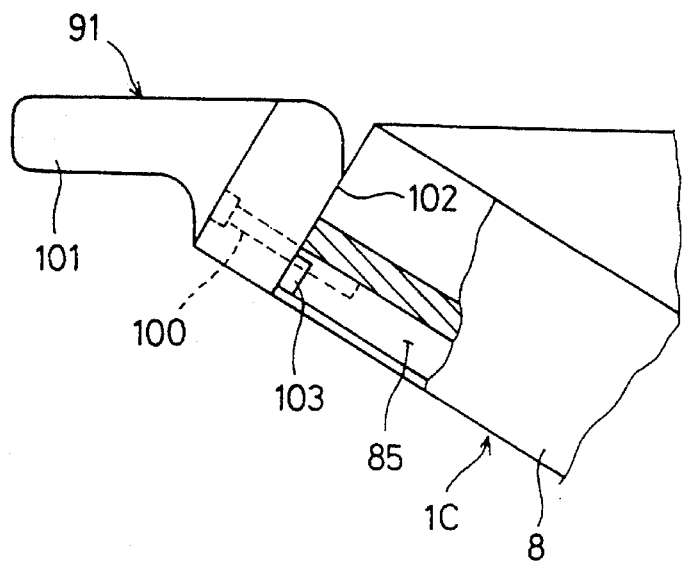
FIG. 17 is a front view of another connection device.
Figure 18:
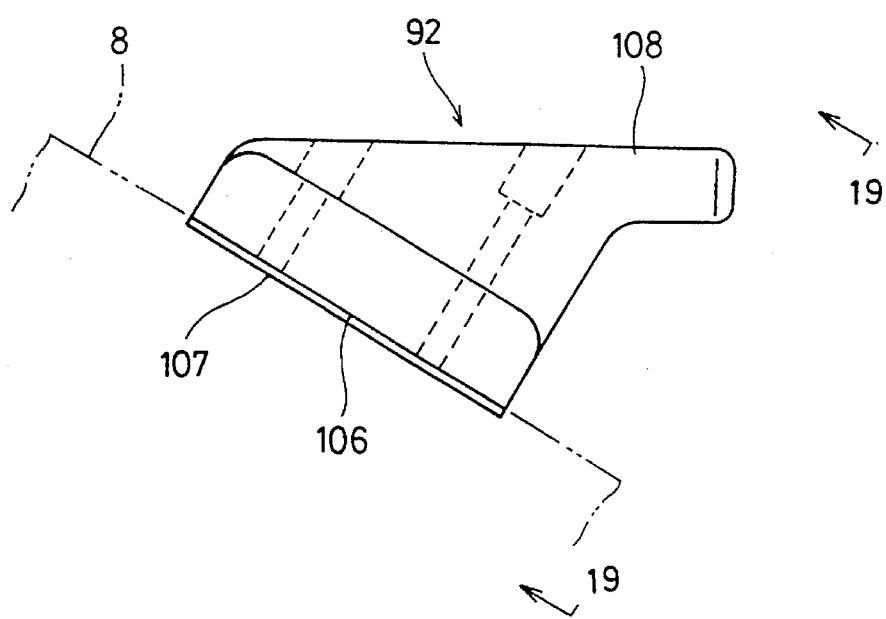
FIG. 18 is a front view of another connection device.
Figure 19:
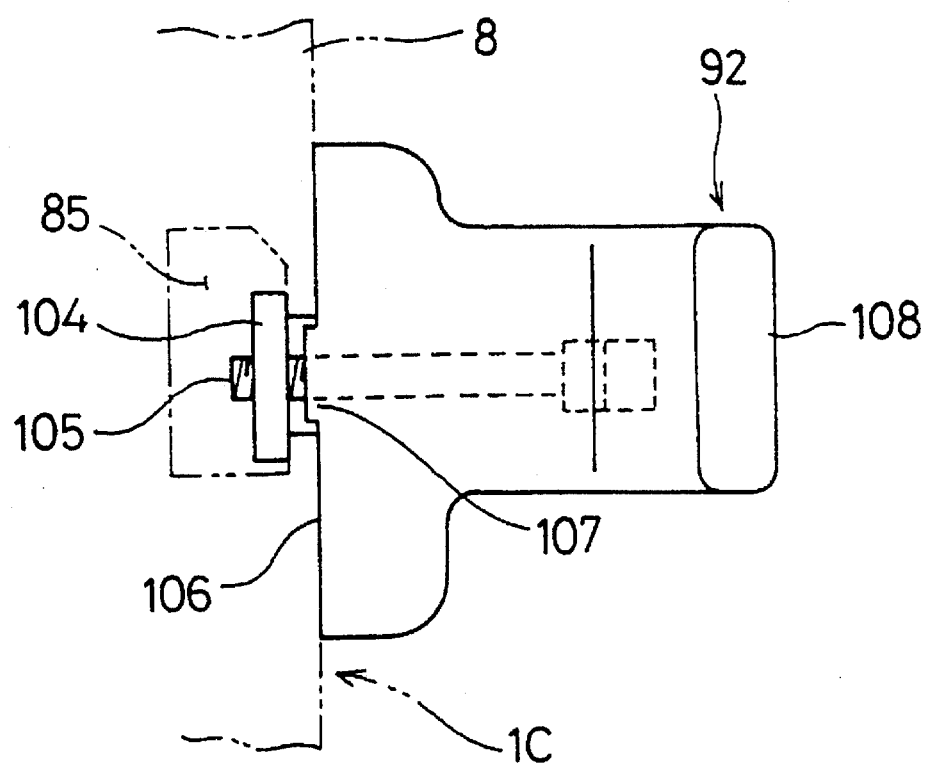
FIG. 19 is a front view of the connection device along the arrowed direction C shown in FIG. 18.

When linking the junction conveyer 1C with the conveyer unit 1, as indicated by imaginary lines shown in FIGS. 11 and 14, initially, a bolt 95 securing one of connection blocks 90 is loosened to permit this connection block 90 to leave the other connection block 90 by causing the former connection block 90 to slidably shift itself via a guiding dove groove 85 and an engageable projection 98. Next, a pair of joints 91 and 92 secured to the tip of the junction conveyer 1C are respectively brought into contact with external lateral surfaces of the frame 8 on the side of the conveyer unit 1, and then, an engaging member 108 of the joint 92 is inserted in an engaging hole 97 of the other connection block 90. Next, as indicated by solid lines shown in FIGS. 11 and 14, one of the connection blocks 90 is slidably shifted to a position close to the other connection block 90, and then, an engaging member 101 of the joint 91 is inserted in an engaging hole 97 of the other connection block 90. Next, the bolt 95 is fastened to secure the former connection block 90 to the frame 8 on the side of the conveying unit 1. In consequence, the junction conveyer 1C is positioned by means of these connection blocks 90 so that the junction conveyer 1C can slidably be linked with the conveyer unit 1.

In the event that the above-referred guide plates 126 are secured to the conveyer unit 1, then, as indicated by solid lines shown in FIG. 24, the detachable guide plate 131 is lifted before it is upwardly disengaged from the conveyer unit 1 in conjunction with the fixing members 132 on both sides. By way of removing the detachable guide plate 131 from the juncture, load 52 can be conveyed between the conveyer unit 1 and the junction conveyer 1C.

In order to disengage the junction conveyer 1C from the conveyer unit 1, as indicated by imaginary lines shown in FIGS. 11 and 14, initially, the bolt 95 is loosened to permit one of the connection blocks 90 to leave the other connection block 90, and finally, the engaging member 101 of the joint 91 and the other engaging member 108 of the joint 92 are respectively disengaged from the engaging holes 97 of the connection blocks 90. Owing to this structural arrangement, connection and disengagement of the junction conveyer 1C can easily and quickly be implemented. In the event that the guide plates 126 are provided, as indicated by imaginary lines shown in FIGS. 11 and 14, the detachable guide plate 131 is inserted between both side guide plates 126 from the upper position together with a pair of fixing members 132. While this process is underway, a pair of engaging members 140 are respectively engaged with the corresponding engaging grooves 139, and therefore, the detachable guide plate 131 is secured between the both side guide plates 126 via the guidance of the engaging groove 139. Since the engageable projection 141 at the tip end of the guide plate 126 is inserted in an engaging hole 142 of the fixing member 132 at a lower position, the detachable guide plate 131 is positioned and secured in the longitudinal and lateral directions via the fixing member 132. This arrangement enables operator to easily install and remove the detachable guide plate 131. In consequence, load 52 can properly be conveyed over the rollers 2 of the conveyer unit 1 in the state being guided by the guide plates 126 and the detachable guide plate 131 without falling off or being crowded out from either side thereof.

The conveyer unit 1 and the junction conveyer 1C in linkage with each other via the above mechanism respectively execute those operations described below.

Initially, in response to an instruction signal from the controller unit 6, the motor 4 is turned ON to rotate the endless chain 24 to activate the transmission roller 22 to rotate itself in conjunction with the sprockets 25. Simultaneously, the switching valve 30 is opened on receipt of an instruction signal from the controller unit 6 in order to activate operation of the pneumatic cylinder 23 by applying compressed air from the air-supply ducts 29 so that the supporting shaft 20 can ascend itself. This causes the transmission roller 22 to come into contact with the rollers 2 in order to forcibly rotate all the rollers 2 to convey load 52 forward. When the switching valve 30 is closed, compressed air stored in the pneumatic cylinder 23 is externally discharged to inversely operate the pneumatic cylinder 23 so that the supporting shaft 20 can descend. This causes the transmission roller 22 to leave the rollers 2. In consequence, all the rollers 2 idly rotate, thus terminating forcible rotation of the rollers 2.

Operation for conveying load 52 is executed in accordance with the operating sequence described below. For example, when conveying load 52 from the upstream side to the downstream side of the conveyer unit 1 along conveying route L, the controller 57 of the branching device 53 exchanges signals with the controller unit 6 of the conveyer unit 1, and then, based on the exchanged data signals, the controller 57 of the branching device 53 controls drive operation of the pneumatic cylinder 56 and the motor 72. More particularly, subsequent to suspension of the drive operation of the motor 72, movement of the belt conveyer of the arm 55 is suspended. In addition, subsequent to the contraction of the piston rod 56b of the pneumatic cylinder 56, as indicated by imaginary line shown in FIG. 11, the arm 55 swings itself up to opening position β by way of pivoting on the vertical axis 68. In consequence, the conveying route L is opened to permit load 52 to be conveyed from the upstream side to the downstream side of the conveying unit 1.

When conveying load 52 by branching out or joining it between the conveyer unit 1 and the branching device 53, he controller 57 of the branching device 53 elongates the piston rod 56b of the pneumatic cylinder 56 so that the motor 72 can be driven. As a result, as indicated by solid line shown in FIG. 11, the arm 55 swings itself up to closing position α by way of pivoting on the vertical axis 68. Therefore, the conveying route L is shut off by the arm 55. This causes the drive roller 69 to activate its own rotation to operate the belt conveyer 65 so that the belt 70 can be rotated in the predetermined direction. In consequence, the load 52 in transit comes into contact with the belt conveyer 65 of the arm 55, and then the load 52 shifts itself along the belt conveyer 65 before eventually being transferred between the conveyer unit 1 and the branched conveyer unit 3.

When disengaging the branching device 53 from the conveyer unit 1, initially, cables 79 are drawn out of the ready access terminals 76, 77, and 78, and then the fastening bolt 81 is loosened before being pulled out of a pair of slits 84 towards operator side. After being disengaged, the branching device 53 can freely shift itself on the floor 59 via casters 58.

As is clear from the above description, since the branching device 53 is discretely provided independent of the conveyer unit 1, the operator can readily install additional branching devices 53 at desired locations, and yet, easily relocate them as required. Since the main body 54 is equipped with a plurality of casters 58, all the branching devices 53 can be shifted to desired locations very easily. Furthermore, since each branching device 53 can be secured to the conveyer unit 1 with the fastening bolt 81, the branching device 53 can be prevented from suddenly shifting itself because of vibration. In addition, since the position of the fixing bracket 83 can optionally be shifted in the longitudinal direction along the dove groove 85 of the side frame 8 of the conveyer unit 1, after relocating and adjusting the set position, operator can readily secure the branching device 53 to the conveyer unit 1.

When operating the conveying line L comprising a plurality of conveyer units 1 including a junction conveyer 1C and branching devices 53 connected thereto, power-supply lines 27 respectively feed power to the motors 4 and 72 and the controller units 6 and 57 of the conveyer units 1 and the branching devices 53. Signal input/output lines 28 respectively exchange data signals between adjoining conveyer units 1 and branching devices 53. Air-supply ducts 29 respectively feed compressed air to pneumatic cylinders 23 and 56 of the conveyer units 1 and the branching devices 53. Based on the data signals exchanged between adjoining conveyer units 1 and the branching devices 53, the controller units 6 and 57 respectively activate rotation of the motors 4 and 72 of the conveyer units 1 and the branching devices 53 on the operative conveying route L, and then, the controller units 6 and 57 respectively open the switching valves 30 to forcibly rotate the rollers 2, thus enabling the conveyer line L to properly convey load 52 along the objective conveying route L.

Control method

Control function of the controller 40 of the controller unit 6 is described below.

As described earlier, the controller 40 incorporates a plurality of input/output ports 42a, 42b, 42c, and 42d, corresponding to a plurality of connectors 41a, 41b, 41c, and 41d, of the signal input/output lines provided in the longitudinal and latitudinal directions of the main conveyer structure 3. The controller 40 activates its own identifying function subsequent to interlinkage of the connectors 41.

Figure 25:
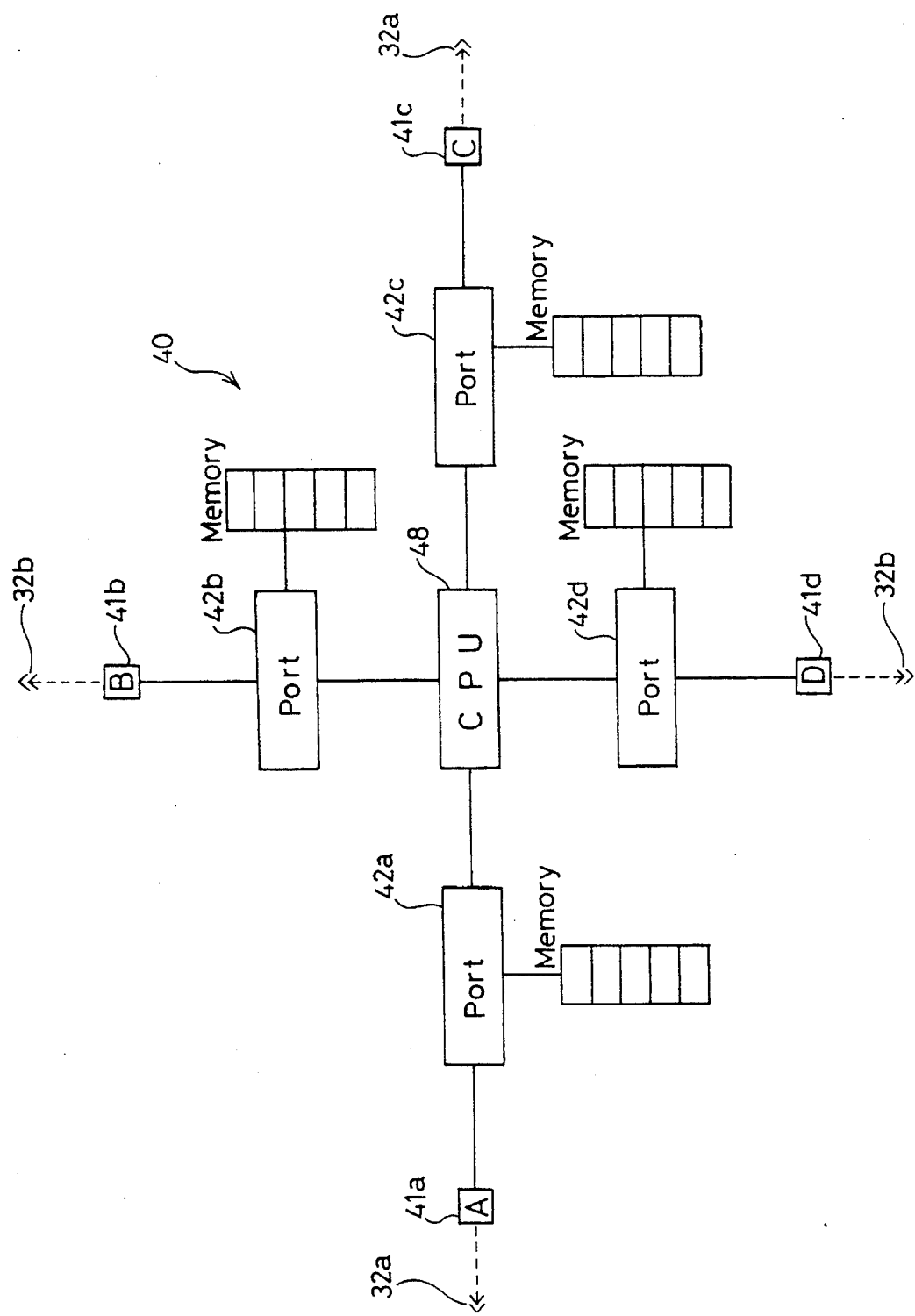
FIG. 25 is explanatory of the operating relationship between memory units and connectors of each conveyer unit.

Assume that the connector A (41a) and another connector C (41c) shown in FIG. 25 are respectively connected to corresponding connectors of the controller 40 of another conveyer unit 1 adjoining in the drive (either forward or backward) direction of the rollers 2, whereas the connectors B (41b) and D (41d) are discretely connected to corresponding connectors of the controller 40 of another conveyer unit 1 of the junction conveyer 1C and the connectors 77 of the controller 57 of the branching device 53.

Figure 26:
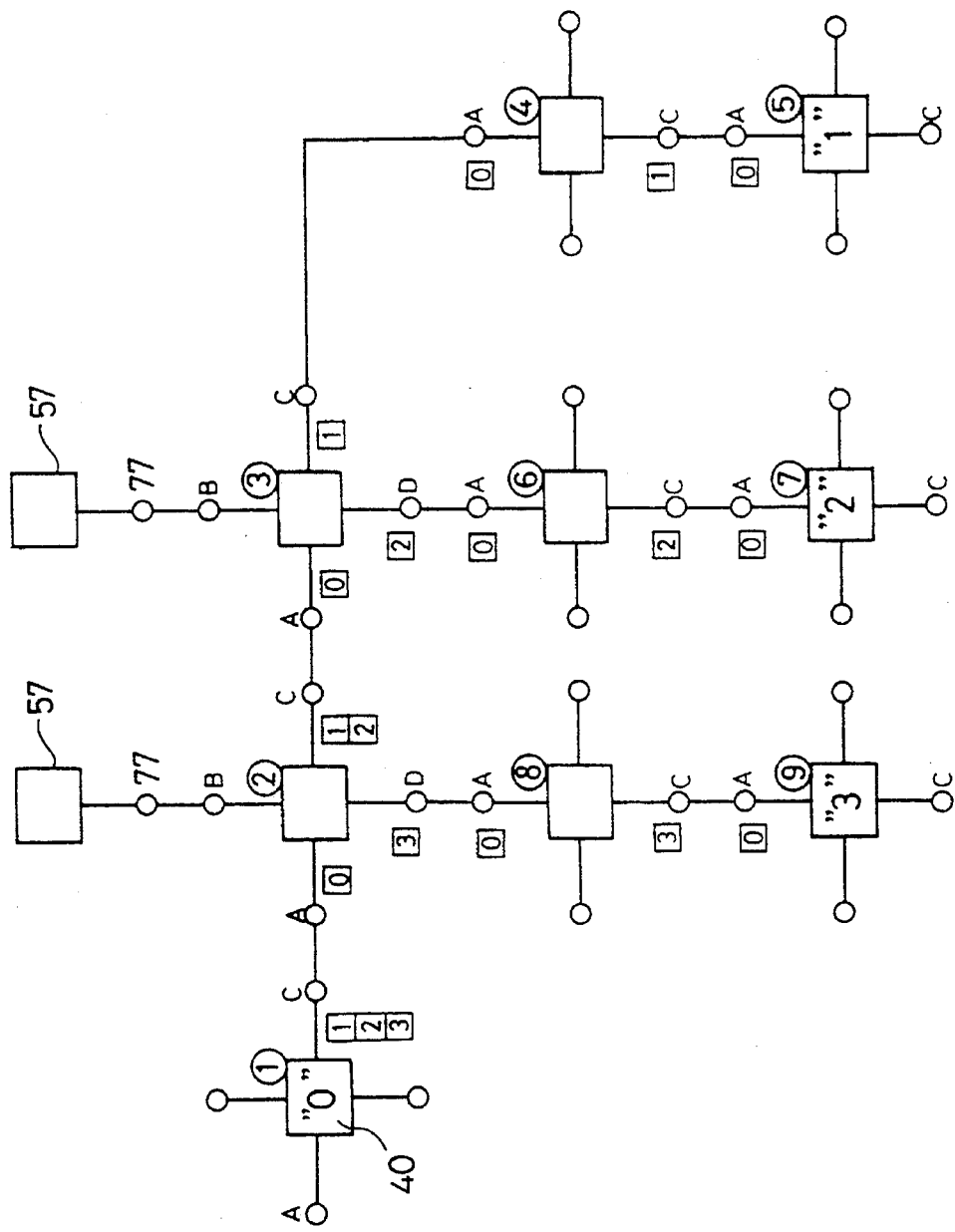
FIG. 26 is a detailed connection diagram of each connector of the inventive conveyer line comprising a plurality of conveyer units.

FIG. 26 designates the state of the connection of 1 those connectors 41 (A,B,C,D) of respective conveyer units shown in FIG. 8. The controller 40 of an intermediate conveyer unit 1 designated as (3) in FIG. 8 identifies that branching and joining processes are executed via the conveyer unit (3) subsequent to the linkage of the connector D with the connector A of the junction conveyer 1C(6) solely being available for the branching and joining processes.

Connectors of the controller 57 of the branching device 53 are respectively linked with the connectors B of the controllers 40 of the conveyer units (2) and (3). On receipt of the drive signal from the controllers 40, the controller 57 of the branching device 53 shifts the swingable arm 55 to a position right above the main conveyer structure 3. On receipt of the return signal, the controller 57 drives the arm 55 out of the main conveyer structure 3.

Referring to the structure of the conveyer line thus far described, method of controlling the conveyer unit embodied by the invention is described below.

After completing assembly of the conveying facilities, all the ready access terminals 31, 32, 33, 76, 77, and 78, provided for the adjoining conveyer units 1 and the branching devices 53 are respectively interlinked with each other via cables 36, 37, and 79. Next, voltage of the DC power-supply source 39 is regulated by feeding power to the power-supply lines 27. Simultaneous with the conduction of power from the DC power-supply source 39, the controller 40 lights up the power-ON display lamp 22 of the operating box 51.

Figure 27:
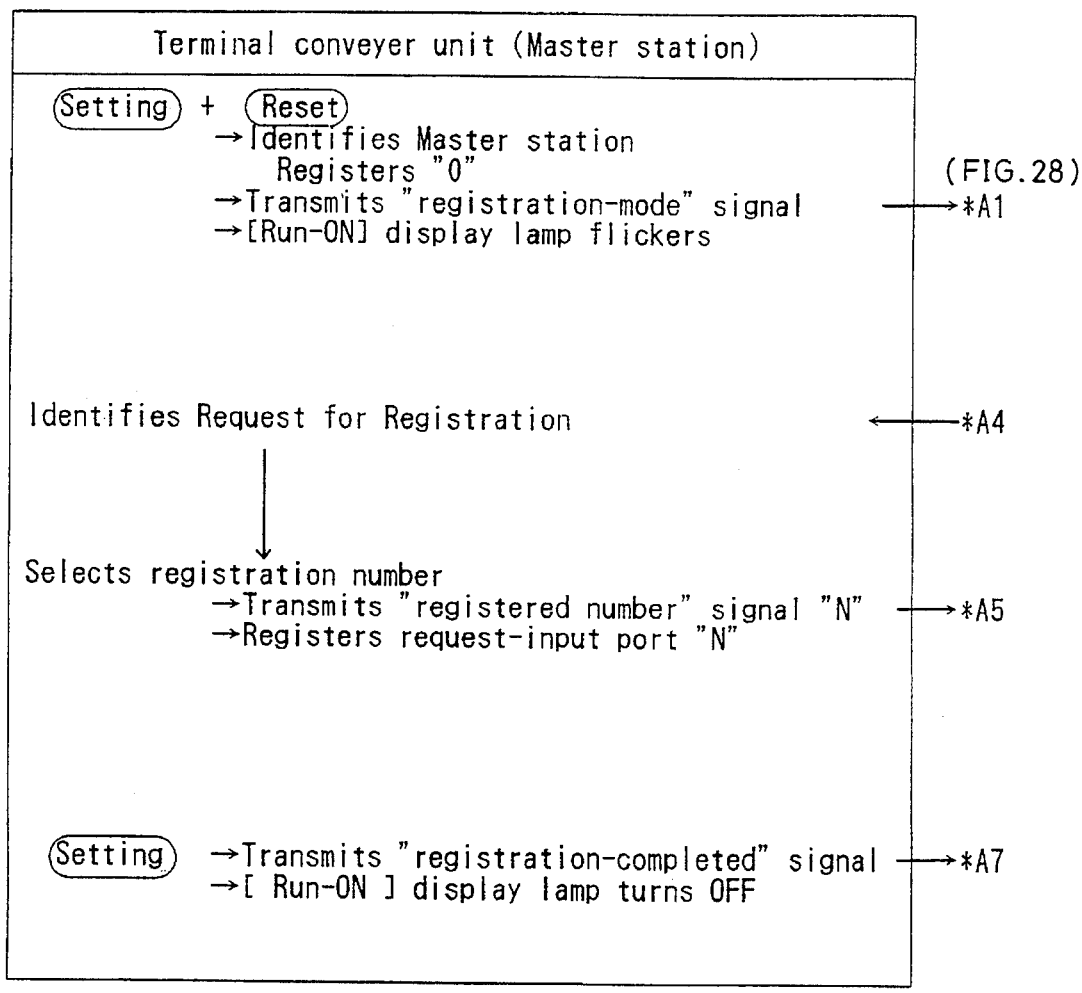
FIGS. 27 to 29 are explanatory of operating sequence for registering conveyer units.
Figure 28:
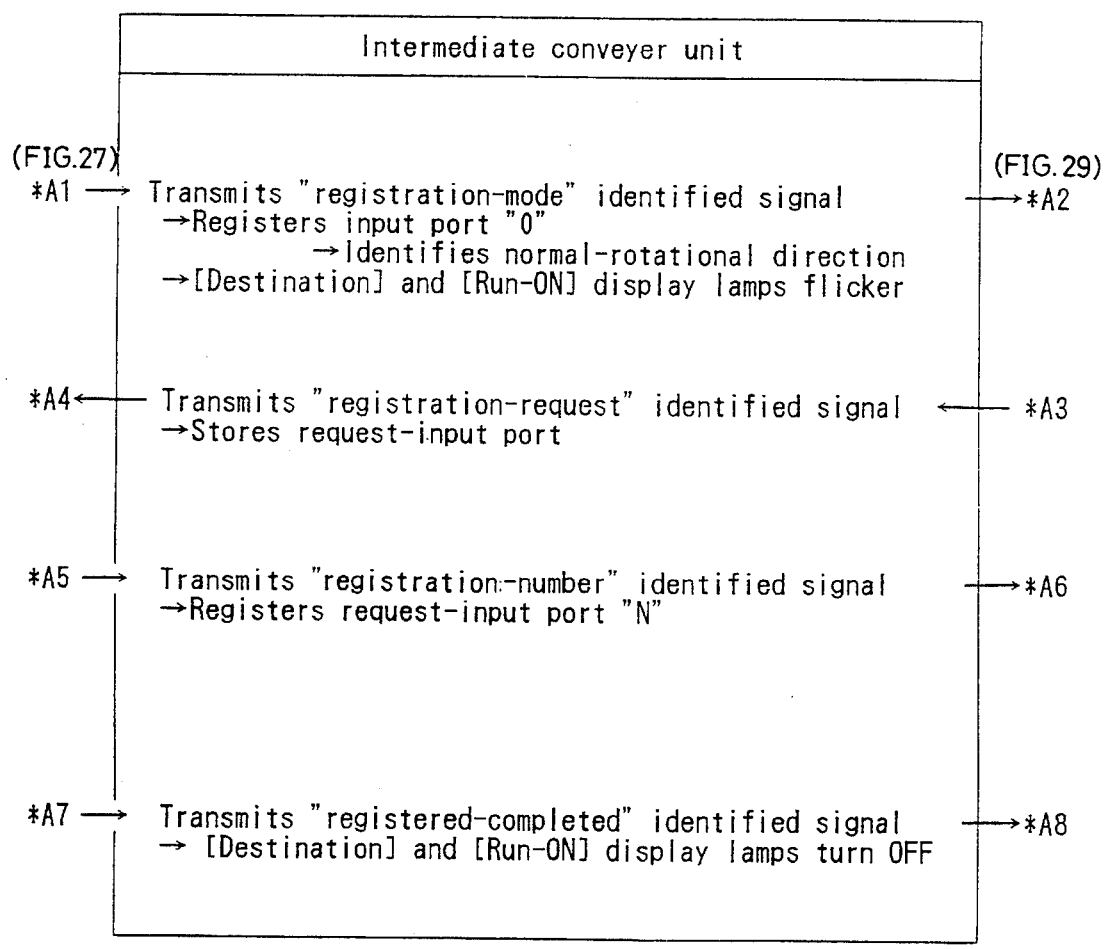
Figure 29:
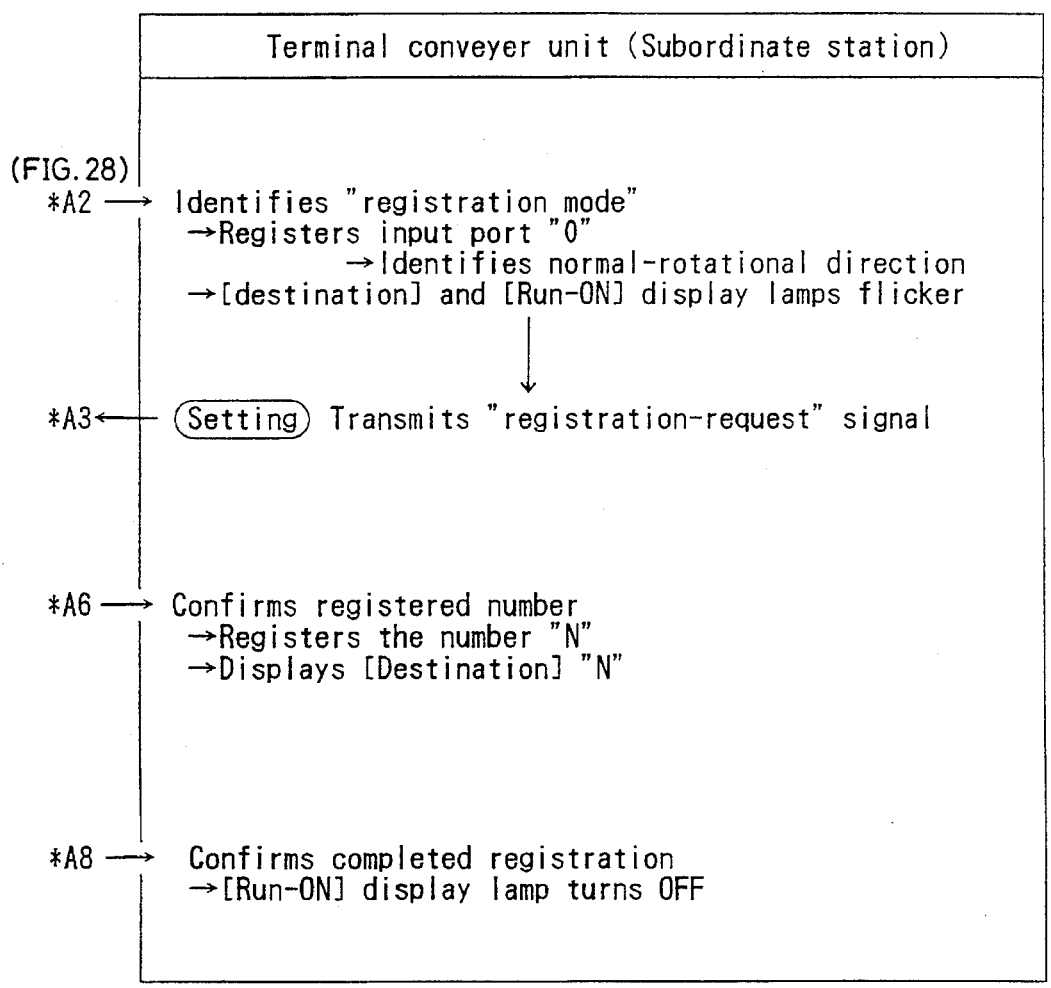

Next, a predetermined number is registered in a conveyer unit 1 at the terminal of the assembled line, and then, an initialization process is executed against the terminal conveyer unit 1 in order that it can correctly identify the conveying route. Prior to the execution of the initialization process, any of the assembled conveyer units 1 is not yet designated to become a "master station". In other words, any of these conveyer units 1 may be designated to become a master station. Next, process for registering proper number to the terminal conveyer unit 1 and the method to have this conveyer unit 1 identify the conveying route are described below referring to FIGS. 27 to 29.

Assume that the conveyer unit (1) is designated as the master station. Initially, the operator simultaneously depresses a setting switch 112 and a reset switch 113 of the operating box 51 of the conveyer unit (1). On receipt of operating signal from the setting switch 112 and the reset switch 113, the controller 40 of the conveyer (1) identifies that the conveyer unit (1) is the master station, and then registers "0" as the registered number of the conveyer unit (1). Then, the controller 40 outputs a "registered mode" signal from all the I/O ports 42, and simultaneously, it displays that the "registered mode" has been entered by flickering a display lamp 117 while the control operation is underway.

On receipt of the "registered mode" signal, the controller 40 of an adjoining intermediate conveyer unit (2) transmits the "registered mode" signal to the controllers 40 of adjoining conveyer units 1 from all the remaining I/O ports 42. The "registered mode" signal is then sequentially transferred to all the conveyer units 1 via controllers 40 of the terminal conveyer units (5), (7), and (9). As shown in FIG. 26, on receipt of the "registered mode" signal, the controller 40 registers the master station number "0" in own memory, and then defines that the driven direction of the rollers 2 from the "0"-registered I/O port A to other I/O port C is the forward-rotational direction. At the same time, the controller 40 displays that the "registered mode" is actually underway by flickering a digital display unit 120 and a "Run-ON" display lamp 117 of the operating box 51 of the destination conveyer unit 1.

Next, the operator requests registration of a specific number by depressing the setting switches 112 of the operating boxes 51 of terminal conveyer units (5), (7), and (9). For example, when the terminal conveyer unit (5) receives the operating signal input via the setting switch 112, the registration-request signal is transmitted from the "0"-registered I/O port A to the controller 40 of the adjoining intermediate conveyer unit (4). Then, the controller 40 of the conveyer unit (4) transfers this registration-request signal to the controller 40 of the adjoining conveyer unit (3) via the "0"-registered I/O port A. The registration-request signal is sequentially transferred to adjoining conveyer units until eventually arriving at the controller 40 of the master-station conveyer unit (1). The controller 40 of the master-station conveyer unit (1) stores the I/O port C that received the registration request signal as the request input port.

After identifying the input of the registration-request signal, the controller 40 of the master-station conveyer unit (1) selects any registerable number not yet being entered such as "1" for example. Then, the controller 40 transmits the registerable number "1", and then registers the number "1" in memory of the request-input port C.

On receipt of the signal designating the registered number "1", the controller 40 of an adjoining intermediate conveyer unit (2) transfers the registered number "1" signal to the controller 40 of the conveyer unit (3) adjoining the request-input port C. Then, the registered number "1" signal is sequentially transferred to all the adjoining conveyer units until eventually arriving at the controller 40 of the terminal conveyer unit (5). As shown in FIG. 26, the registered number "1" is registered in memory of the request-input port C. The controller 40 of the terminal conveyer unit (5) registers the number "1" as its own number, and then displays the registered number "1" on a digital display unit 120.

In the same way, after registering proper numbers to other terminal conveyer units (7) and (9), as shown in FIG. 26, proper numbers of terminal conveyer units 1 designated as destination and start of load conveying system are respectively registered in memory units of respective I/O ports.

Next, the operator depresses the setting switch 112 of the operating box 51 of the conveyer unit (1). On receipt of the operating signal from the setting switch 112, the controller 40 of the conveyer unit (1) transmits a "registration-completed" signal from all the I/O ports 42, and simultaneously, the controller 40 of the conveyer unit (1) advises operators that the registration of proper numbers has been completed by way of turning the "Run-ON" display lamp 117 OFF.

On receipt of the "registration-completed" signal, the controller 40 of the adjoining intermediate conveyer (2) transfers the "registration-completed" signal to the controllers 40 of other adjoining conveyer units 1 via all the remaining I/O ports. Then, the "registration-completed" signal is sequentially transferred to all the adjoining conveyer units 1 until eventually being transmitted to the controllers 40 of the terminal conveyers (5), (7), and (9).

Next, all the controllers 40 of all the conveyer units 1 prepare a conveying table for designating the direction of the rotation of the rollers 2 and the presence or absence of the drive of the branching device 53 based on the registered numbers of the terminal conveyer units 1 serving as destination and start stored in respective memory units of all the I/O ports 42. For example, the conveyer unit (3) prepares a conveying table as per Table 1 shown below. More particularly, since the port A stores "0", the port C stores "1", and the port D stores "2", when load 52 is conveyed from "0" to "1", the rollers 2 are rotated in normal direction. Also, when load 52 is conveyed from "0" to "2", the rollers 2 are rotated in normal direction by way of jointly driving the branching device 53. Conversely, when conveying load 52 from "1" to "0", the rollers 2 are rotated in the reverse direction. When conveying load 52 from "2" to "0", the rollers 2 are rotated in the reverse direction by way of jointly driving the branching device 53. Table 1 represents the above operative relationship. If any conveying data (subject to designation based on the number of the start and destination) not being specified in the conveying Table 1 were present, then, it is identified that the rollers 2 are not operated.

TABLE 1

| START CONVEYER | DESTIN- ATION CONVEYER | DIRECTION OF ROTATION OF ROLLERS | BRANCHING DEVICE OPERATED OR NOT |
| --- | --- | --- | --- |
| 0 | 1 | Normal | Not operated |
| 0 | 2 | Normal | Operated |
| 1 | 0 | Reverse | Not operated |
| 2 | 0 | Reverse | Operated |

Figure 30:
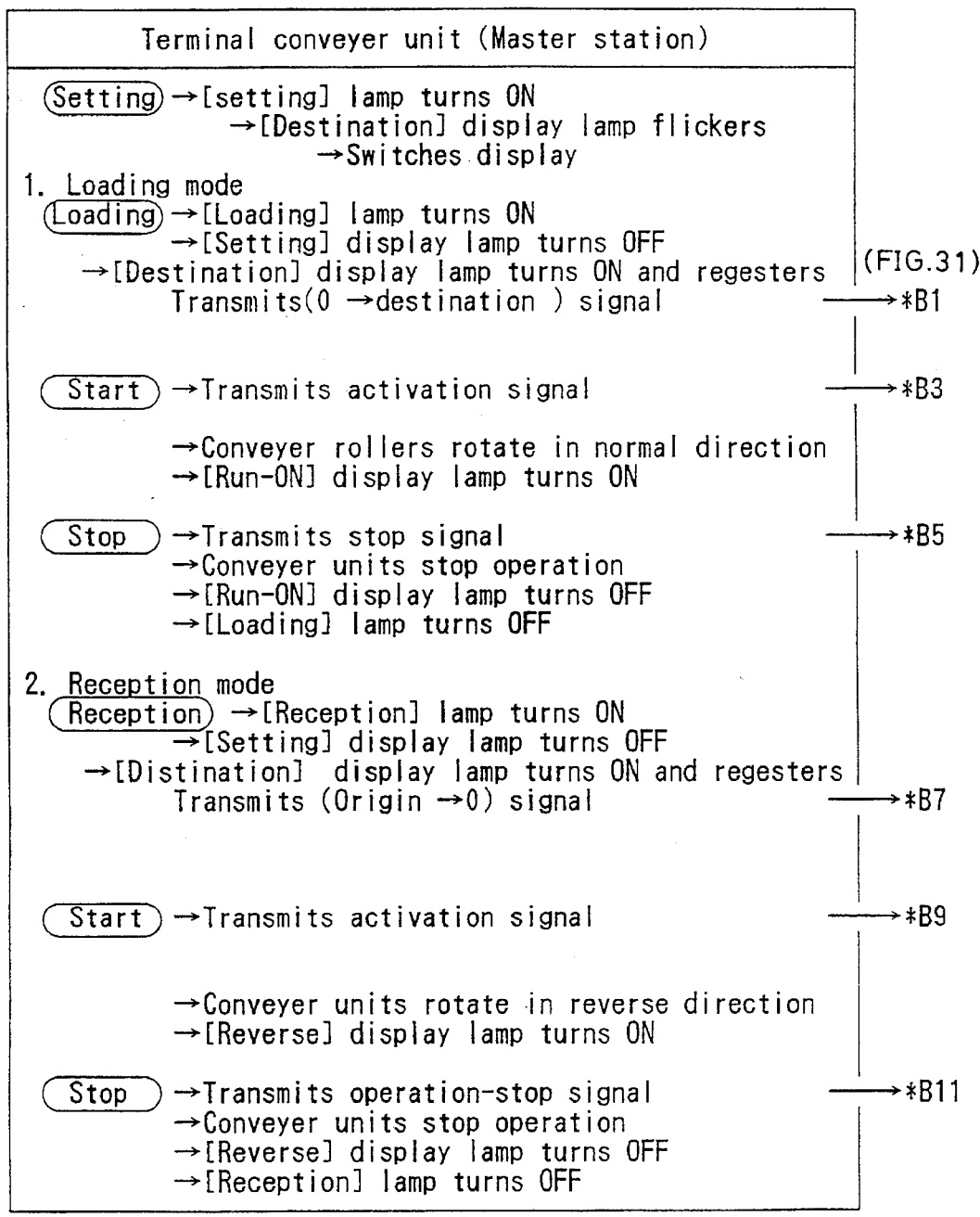
FIGS. 30 to 32 are explanatory of operating sequence for exchanging data signals in the main station of each conveyer unit.

Next, method of conveying load 52 via operation of the operating boxes 51 of the terminal conveyer units (1), (5), (7), and (9) is described below. First, referring to FIGS. 30 to 32, the method of conveying load 52 via operation of the master-station conveyer unit (1) is described below.

First, in order to select destination or start of conveying load 52, the operator depresses the setting switch 112. On receipt of this setting signal, initially, the controller 40 lights up the lamp of the setting switch 112, and then displays the proper number "1" of the registered terminal conveyer unit 1 by way of flickering it on the digital display unit 120. The controller 40 further displays the following registered numbers "2" and "3" by way of flickering them on the digital display unit 120 whenever destination the input setting signals. When the number to be selected is displayed, the controller 40 selects either the load should be put on the conveying line or received. Load conveying process based on the selection of the number "2" is described below.

A. Selection of loading from the master station

Initially, the operator depresses a loading switch 115 of the operating box 51. In response, the controller 40 lights up a lamp of the loading switch 115 to advise operator that the number "2" has been registered as destination by way of switching the flickering number "2" on the digital display 120 over to stationary illumination. Next, the controller 40 transmits a mode-select signal indicating [(start "0") → (destination "2")] from all the I/O ports. Note that this mode-select signal is merely referred to as (0,2) signal in the following description. On receipt of the (0,2) signal, the controller 40 of the adjoining intermediate conveyer unit (2) stores (0,2) as a conveying data, and then transfers the (0,2) signal to all the remaining I/O ports, and as a result, the (0,2) signal is sequentially transmitted to all the controllers 40 of all the conveyer units 1. Based on the received (0,2) data signal, all the conveyer units 1 index proper conveying table. For example, by indexing the content of the above Table 1, the controller 40 of the conveyer unit (3) identifies that the rollers 2 should be rotated in normal direction by way of jointly operating the branching device 53. On the other hand, the controller 40 of the conveyer unit (4) without being provided with the conveying data signal (0,2) identifies that the rollers 2 should not be driven. Based on the above identifications, load conveying routes of the conveyer units (1), (2), (3), (6), and (7) are properly established.

Next, the operator depresses an activating/stopping switch 111 of the operating box 51. In response, the activating signal is transmitted from all the I/O ports. In consequence, the rollers 2 of the main conveyer structure 3 are rotated in normal direction and the Run-ON display lamp lights up.

On receipt of the activating signal, the controller 40 of the adjoining intermediate conveyer unit (2) identifies the effect of activation, and then transmits the activating signal from all the remaining I/O ports. Then, the activating signal is sequentially transmitted to all the controllers 40 of all the conveyer units 1. After identifying the activating signal, based on the recognition of the drive rule specified in Table 1, the controller 40 rotates the rollers of the main conveyer structure 3, and simultaneously lights up the Run-ON display lamp 117. The controller 40 of the conveyer unit (3) transmits a drive signal to the controller 57 of the branching device 53. In response to this drive signal, the controller 57 of the branching device 53 drives the swingable arm 55 to stay right above the conveyer unit (3) to branch out load 52 in the direction of the port D.

In this way, the rollers 2 are driven in the (0→2) direction, in other words, in the direction from the conveyer unit (1) to the conveyer units (2), (3), (6), and (7). At the same time, the branching device 53 of the conveyer unit (3) is operated to permit load 52 to be conveyed from the master station conveyer unit (1) to the conveyer unit (7).

Next, the operator depresses the activating/stopping switch 111 of the operating box 51. In response, a stopping signal is transmitted from all the I/O ports to simultaneously stop the rotation of the rollers 2 and turn the Run-ON display lamp 117 and the loading switch 115 OFF.

On receipt of the stopping signal, the controller 40 of the adjoining intermediate conveyer unit (2) transmits the stopping signal from all the remaining I/O ports. Then, the stopping signal is sequentially transmitted to all the controllers 40 of all the conveyer units 1. In response to the stopping signal, the controllers 40 respectively stop the rotation of the roller 2 on the main conveyer structures 3 and simultaneously turn the Run-ON display lamps 117 OFF. The controller 40 of the conveyer unit (3) transmits a return signal to the controller 57 of the branching device 53. In response to the return signal, the branching device 53 turns the arm 55 outward from the upper position of the conveyer unit (3).

B. Reception of load by the master station

Initially, the operator depresses a reception switch 114 of the operating box 51. In response, the lamp of the reception switch 114 lights up. Simultaneously, the number "2" flickering on the digital display unit 120 is switched over to stationary illumination in order to advise the operator that the number "2" has been registered as the conveyer unit for start conveyance of loads, and then, signal indicating [(start "2")→(destination "0")] is transmitted from all the I/O ports. Note that this signal is merely referred to as signal (2,0) in the following description.

On receipt of the signal (2,0), the controller 40 of the adjoining intermediate conveyer unit (2) stores this conveying signal (2,0), and then transfers this signal (2,0) to all the controllers 40 of all the conveyer units 1 via all the remaining I/O ports 42. Then, based on the received data signal (2,0), all the conveyer units 1 index conveying table. For example, by way of indexing the conveying rule shown in Table 1, the controller 40 of the conveyer unit (3) identifies the rule to reversely rotate the rollers 2 by jointly operating the branching device 53. On the other hand, the controller 40 of the conveyer unit (4) devoid of the conveying data (2,0) identifies that the rollers 2 should not be rotated. Based on the above recognition, the controllers 40 respectively establish load conveying route ranging from the conveyer unit (7) to the master station conveyer unit (1) via relaying conveyer units (6), (3), and (2).

Next, the operator depresses the activating/stopping switch 111 of the operating box 51. In response, the activating signal is transmitted to all the controllers 40 of the conveyer units 1 via all the I/O ports. In response to this activating signal, the controller 40 reverse the rotation of the rollers 2 of the main conveyer structures 3 and simultaneously light up a reverse display lamp 116. The controller 40 of the conveyer unit (3) transmits a drive signal to the controller 57 of the branching device 53. In response to this drive signal, the branching device 53 turns the arm 55 to the upper position of the conveyer unit (3) to cause load 52 carried from the direction of port D to join at the conveyer unit (3).

On receipt of the activating signal, the controller 40 of the adjoining intermediate conveyer unit (2) identifies the activation, and then transmits the activating signal to all the controllers 40 of all the conveyer units 1 via all the remaining I/O ports. Based on the recognition of the activated operation, all the controllers 40 reverse the rotation of the rollers 2 of the main conveyer structures 3 and simultaneously light up the reverse display lamp 116.

In this way, the rollers 2 are driven in the direction (2→0), in other words, from the conveyer unit (7) towards the conveyer units (6), (3), (2), and (1), in conjunction with the operation of the branching device 53 secured to the conveyer unit (3), and thus, the load 52 is conveyed from the terminal conveyer unit (7) to the master station conveyer unit (1).

Next, the operator depresses the activating/stopping switch 111 of the operating box 51. In response, an operation-stop signal is transmitted from all the I/O ports to subsequently stop the rotation of the rollers 2, and simultaneously, the reverse display lamp 116 and a reception switch 114 are turned OFF.

On receipt of the operation-stop signal, the controller 40 of the adjoining intermediate conveyer unit (2) transfers the operation stop signal to all the controllers 40 of all the conveyer units 1 via all the remaining I/O ports. Acting on the operation-stop signal, the controllers 40 suspend the rotation of the rollers 2 of the main conveyer structures 3 and turn the reverse display lamp 116 OFF.

Figure 33:
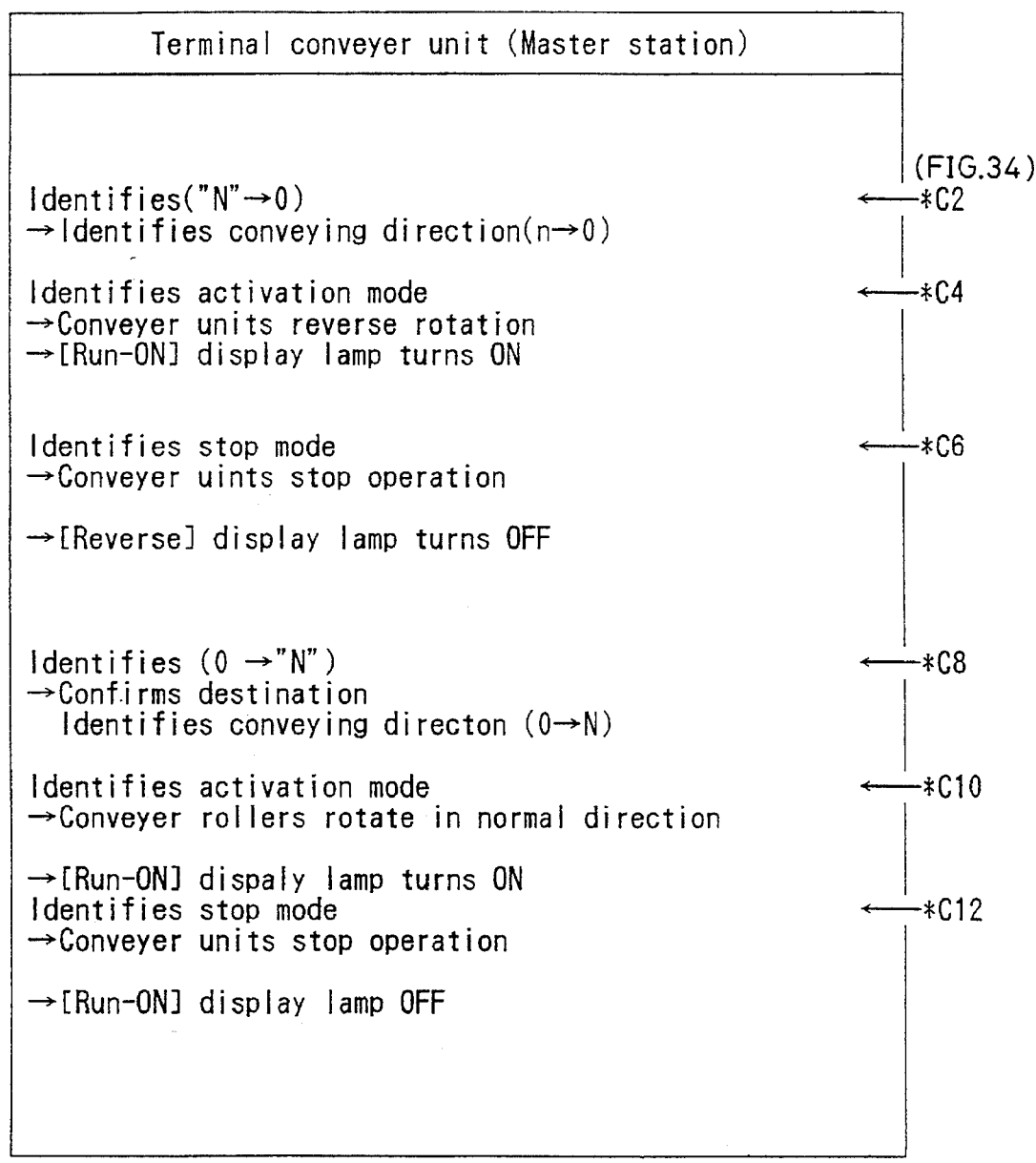
Figure 35:
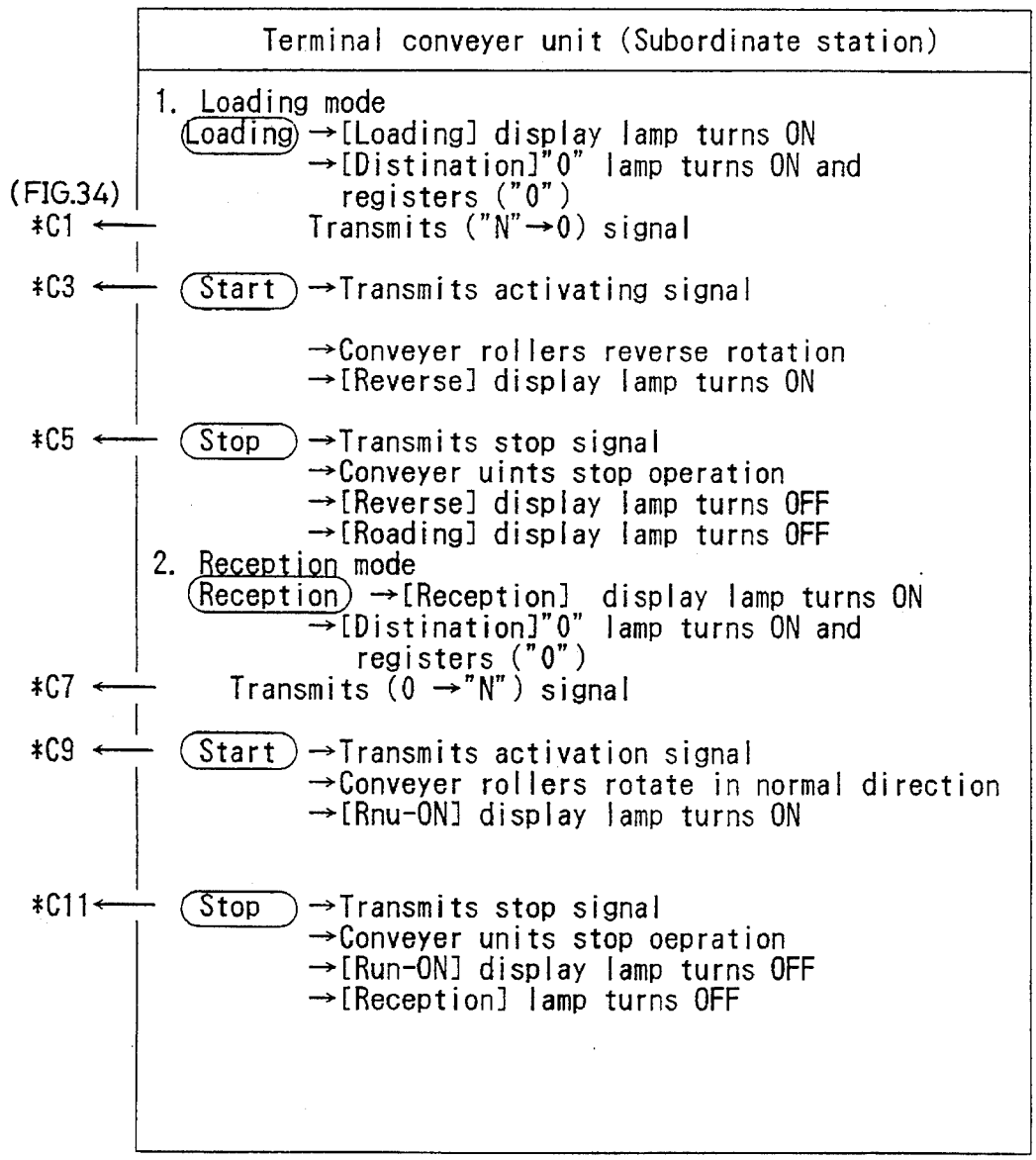

Next, referring now to FIGS. 33 to 35, the method of conveying load via operation of a terminal (subordinate) conveyer unit such as the conveyer unit (7) having the registered number "2" is described below.

C. Delivery of load from a subordinate station

Initially, the operator depresses a load delivery switch 115 of the operating box 51. In response, the lamp of the load delivery switch 115 lights up. The controller system registers proper number "0" of the master station conveyer unit (1) as the destination, and then advises operator that the master station "0" has been registered as the destination by displaying the number "0" on the digital display unit 120. Simultaneously, the controller 40 of the master station conveyer unit (1) transmits a signal indicating [(start "2"). →destination "0")] via all the I/O ports. Note that this signal is merely referred to as signal (2,0) in the following description. On receipt of the signal (2,0), the controller 40 of an adjoining intermediate conveyer (6) stores this conveying data (2,0), and then transfers this data signal (2,0) to all the controllers 40 of all the conveyer units 1 via all the remaining I/O ports. Based on the received conveying data (2,0), all the conveyers 1 index conveying table. For example, by way of indexing conveying rule shown in Table 1, the controller 40 of the conveying unit (3) identifies that the rollers 2 should be rotated in the reverse direction in association with cooperation of the branching device 53. On the other hand, the controller 40 of the conveyer unit (4) devoid of the conveying data (2,0) identifies that the rollers 2 should not be rotated. Based on this recognition, conveying route ranging from the conveyer unit (7) to the conveying units (6), (3), (2), and (1) is established.

Next, the operator depresses the activating/stopping switch 111 of the operating box 51. In response, the activating signal is transmitted from all the I/O ports. The activating signal reverses the rotation of the rollers 2 of the main conveyer structures 3 and lights up the reverse display lamp 116.

On receipt of the activating signal, the controller 40 of the adjoining intermediate conveyer unit (6) stores the activating signal and then transfers this signal to all the controllers 40 of all the conveying units 1 via all the remaining I/O ports. In response to the received activating signal, the controllers 40 respectively reverse the rotation of the rollers 2 and light up the reverse display lamp 116. The controller 40 of the conveyer unit (3) transmits a drive signal to the controller 57 of the branching device 53, which then turns the swingable arm 55 to the upper position of the conveyer unit (3) to permit load 52 carried from the direction of port D to join together.

In this way, the rollers 2 are reversely rotated in a range from the conveyer unit (7) to the master station conveyer unit (1) via intermediate conveyers (6), (3), and (2) in association with cooperation of the branching device 53, thus permitting load 52 to be conveyed from the terminal conveyer unit (7) to the master station conveyer unit (1).

Next, the operator depresses the activating/stopping switch 111 of the operating box 51. In response, an operation stop signal is transmitted from all the I/O ports. Simultaneously, the controller system suspends rotation of the rollers 2 of the main conveyer structures 3 and turns the reverse-display lamp 116 and the load delivery switch 115 OFF.

On receipt of the operation stop signal, the controller 40 of the adjoining intermediate conveyer unit (6) transfers the operation stop signal to all the controllers 40 of all the conveyer units 1 via all the remaining I/O ports. In response to the operation stop signal, the controllers 40 respectively stop rotation of the rollers 2 of all the main conveyer structures 3 and simultaneously turn the reverse display lamp 116 OFF.

D. Reception of load by a subordinate station

Initially, the operator depresses a load reception switch 114 of the operating box 51. In response, the lamp of the reception switch 114 lights up. The controller system then registers proper number "0" of the master station conveyer unit (1) as the start, and then advises operator that the number "0" has been registered as the load supply start by way of displaying the number "0" on the digital display unit 120. The controller system then transmits a signal indicating [(start "0")→(destination "2")] via all the I/O ports. Note that this signal is merely referred to as signal (0,2) in the following description.

On receipt of the signal (0,2), the controller 40 of the adjoining intermediate conveyer unit (6) stores this conveying data (0,2), and then transfers this data (0,2) to all the controllers 40 of all the conveyer units 1 via all the remaining I/O ports. Each-conveyer unit 1 indexes conveying table based on the received data (0,2). For example, the controller 40 of the conveyer unit (3) identifies from the result of indexing conveying rule of Table 1 that the rollers 2 should be rotated in normal direction in association with cooperation of the branching device 53. On the other hand, the controller 40 of the conveyer unit (4) devoid of the conveying data (0,2) identifies that the rollers 2 should not be rotated. Based on the above recognition, conveying route ranging from the master station conveyer unit (1) to the terminal conveyer unit (7) via the intermediate conveyer units (2), (3), and (6) is established.

Next, the operator depresses the activating/stopping switch 111 of the operating box 51. In response, the activating signal is then transmitted via all the I/O ports. The controller system rotates the rollers 2 of the main conveyer structures 3 and simultaneously lights up the Run-ON display lamp 117.

On receipt of the activating signal, the controller 40 of the adjoining intermediate conveyer unit (6) identifies the activation, and then transfers the received activating signal to all the controllers 40 of all the conveyer units 1 via all the remaining I/O ports. Acting on the identified activation, the controllers 40 rotate the rollers 2 of the main conveyer structures 3 and light up the Run-ON display lamp 17. The conveyer unit (3) transmits a drive signal to the controller 57 of the branching device 53. In response to the drive signal, the branching device 53 turns the swingable arm 55 to a position right above the conveyer unit (3) so that load 52 can be branched in the direction of port D.

In this way, the rollers 2 are driven in the direction (0→2), in other words, in the direction from the conveyer unit (1) to the following conveyer units (2), (3), (6), and (7), in association with cooperation of the branching device 53 secured to the conveyer unit (3), load 52 is conveyed from the master station to the terminal conveyer unit (7).

Next, the operator depresses the activating/stopping switch 111 of the operating box 51. In response, the controller system transmits an operation-stop signal via all the I/O ports and suspends rotation of the rollers 2 of the main conveyer structures 3, and then turns the Run-ON display lamp 117 and a loading switch 115 OFF.

On receipt of the operation-stop signal, the controller 40 of the adjoining intermediate conveyer (2) transfers the operation-stop signal to all the controllers 40 of the conveyer units 1 via all the remaining I/O ports in sequence. In response to the operation-stop signal, the controllers 40 respectively suspend rotation of the rollers and turn the Run-ON display lamp 117 OFF. The controller 40 of the conveyer (3) transmits a return signal to the controller 57 of the branching device 53. In response to the return signal, the branching device 53 turns the swingable arm 55 outward from the conveyer unit (3).

B. Reception of load by the master station

Initially, the operator depresses the load reception switch 114 of the operating box 51. In response, the lamp of the reception switch 114 lights up. The controller system switches the flickering number "2" displayed on the digital display unit 120 over to stationary display to advise operator that the number "2" has been registered as the start conveyer unit, and then transmits an instruction signal [(start conveyer "2")→(destination conveyer "0")] from all the I/O ports. Note that this signal is hereinafter merely referred to as the signal (2,0).

On receipt of the signal (2,0), the controller 40 of the adjoining intermediate conveyer (2) stores this conveying data signal (2,0) and then transfers it to all the controllers 40 of all the conveyer units 1 in sequence via all the remaining I/O ports 42. Based on the received conveying data (2,0), all the conveyer units 1 refers to conveying rule shown in Table 1, and then identifies that the rollers 2 should be reversed in association with cooperation of the branching device 53. On the other hand, the controller 40 of the conveyer unit (4) devoid of this conveying data (2,0) identifies that the rollers 2 should not be rotated. Based on this recognition, load conveying route ranging from the conveyer unit (7) to the conveyer unit (1) via intermediate conveyers (6), (3), and (2) is set.

Next, the operator depresses the activating/stopping switch 111 of the operating box 51. In response, operation activating signal is transmitted from all the I/O ports, and then the controller system reverses rotation of the rollers 2 of the main conveyer structures 3 and lights up a reverse display lamp 116. The controller 40 of the conveyer unit (3) transmits a drive signal to the controller 57 of the branching device 53. Acting on the drive signal, the branching device 53 turns the swingable arm 55 to a position right above the conveyer unit (3) to cause load 52 from port D to join.

On receipt of the operating activating signal, the controller 40 of the adjoining intermediate conveyer unit (2) identifies that the load conveying operation is activated, and then transfers the operation activating signal to all the controllers 40 of all the conveyer units 1 in sequence via all the remaining I/O ports. Based on the recognition of the activated conveying operation, the controllers 40 respectively reverse rotation of the rollers 2 of the main conveyer structures 3, and simultaneously light up the reverse display lamp 116.

In this way, the controller system drives the rollers 2 in the direction (2→0), concretely, in the direction of the conveyer units (6), (3), (2), and (1), from the conveyer (7), in collaboration with operation of the branching device 53 linked with the conveyer (3)to permit load 52 to be conveyed from the terminal conveyer unit (7) to the master station conveyer unit (1).

Next, the operator depresses the activating/stopping switch 111 of the operating box 53. In response, an operation-stop signal is transmitted from all the I/O ports and causes the rollers 2 of the main conveyer structures 3 to stop rotation and simultaneously turns the reverse-display lamp 116 and the load reception switch 114 OFF.

On receipt of the operation-stop signal, the controller 40 of the adjoining intermediate conveyer unit (2) transfers the operation stop signal to all the controllers 40 of all the conveying units 1 in sequence via all the remaining I/O ports. In response to the received operation-stop signal, the controllers 40 respectively stop the rotation of the rollers 2 of the main conveyer structures 3 and turn the reverse display lamp 116 OFF.

Next, the method of conveying load 52 by operating a terminal (subordinate station) conveyer unit such as the conveyer unit (7) for example having the registered number "2" is described below.

C. Supply of load from an subordinate station

Initially, the operator depresses a load-supply switch 115 of the operating box 51. In response, the lamp of the load-supply switch 115 lights up. The controller system registers the proper number "0" of the master-station conveyer unit (1) as the destination, and then advises the operator that the master station "0" has been registered as the destination by way of displaying the number "0" on the digital display unit 120, and then transmits an instruction signal [(start "2")→ (destination "0")] from all the I/O ports. Note that this signal is hereinafter merely referred to as the signal (2,0).

On receipt of the signal (2,0), the controller 40 of the adjoining intermediate conveyer unit (6) stores the conveying data (2,0), and then transfers it to all the controllers 40 of all the conveyer units 1 via all the remaining I/O ports. Based on the received conveying data (2,0), respective conveyer units 1 refers to conveying table. For example, by referring to rules of Table 1, the controller 40 of the conveyer unit (3) identifies that the rollers 2 should be reversed in association with cooperation of the branching device 53. On the other hand, the controller 40 of the conveyer unit (4) devoid of the conveying data (2,0) identifies that the rollers 2 should not be rotated. Based on this recognition, conveying route from the conveyer unit (7) to the conveying unit (1) via conveyer units (6), (3), and (2) is established.

Next, the operator depresses the activating/stopping switch 111 of the operating box 51. In response, an operation activating signal is transmitted from all the I/O ports to cause the rollers 2 of the main conveyer structures 3 to reversely rotate themselves and the reverse-display lamp to light up.

On receipt of the operation activating signal, the controller 40 of the adjoining intermediate conveyer unit (6) stores the operation activating signal and then transfers it to all the controllers 40 of all the conveyer units 1 via all the remaining I/O ports. Based on the above recognition, the controller system reverses rotation of the rollers 2 of the main conveyer structures 3 and simultaneously lights up the reverse-display lamp 116. The controller 40 of the conveyer unit (3) transmits a drive signal to the controller 57 of the branching device 53. Acting on the received drive signal, the branching device 53 turns the swingable arm 55 to a position right above the conveyer unit 3 to cause load 52 from the direction of port D to join together.

In this way, the rollers 2 are rotated in the direction of the conveyer units (6), (3), (2), and (1) from the conveyer unit (7), thus properly conveying load 52 from the terminal conveyer (7) to the master-station conveyer unit (1).

Next, the operator depresses the activating/stopping switch 111. In response, an operation stop signal is transmitted from all the I/O ports to cause the rollers 2 of the main conveyer structures 3 to stop own rotation and the reverse display lamp 116 and the load-supply switch 115 to be turned OFF.

On receipt of the operation stop signal, the controller 40 of the adjoining intermediate conveyer unit (6) transfers the operation stop signal to all the controllers 40 of all the conveyer units 1 in sequence via all the remaining I/O ports. Acting on the operation stop signal, the controllers 40 respectively stop the rotation of the rollers 2 of the main conveyer structures 3 and turn the reverse display lamp 116 OFF.

D. Reception of load by a subordinate station

Initially, the operator depresses a load reception switch 114 of the operating box 51. In response, the lamp of the load reception switch 114 lights up. Then, the controller system registers the proper number "0" of the master-station conveyer unit I as the start, and then advises operator that the number "0" has been registered as the start conveyer unit 1 by displaying the number "0" on the digital display unit 120, and simultaneously transmits an instruction signal indicating [(start "0")→(destination "2")] from all the I/O ports. Note that this signal is hereinafter merely referred to as the signal (0,2).

On receipt of the signal (0,2), the controller 40 of the adjoining intermediate conveyer unit (6) stores the signal (0,2), and then transfers this signal to all the controllers 40 of all the conveyer units 1 via all the remaining I/O ports. Based on the conveying data (0,2), all the conveyer units 1 refer to conveying table. For example, by referring to conveying rule shown in Table 1, the controller 40 of the conveyer unit (3) identifies that the rollers 2 should be rotated in normal direction in collaboration with the branching device 53. On the other hand, the controller 40 of the conveyer unit (4) devoid of the conveying data (0,2) identifies that the rollers 2 should not be rotated. Based on this recognition, conveying route ranging from the conveyer (1) to the terminal conveyer unit (7) via conveyer units (2), (3), and (6) is established.

Next, the operator depresses the activating/stopping switch 111 of the operating box 51. In response, an operation activating signal is transmitted from all the I/O ports to cause the rollers 2 of the main conveyer structures 3 to rotate themselves in normal direction and the Run-ON display lamp 117 to light up.

On receipt of the operation activating signal, the controller 40 of the adjoining intermediate conveyer unit (6) identifies that the conveying operation is activated, and then transfers the operation activating signal to all the controllers 40 of all the conveyer units 1 via all the remaining I/O ports. Based on this recognition, the controllers 40 respectively rotate the rollers 2 of the main conveyer structures 3 and light up the Run-ON display lamp 117. The controller 40 of the conveyer unit (3) transmits a drive signal to the controller 57 of the branching device 53. Acting on the received drive signal, the branching device 53 turns the swingable arm 55 to a position right above the conveyer unit (3) so that load 52 can be branched in the direction of port D.

In this way, the rollers 2 are rotated in the direction of the conveyer units (2), (3), (6), and (7), from the conveyer unit (1) in collaboration with the branching device 53 linked with the conveyer unit (3), thus permitting load 52 to be conveyed from the master-station conveyer unit (1) to the conveyer unit (7).

Next, the operator depresses the activating/stopping switch 111 of the operating box 51. In response, an operation-stop signal is transmitted from all the I/O ports to cause the rollers 2 of the main conveyer structures 3 to stop own rotation and the Run-ON switch 117 and the load reception switch 114 to be turned OFF.

On receipt of the operation-stop signal, the controller 40 of the adjoining intermediate conveyer unit (6) transfers the operation stop signal to all the controllers 40 of all the conveyer units 1 via all the remaining I/O ports. Acting on the operation stop signal, the controllers 40 respectively stop the rotation of the rollers 2 of the main conveyer structures 3 and turn the Run-ON switch 117 OFF. The controller 40 of the conveyer unit (3) transmits a return signal to the controller 57 of the branching device 53. In response to the return signal, the branching device 53 turns the swingable arm 55 outwards from the conveyer unit (3).

Next, operation of the controller 40 to deal with error took place in any of the conveyer units 1 is described below.

If error occurs in any of the conveyers 1, the malfunctioning conveyer 1 transmits an emergency signal comprising a stop instruction signal and an error code from all the I/O ports to cause the rollers 2 of the main conveyer structures 3 to stop own rotation and the reverse display lamp 116 and the Run-ON display lamp 117 to respectively be turned OFF.

On receipt of the emergency signal comprising a stop instruction signal and an error code, the controller 40 of the adjoining conveyer unit 1 transfers the emergency signal comprising a stop instruction and an error code to all the controllers 40 of all the conveyer units 1 in sequence until eventually being received by the controllers 40 of the terminal conveyers (1), (5), (7), and (9). In response to the received stop instruction and the error code, the controllers 40 respectively suspend the rotation of the rollers 2 of the main conveyer structures 3 and turn the reverse display lamp 116 and the Run-ON display lamp 117 OFF. On the other hand, the controllers 40 of the terminal conveyer units (1), (5), (7), and (9), respectively light up an error display lamp 118 to flicker an error code on the digital display unit 120 while audibly alarming with buzzer 121.

For example, as a result of overload incurred to the motor 4 for driving the rollers 2 of the conveyer unit (1), when the sensor 45 detects that the motor 4 is overloaded, the controller 40 of the conveyer unit 1 refers to the error code related to the overload, and then indexes the number "5" for example. Then, the controller 40 transmits the indexed error code to those controllers 40 of the terminal conveyer units (1), (5), (7), and (9), via the adjoining controller 40, and simultaneously displays the number "5" on the digital display unit 120.

When a reset switch 113 is operated subsequent to generation of error, a flickering error code on the digital display unit 120 is then switched over to a stationary display, and then an audible alarm with the buzzer 121 is suspended.

When the erroneous state is corrected, the controller 40 of the conveyer unit 1 recovered from the erroneous state transmits the error-corrected signal to the controllers of the terminal conveyer units (1), (5), (7), and (9), via the adjoining controller 40. In response to the error-corrected signal, the controllers 40 of the terminal conveyer units (1), (5), (7), and (9), respectively turn the error display lamps 118 and the error code on the digital display units 120 OFF. Unless the error-corrected signal is identified, the error display lamp remains being lit and the display of the error code on the digital display unit 120 also remains as it is.

Figure 36A:
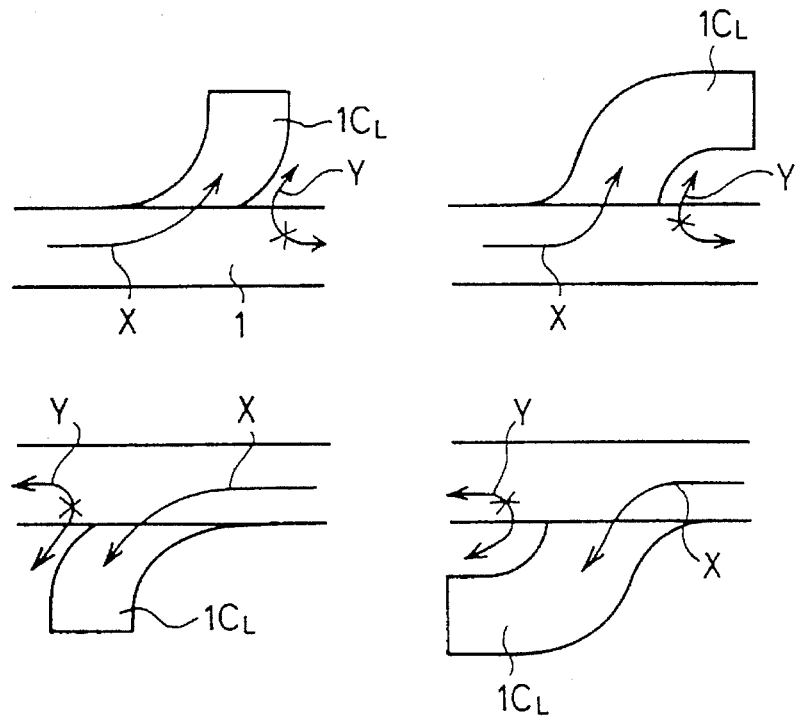
FIG. 36 is explanatory of operation of each conveyer unit branched out from the main conveyer unit.
Figure 36B:
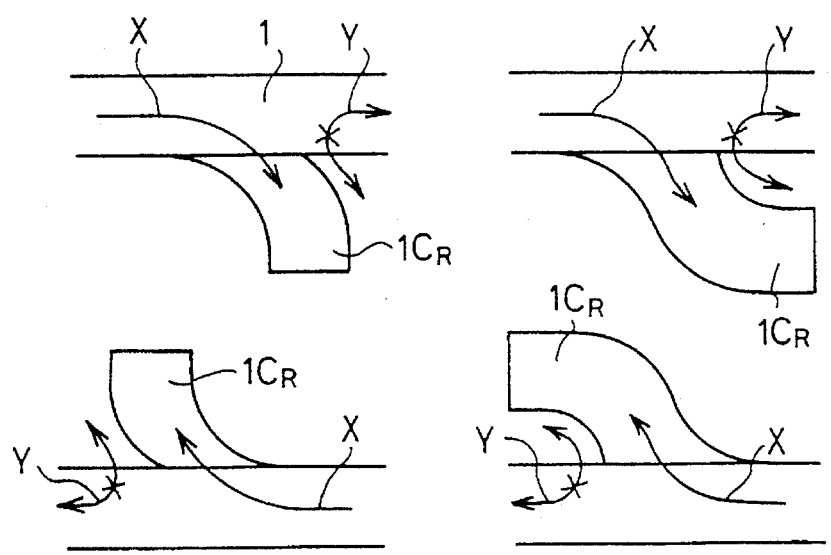

As shown in FIGS. 36a and 36b, depending on the branched direction of load 52 indicated by arrowed lines X, the junction conveyer 1C is classified into the leftward-branching junction conveyer $1C_L$ and the rightward-branching junction conveyer $1C_R$. As a result of linkage between a normal straight-line roller conveyer unit 1A and these junction conveyers $1C_L$ and $1C_R$, there are certain directions in which load conveying operation is impossible. When operating the junction conveyers $1C_L$ and $1C_R$, load cannot be conveyed in the direction indicated by arrowed lines Y. Table 2 represents the relationship between the kinds of branching conveyer units and the load-conveying impossible directions.

TABLE 2

| KINDS OF BRANCHING CONVEYER | PORTS OF LINKED CONVEYERS | LOAD-CONVEYING IMPOSSIBLE DIRECTIONS |
| --- | --- | --- |
| Leftward-branching $1C_L$ | B | C → B, C ← B |
| Leftward-branching $1C_L$ | D | A → D, A ← D |
| Rightward-branching $1C_R$ | B | A → B, A ← B |
| Rightward-branching $1C_R$ | D | C → D, C ← D |

Figure 37:
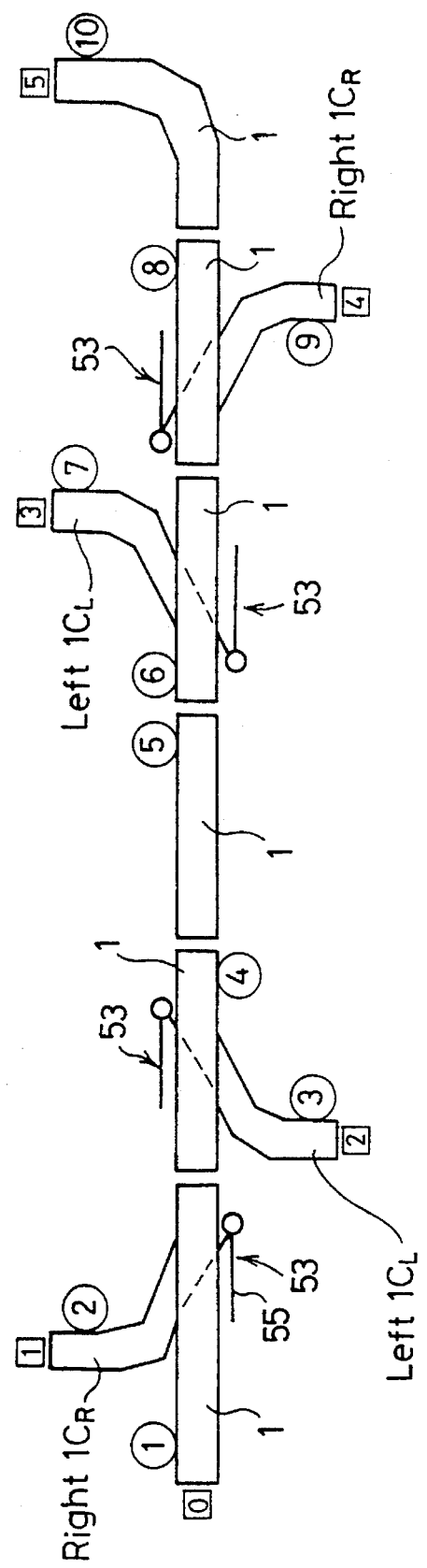
FIG. 37 is a plan view of an integral conveyer line comprising the main conveyer unit and a plurality of branched conveyer units.
Figure 38:
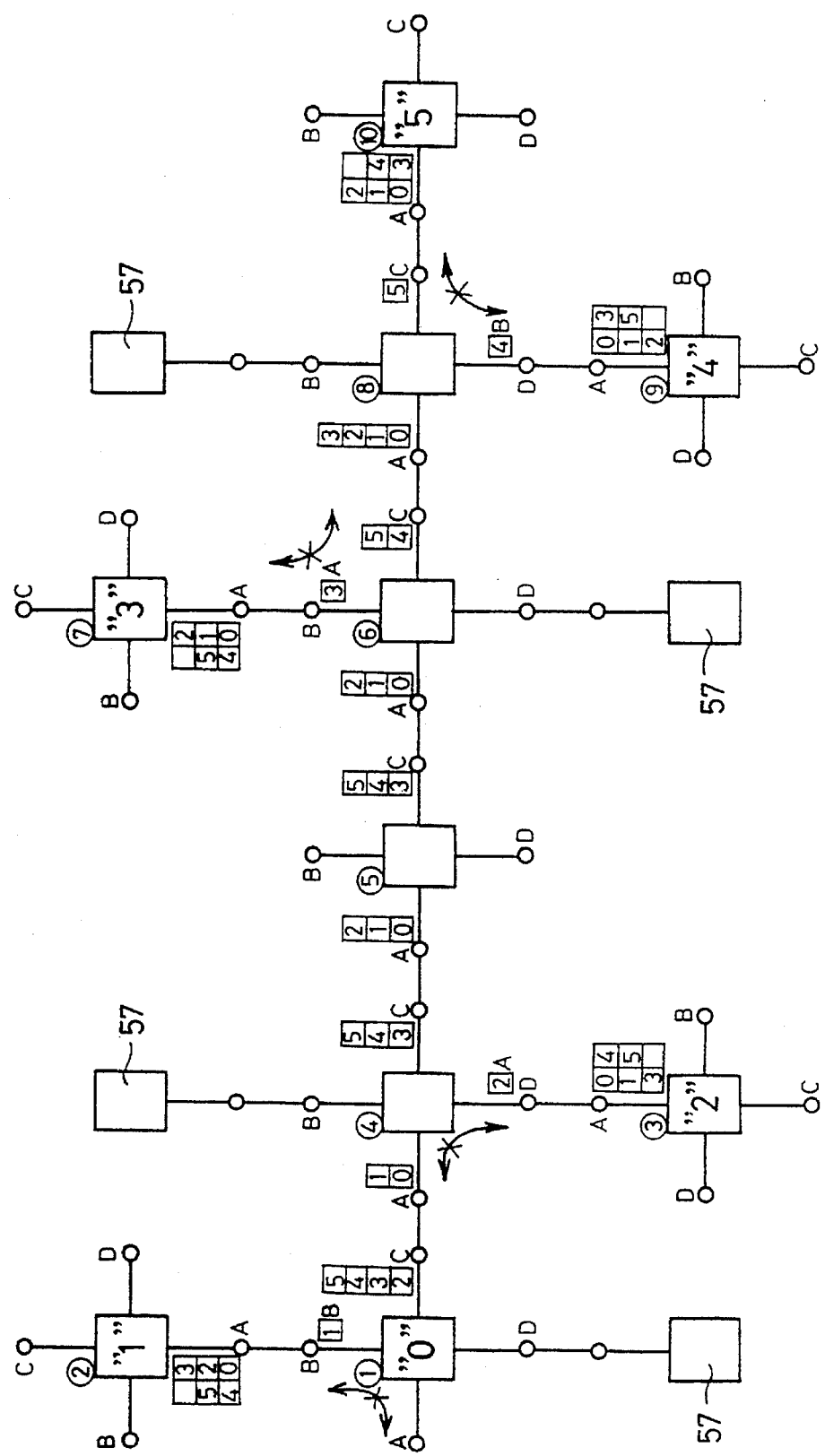
FIG. 38 is a detailed block diagram of connectors of the conveyer unit comprising a plurality of conveyer units.

FIG. 37 illustrates a typical example of a conveyer line for conveying load between a group comprising a plurality of conveyer units and another group comprising a plurality of conveyer units consisting of linearly conveying conveyer units 1, leftward-branching junction conveyers $1C_L$, rightward-branching junction conveyers $1C_R$, and a plurality of branching devices 53, via mutual linkage with each other. FIG. 38 represents a detailed diagram of the linkage between connectors 41 (A,B,C, and D) of the controllers 6 of respective conveyer units 1 for integrally composing the conveyer line shown in FIG. 37. When a connector D is linked with a connector A of a conveyer unit (3) available for branching and confluence, the controller 40 of an intermediate conveyer 1 designated by the number (4) (hereinafter referred to as the conveyer unit 4) in FIG. 38 identifies that branching and confluence of load are executed via the conveyer unit 4.

Connectors of the controller 57 of the branching device 53 are respectively linked with connectors B or D of the controllers 40 of the conveyer units (1), (4), (6), and (8).

Figure 31:
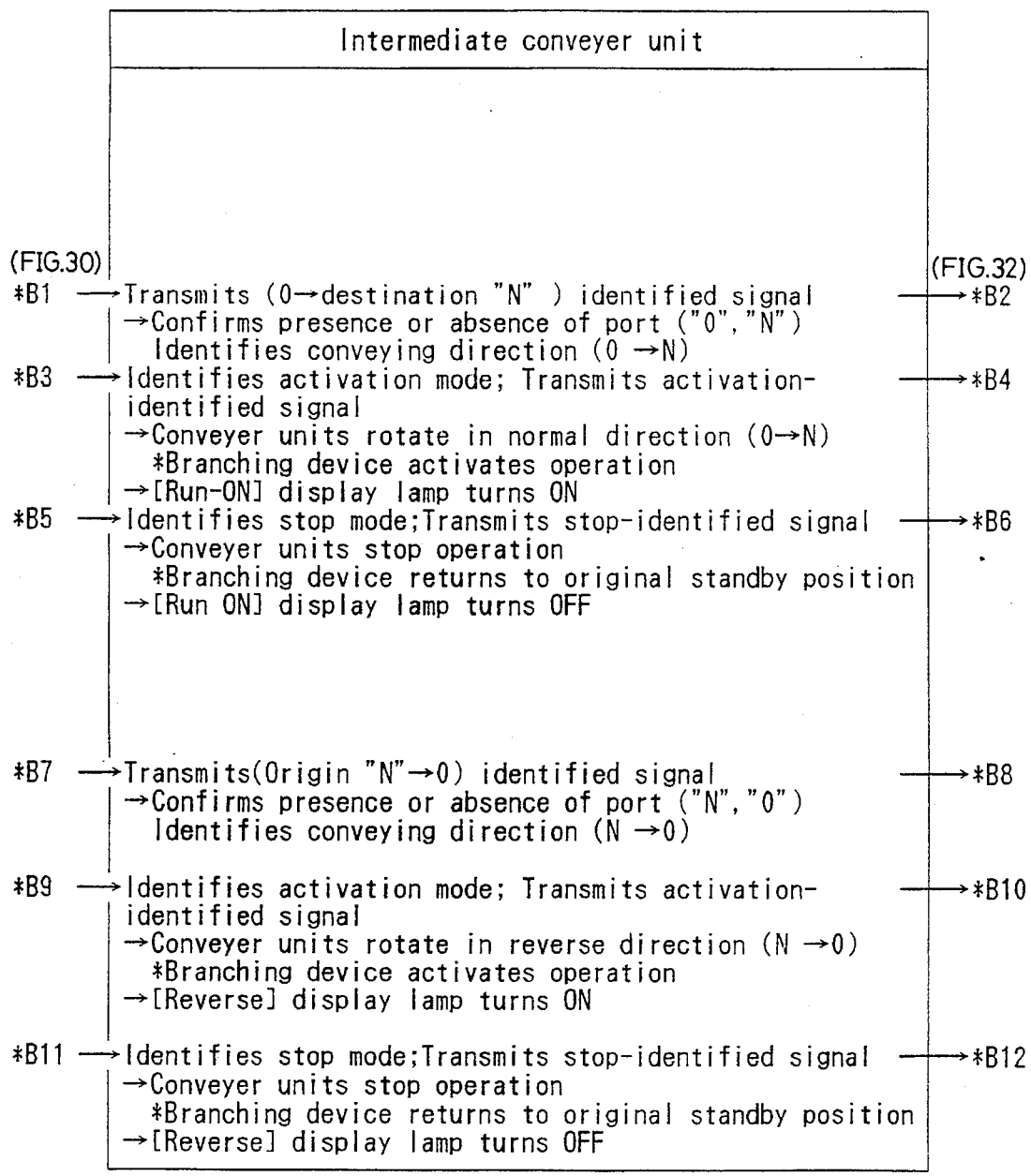
Figure 32:
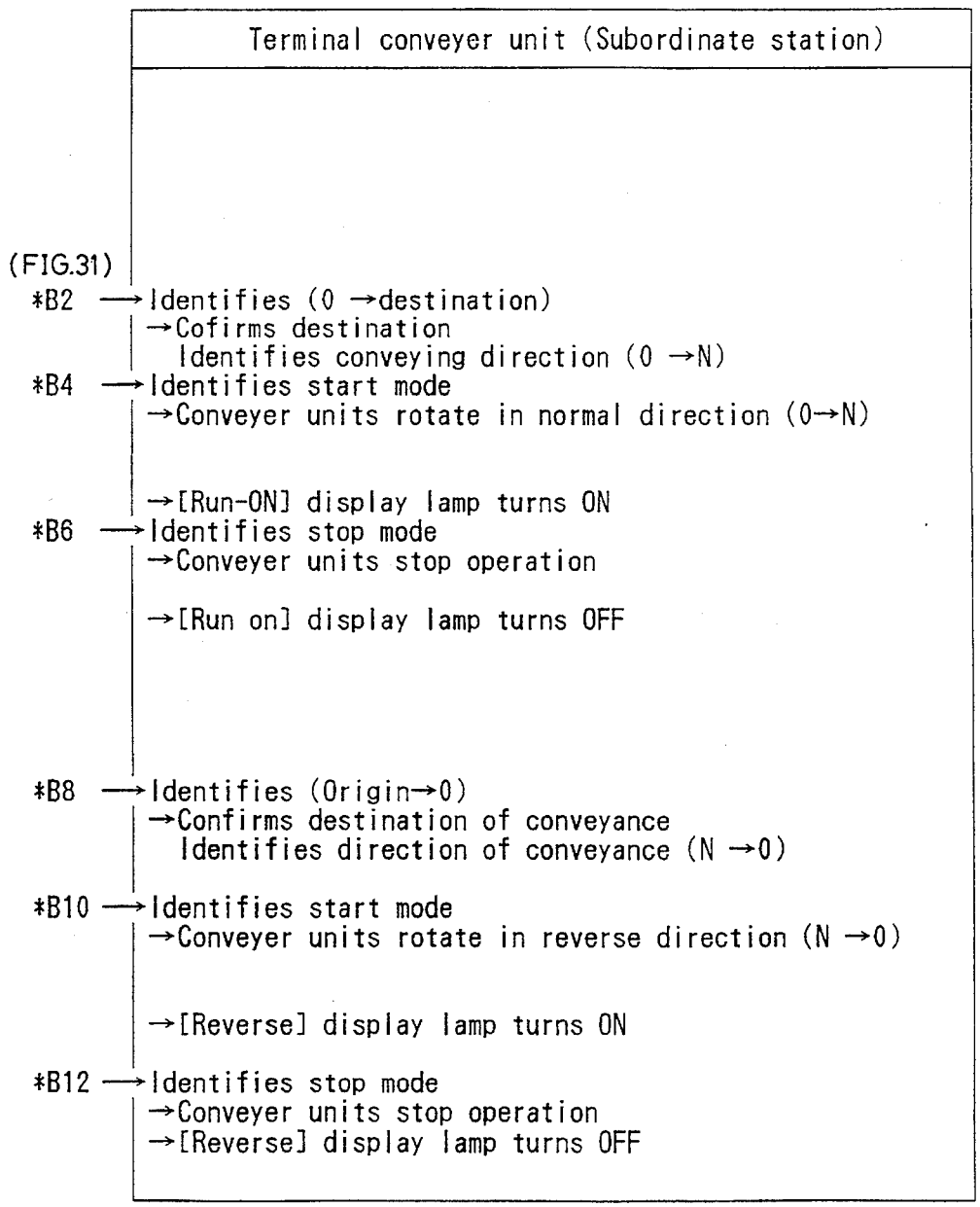
Figure 39:
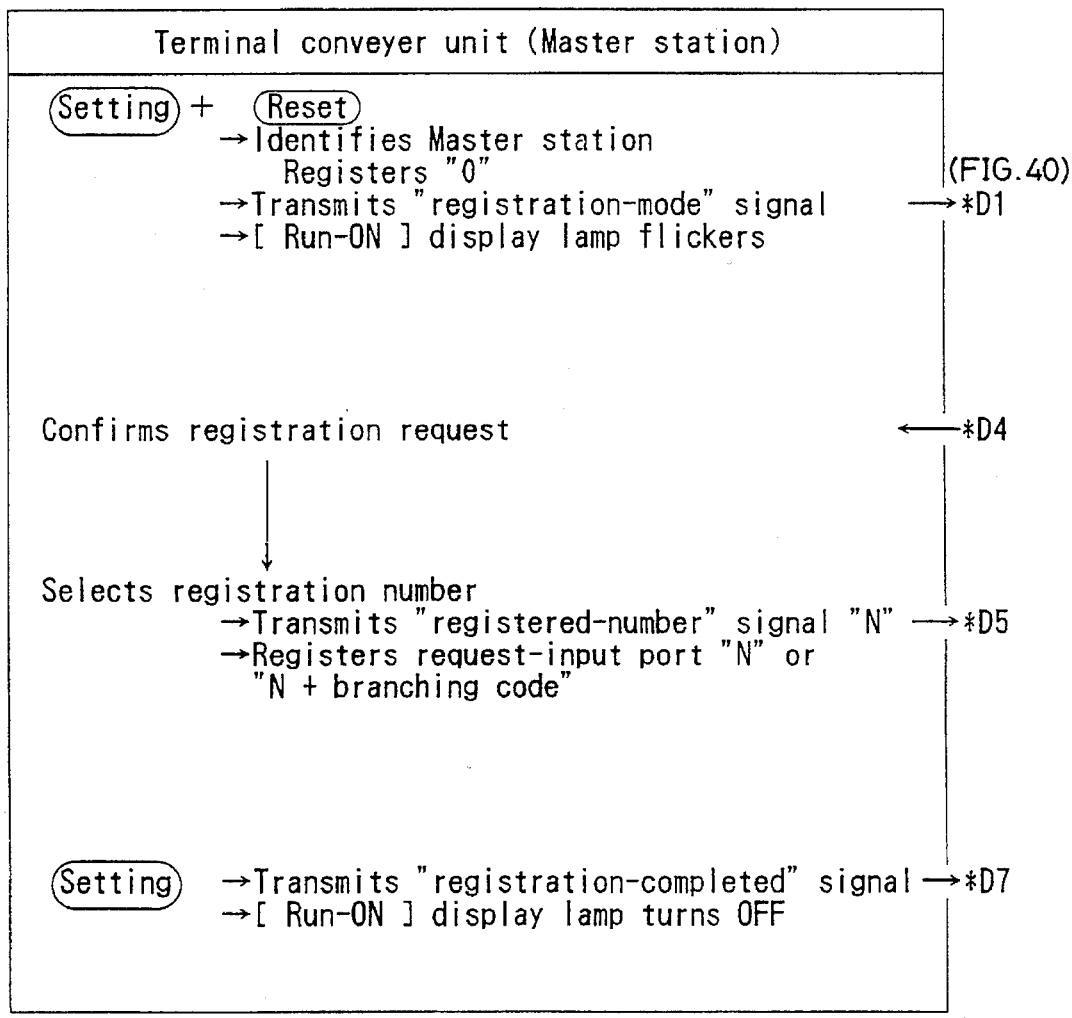
FIGS. 39 to 41 are explanatory of operating sequence for registering conveyer units.
Figure 40:
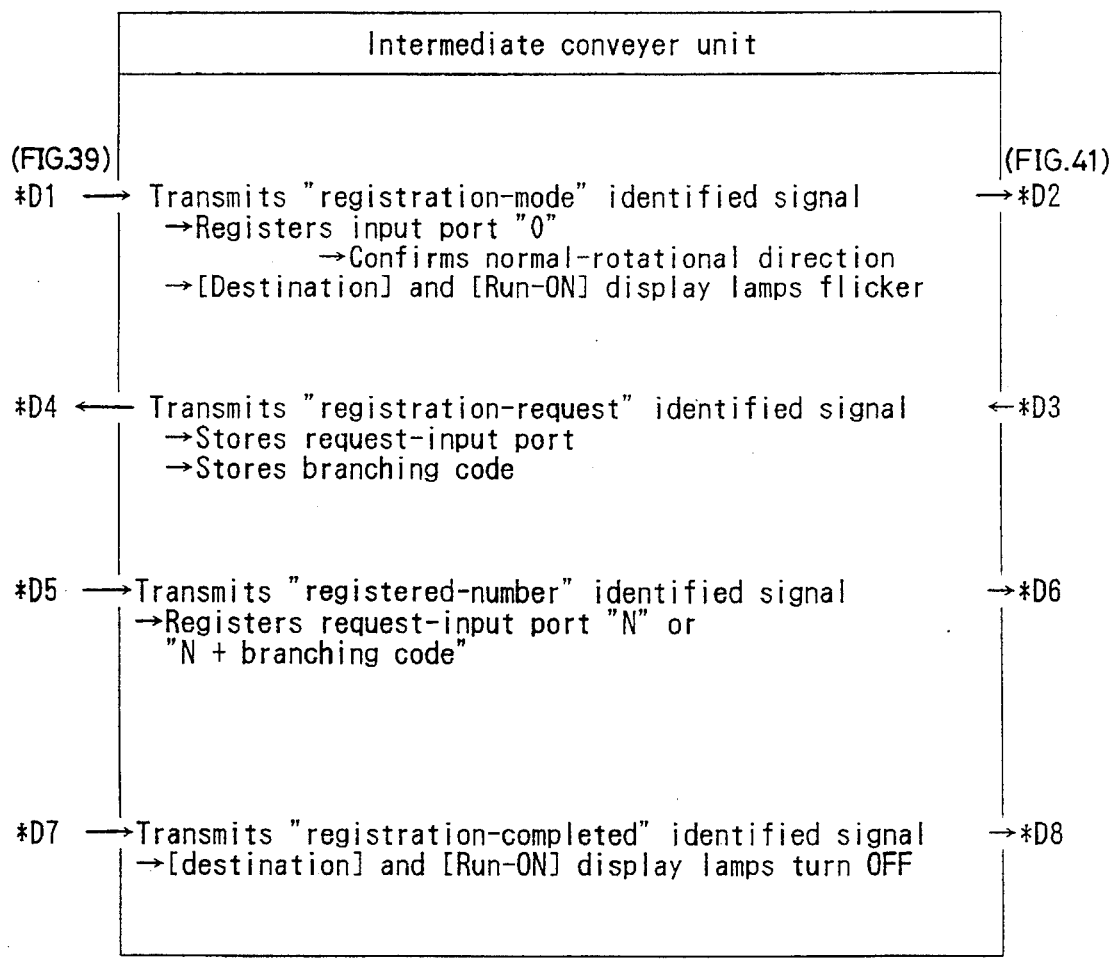
Figure 41:
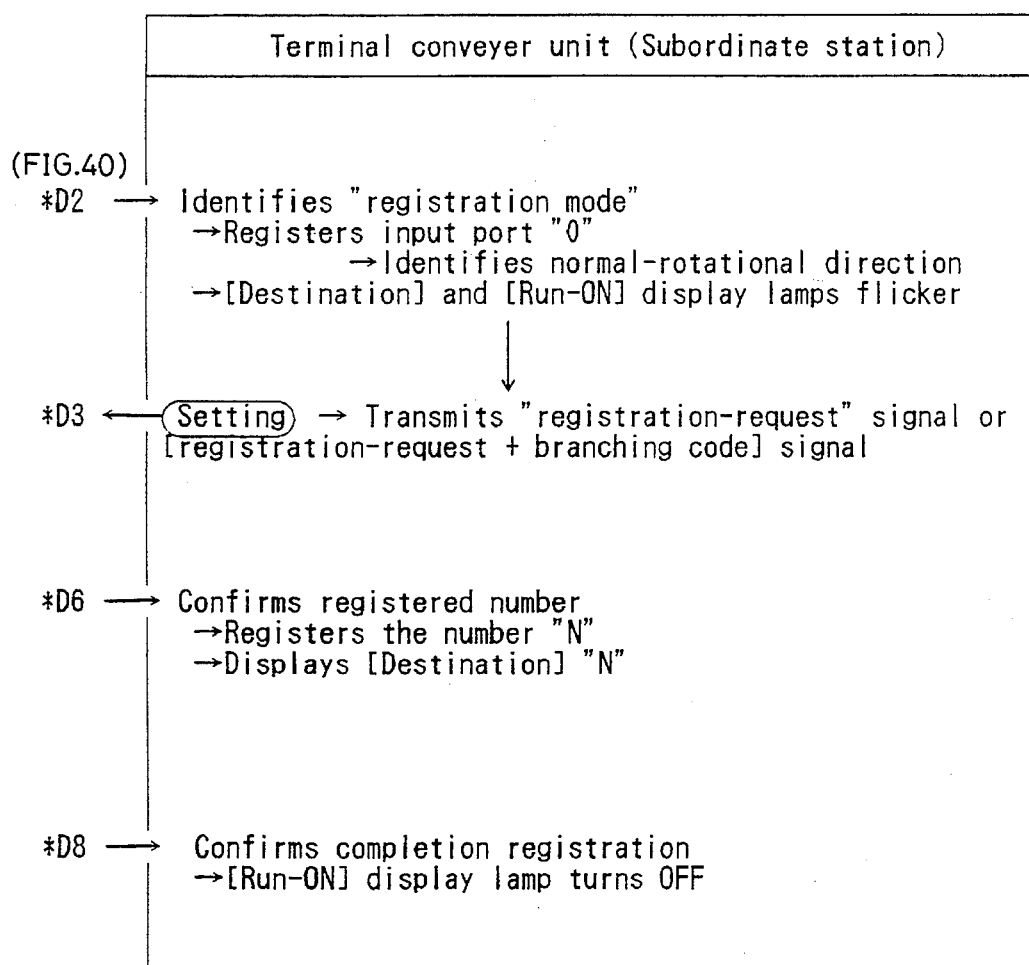

Next, referring to FIGS. 39 to 41, the initial registration function and conveying table preparing function of the controller 40 of the conveyer unit 1 in the conveyer line shown in FIGS. 31 and 32 linked with a plurality of junction conveyers 1C having different branching directions are respectively described below.

The conveyer unit 1 is designated as the master station. At first, operator simultaneously depresses a setting switch 112 and a reset switch 113 of the operating box 51 of the conveyer unit 1. On receipt of the operating signal from the setting switch 112 and the reset switch 113, the controller 40 of the conveyer unit 1 identifies that the conveyer unit 1 is actually the master station, and then registers the number "0" as the proper number of the conveyer unit 1. Then, the controller 40 transmits the registered number "0" from all the I/O ports and displays that the registration mode is underway by flickering the Run-ON display lamp 117.

On receipt of the registration mode signal, the controllers 40 of the adjoining conveyer units (2) and (4) respectively transmit the registration mode signal to the controllers 40 of other adjacent conveyer units 1 in sequence via all the remaining I/O ports 42 until the registration mode signal is eventually received by the controllers 40 of the terminal conveyer units (3), (7), (9), and (10). As shown in FIG. 38, those I/O ports 42 in receipt of the registration mode signal respectively register the proper number "0" of the master station, and then, define that the rotation of the rollers 2 in the direction from the port A or C complete with registration of the number "0" to other ports C or A corresponds to the forward rotational direction. The I/O ports 42 complete with registration of the number "0" respectively display that the registration mode is actually entered by flickering the digital display unit 120 and the Run-ON display lamp 117 of the destination conveyer unit.

Next, the operator requests registration of a proper number by depressing the setting switch 112 of the operating box 51 of any of the terminal conveyer units (2), (3), (7), (9), and (10). For example, when activating an operating signal of the setting switch 15 of the rightward branching conveyer unit (2), [registration-request+(right-branching code)] signal is transmitted from the port A complete with registration of the number "0". On receipt of the signal [registration-request+(right-branching code)], the controller 40 of the adjoining master-station conveyer unit 1 initially selects the number "1" among numbers subject to registration, and then transmits the registered number "1" to memory of the input port B so that the number "1B" being the right-branching code can be registered therein. On receipt of the registered number "1", the controller 40 of the adjoining conveyer unit (2) registers the number "1" as own proper number, and then displays the registered number "1" on the digital display unit 120.

In the same way, when the operator inputs an operating signal of the setting switch 112 of the operating box 51 of the left-branching conveyer unit (7) at terminal, [registration-request+A (leftward branching code)] signal is transmitted from the port A complete with registration of the number "0". On receipt of the signal [registration-request+ A], the controller 40 of the adjoining intermediate conveyer unit (6) stores signal A (leftward branching code), and then transmits only the registration-request signal to the controller 40 of the adjoining conveyer unit (5) via the port A complete with registration of the number "0". The registration request signal is sequentially transferred until the controller 40 of the master-station conveyer unit (1) eventually receives it. The controllers 40 respectively store the port C in receipt of the registration-request signal as the request input port.

After identifying the input of the registration-request signal, the controller 40 of the master-station conveyer unit 1 selects the number "3" among numbers subject to registration, and then transmits the registered number "3" to the controller 40 of the adjoining conveyer unit (4) before registering the number "3" in memory of the request input port C.

On receipt of the registered number "3", the controller 40 of the adjoining conveyer unit (4) transfers the registered number "3" to the controllers 40 of the adjoining conveyer units (3) and (5). Then, the registered number "3" is sequentially transmitted to all the controllers 40 of the remaining conveyer units until eventually being received by the controller 40 of the terminal conveyer unit (7). On the other hand, as shown in FIG. 38, the controller 40 of the conveyer unit (4) registers the number "3" in memory of the request input port C, whereas the controller 40 of the intermediate conveyer unit (6) registers the number "3A" being the leftward-branching code in memory of the request input port B. The controller 40 of the terminal conveyer unit (7) registers the number "3" as own proper number, and then displays the registered number "3" on the digital display unit 120.

In the same way, after completing registration of proper numbers in all the terminal conveyer units (2), (3), (7), (9), and (10), as shown in FIG. 38, the numbers of the terminal conveyer units 1 for making up the destination and the start are registered in memories of respective I/O ports 42.

Next, the operator depresses the setting switch 112 of the operating box 51 of the conveyer unit (1). On receipt of the input operating signal from the setting switch 112, the controller 40 of the conveyer unit (1) transmits a registration-completed signal via all the I/O ports 42 and simultaneously turns the Run-ON display lamp 117 to advise operator that registration has been completed.

On receipt of the registration-completed signal, the controllers 40 of the adjoining conveyer units (2) and (4) respectively transmit the registration-completed signal to the controllers 40 of adjoining conveyer units 1 via all the remaining I/O ports 42. The registration-completed signal is sequentially transferred to all the controllers 40 of the terminal conveyer units (2), (3), (7), (9), and (10). Simultaneous with confirmation of the completion of registration, the Run-ON display lamp 117 is turned OFF to advise operator of the completion of the registration.

Next, based on the numbers of the terminal conveyer units 1 designated to be the start and the destination and the branching code A or B registered in memories of respective I/O ports 42, the controllers 40 of respective conveyer units 1 prepare a conveying table to prescribe the direction of the rotation of the rollers 2 and activation or deletion of cooperation of the branching device 53.

For example the controller 40 of the conveyer unit (8) prepares a specific conveying table as per Table 3 shown below. Concretely, since the port A of the conveyer unit (8) stores "0", "1", "2", and "3", the port C stores "4", and the port D stores "4B", respectively, the conveying table prescribes that the rollers 2 should be rotated in the normal direction when conveying load in the direction of "0" through "5" and that the rollers 2 should also be rotated in the normal direction in collaboration with the branching device 53 when conveying load in the direction of "0" through "4". The controller 40 also prepares a conveying table prescribing that the rollers 2 should be reversed when conveying load in the direction of "5" through "0". In addition, since the port D stores "4B", the controller 40 initially identifies that the rightward-branching conveyer $1C_R$ is linked, and then based on Table 3, the controller 40 identifies that load cannot be branched or conveyed from the port C to the port D and vice versa. Accordingly, the controller 40 defines that load cannot be conveyed from "5" to "3" and from "5" to "4". The controller 40 outputs the convey-impossible signals (5→3) and (5→4) to the controllers 40 of the adjoining conveyer units 1, and then, the convey-impossible signals (5→3) and (5→4) are sequentially transmitted to all the controllers 40 of all the conveyer units 1. On receipt of the convey-impossible signals (5→3), (4→3), (3→5), and (3→4) from the conveyer unit (6) and based on these input signals, the controller 40 of the conveyer unit (8) corrects the conveying table. When such a conveying data (subject to designation according to the numbers of the start conveyer and the destination conveyer) is received, then, the controllers 20 identify that the rollers 2 should not be rotated.

TABLE 3

| START CONVEYER | DESTINATION CONVEYER | DIRECTION OF ROTATION OF ROLLERS | COOPERATION OF BRANCHING DEVICE |
| --- | --- | --- | --- |
| 0 | 4 | Normal direction | Activated |
| 0 | 5 | Normal direction | Deleted |
| 1 | 4 | Normal direction | Activated |
| 1 | 5 | Normal direction | Deleted |
| 2 | 4 | Normal direction | Activated |
| 2 | 5 | Normal direction | Deleted |
| 3 | 4 | *Impossible to convey load | |
| 3 | 5 | *Impossible to convey load | |
| 4 | 0 | Reverse direction | Activated |
| 4 | 1 | Reverse direction | Activated |
| 4 | 2 | Reverse direction | Activated |
| 4 | 3 | *Impossible to convey load | |
| 4 | 5 | *Impossible to convey load | |
| 5 | 0 | Reverse direction | Deleted |
| 5 | 1 | Reverse direction | Deleted |
| 5 | 2 | Reverse direction | Deleted |
| 5 | 3 | *Impossible to convey load | |
| 5 | 4 | *Impossible to convey load | |

Figure 42:
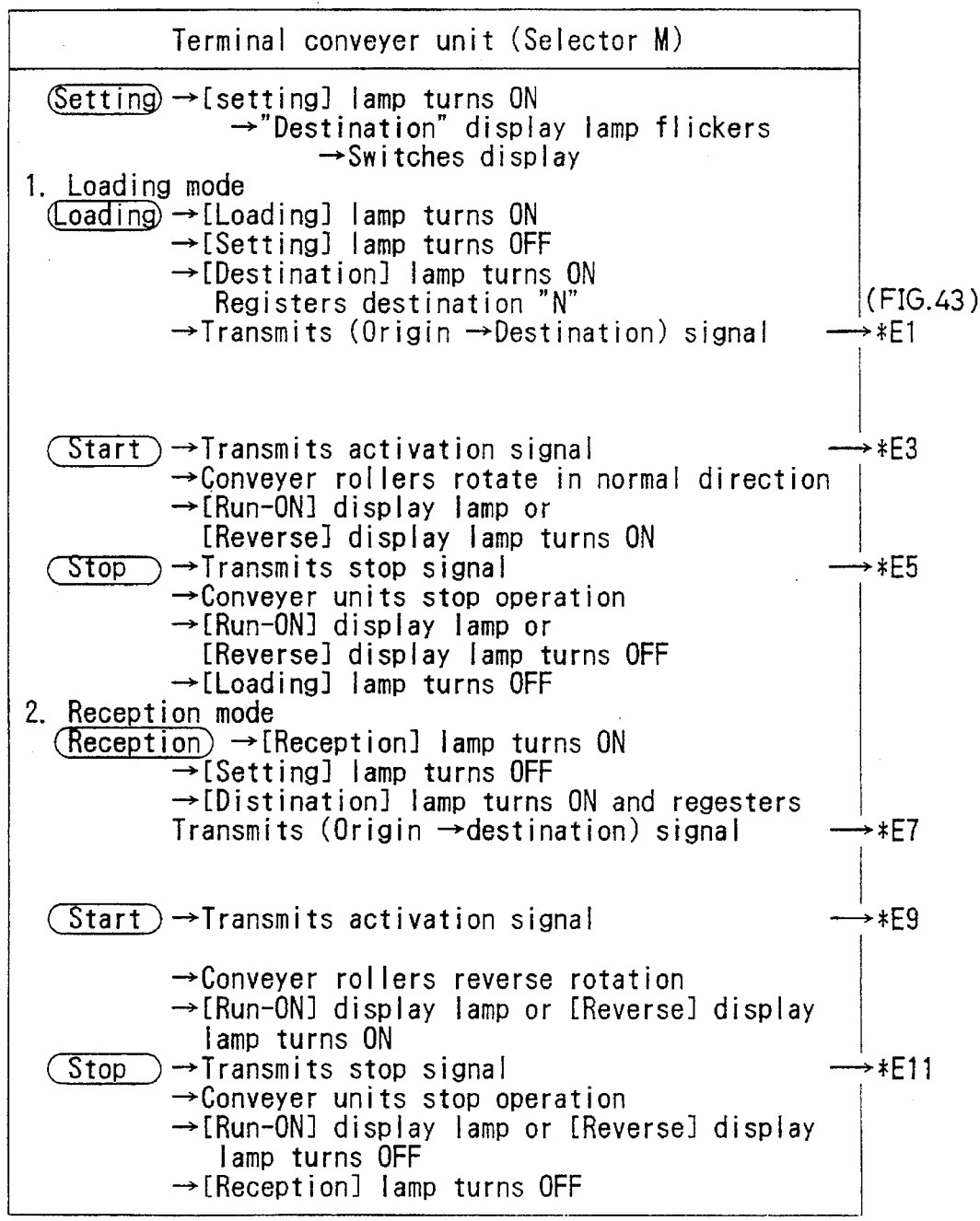
FIGS. 42 to 44 are explanatory of operating sequence for exchanging data signals between adjoining conveyer units.
Figure 43:
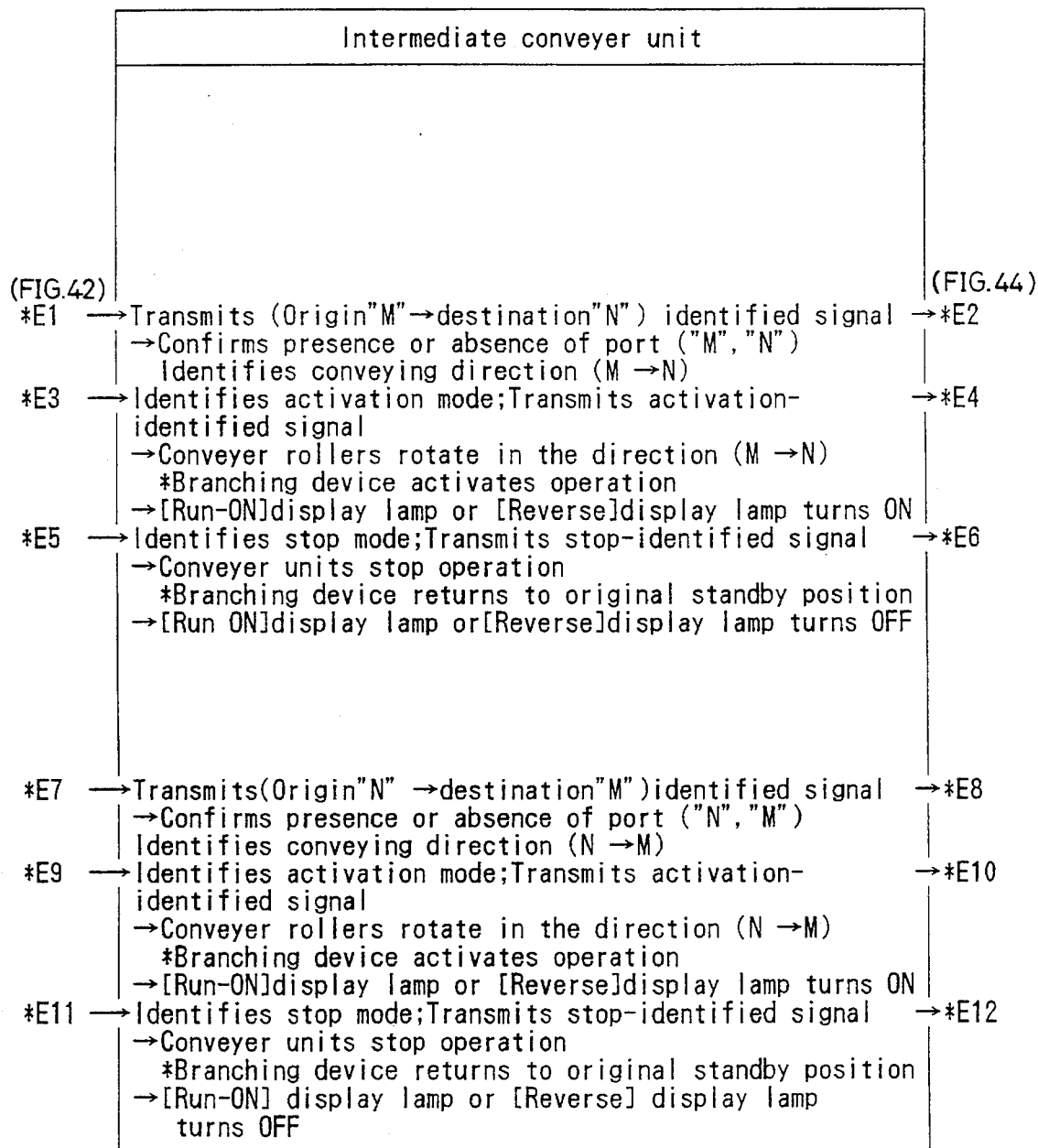
Figure 44:
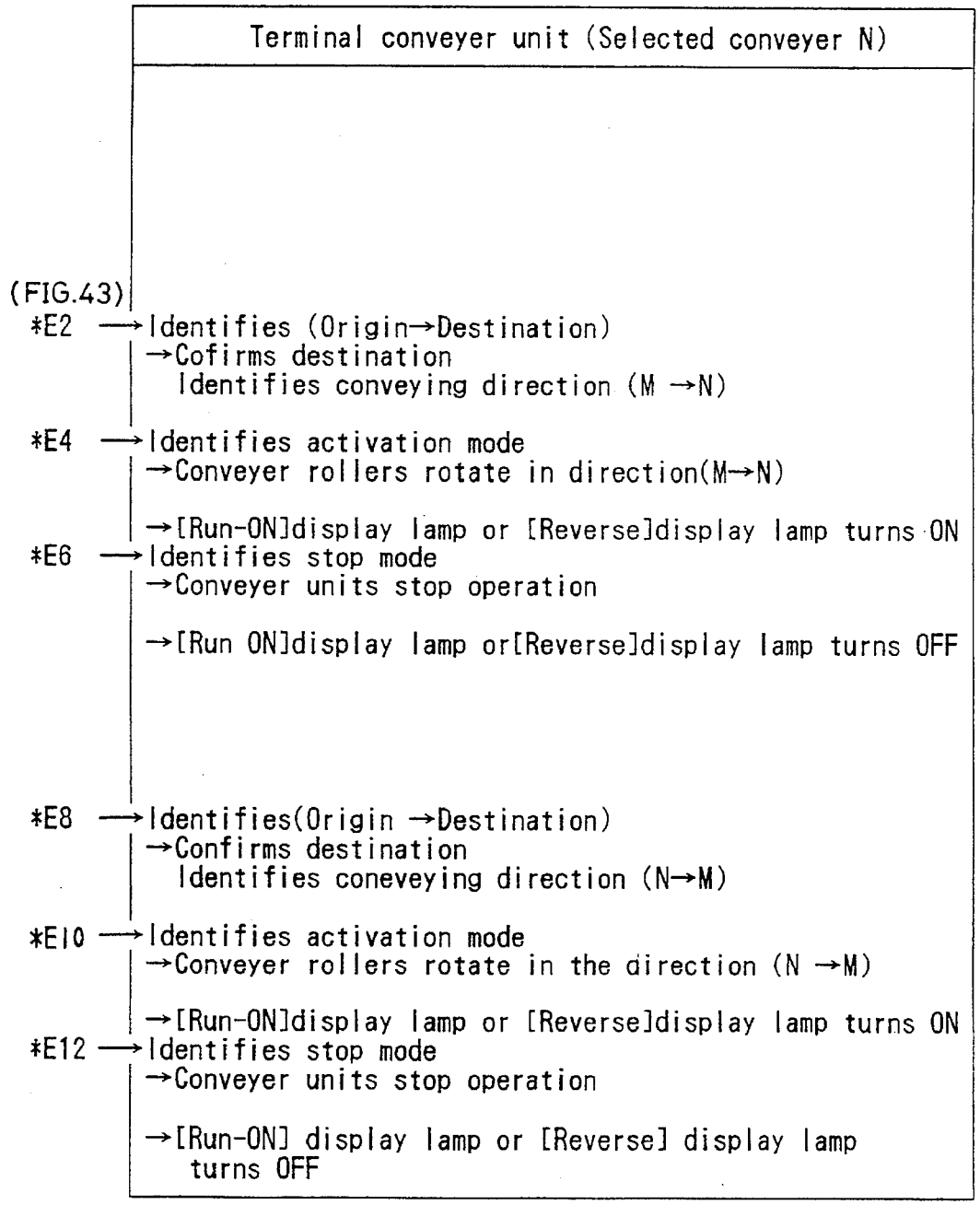

In the same way as described above, based on input operation of the operating box 51, the controllers 40 of the terminal conveyer units (2), (3), (7), (9), and (10), respectively prepare conveying data of the start conveyer and the destination conveyer, and then exchange the prepared conveying data between them. The controllers 40 respectively execute control operations by determining the direction of the rotation of the rollers 2 and applicability of branching operation of the branching devices 53 based on the exchanged conveying data and the rules of the conveying table specified in Table 3. When any of the controllers 40 identifies from the above conveying table that conveyance of load is impossible, then the controllers 40 respectively light up error display lamps 118 to resume flickering of the proper number of the registered terminal conveyer unit 1 on the digital display unit 120. FIGS. 42 to 44 describe this procedure.

As is clear from the above detailed description, according to the invention, any of those fully independent conveyer units 1 incorporating common software can optionally be registered to become the master station or a subordinate station. In particular, simultaneous with effectuation of registration, controllers of respective conveyer units prepare a conveying table. This enables the respective controllers to determine the direction of the rotation of the rollers 2 and applicability of joint operation of respective branching devices 53 according to the start and destination of load specified by applying registered proper number of respective conveyer units based on the conveying data, thus automatically establishing a conveying route. In particular, since the conveying table correctly determines specific directions in which conveyance of load is totally impossible as a result of linkage of branching conveyers $1C_L$ and $1C_R$, even when selecting any conveyer unit 1 incapable of conveying load, the controllers display error on a display, thus preventing erroneous selection of conveyer units from occurrence. In this way, flow of load on the whole conveyer line can automatically be established. Even when optionally setting fully independent conveyer units 1, the operator can build up an integrated conveyer line without changing operating software at all. Furthermore, the operator can readily remove and relocate existing conveyer units and install additional conveyer units as required. This in turn leads to reduction of relocating cost and contraction of period needed for relocation of the conveyer unit.

In addition, the operator can effect loading and reception of objective loads 52 from any of the terminal conveyer units 1, and yet, since operation of all the conveyer units 1 can be activated and suspended as required, overall operating efficiency of the conveyer unit can securely be promoted, and yet, load 52 can optionally be conveyed in the forward and backward directions.

According to the embodiment described above, proper numbers are registered for terminal conveyer units 1. However, by providing an operating box for each intermediate conveyer unit 1, registration can be effectuated. Therefore, load 52 can be conveyed onto and out of any optional conveyer unit 1.

According to the above embodiment, storage of registration numbers of respective conveyer units 1 into respective ports 42 of each controller 40 is automatically executed. However, it is also possible for this conveying system to directly (manually) store the registered number in memories of respective I/O ports by applying a setting instrument for example.

In the event that the destination is designated by the registered number of a specific conveyer unit 1 without preparing a conveying table, the conveyer unit of the invention can index ports storing registered number correctly matching the registered number of the designated destination conveyer unit 1, and then, based on the indexed direction of ports, the controllers 40 can determine the direction to drive the rollers 2 of the main conveyer structures 3.

According to the above embodiment, the main conveyer structure 3 is supported by stationary stand system comprising leg members 9 and the grounding units 10. It is also possible for the conveyer unit of the invention to support the conveyer structure 3 by means of foldable leg members. This will lower total height of conveyer unit 3 when transferring or storing a plurality of conveyer units being stacked, thus effectively utilizing space. Conveyer units 1 can more easily be shifted by replacing the grounding units 10 with casters.

What is claimed is:

1. A conveyor unit for conveying loads mounted thereon, comprising a main conveyor structure for supporting said conveyor unit, a drive unit for driving said conveyor unit and a controller for controlling said drive unit, characterized in that:

said controller is provided with a plurality of data transmitter-receiver circuits respectively connectable to a controller of each of other conveyor units of like construction adapted to adjoin said conveyor unit at least in three directions in which loads are to be conveyed thereby;

said plurality of data transmitter-receiver circuits of said conveyor unit when disposed adjacent to the other conveyor units being connectable to the plurality of data transmitter-receiver circuits thereof by means of connectors; and said controller is provided with decision means for deciding the direction of conveyance of loads on the basis of conveyance data input thereto from one of the adjoining conveyor units through the connectors and data transmitter-receiver circuits, said decision means also being adapted to output the input conveyance data to the controller of another adjoining conveyor unit other than the one which has output the conveyance data through the connectors and data transmitter-receiver circuits.

2. A conveyor unit as set forth in claim 1, wherein said controller is provided with an operation box for setting conveyance data and is adapted to output the conveyance data to respective controllers of the adjoining conveyor units through the connectors and data transmitter-receiver circuits.

3. A conveyor unit as set forth in claim 2, wherein said conveyance data consists of a registered number of a conveyor unit which starts conveyance of loads and another registered number of another conveyor unit which finally receives the loads.

4. A conveyor unit as set forth in claim 3, wherein the decision means provided for the controller is adapted to store in the respective data transmitter-receiver circuits the registered numbers of all the conveyor units connected in the directions of the data transmitter-receiver circuits and to decide the direction of conveyance of loads to be effected by the conveyor unit on basis of the registered numbers and conveyance data stored in each of the data transmitter-receiver circuits.

5. A conveyor unit as set forth in claim 3, wherein said decision means provided for the controller is adapted to: store the registered numbers to be registered in the conveyor unit in the data transmitter-receiver circuits which have been input with the registered numbers while said registered numbers are being transmitted and received through the data transmitter-receiver circuits; form a table for deciding the direction of conveyance of loads on the basis of the registered numbers stored in the respective data transmitter-receiver circuits; and finally decide the direction of conveyance of loads on the basis of the table and the conveyance data.

6. A conveyor unit as set forth in claim 1, wherein said decision means provided for the controller is adapted to store the registered numbers of all the conveyor units to be connected in the directions of the data transmitter-receiver circuits in the respective data transmitter-receiver circuits, and when branching conveyor units are connected with the data transmitter-receiver circuits, said decision means is further adapted to store branching directional data in addition to the registered numbers of the branching conveyor units in the data transmitter-receiver circuits.

7. A conveyor unit as set forth in claim 6, wherein said decision means of the controller is adapted to: form a table for deciding the direction of conveyance of loads on the basis of the registered numbers stored in the respective data transmitter-receiver circuits; identify conveyance-impossible directions on the basis of the branching directional data of the branching conveyor units and define said conveyance-impossible directions as drive-impossible directions on the basis of the table; and finally decide the direction of conveyance of loads on the basis of the table and the conveyance data.

* * * * *